United States Patent [19]

Kura et al.

[11] Patent Number: 5,742,506
[45] Date of Patent: Apr. 21, 1998

[54] STARTING DEVICE FOR A PASSENGER PROTECTING DEVICE

[75] Inventors: Nobuyoshi Kura; Mitsunori Maruyama, both of Tokyo; Hidehiko Kinoshita, Hyogo; Takashi Furui, Hyogo; Yukihiro Okimoto, Hyogo, all of Japan

[73] Assignees: Mitsubishi Jidosha Kogyo Kabushiki Kaisha; Mitsubishi Denki Kabushiki Kaisha, both of Tokyo, Japan

[21] Appl. No.: 402,357

[22] Filed: Mar. 13, 1995

[30] Foreign Application Priority Data

Jun. 20, 1994 [JP] Japan .................................. 6-137377

[51] Int. Cl.⁶ .................................................. B60R 21/32
[52] U.S. Cl. ..................... 364/424.05; 307/10.1; 340/669; 280/735; 180/282
[58] Field of Search ................. 364/424.05; 340/436, 340/669; 280/734, 735; 307/10.1; 180/282, 274

[56] References Cited

U.S. PATENT DOCUMENTS

| | | | |
|---|---|---|---|
| 5,036,467 | 7/1991 | Blackburn et al. | 364/424.05 |
| 5,232,243 | 8/1993 | Blackburn et al. | 280/735 |
| 5,256,904 | 10/1993 | Tohbaru | 307/10.1 |
| 5,285,187 | 2/1994 | Hirao et al. | 280/735 |
| 5,402,343 | 3/1995 | Shibata et al. | 364/424.05 |
| 5,436,838 | 7/1995 | Miyamori | 364/424.05 |
| 5,440,485 | 8/1995 | Okimoto et al. | 364/424.05 |
| 5,483,451 | 1/1996 | Ohmae et al. | 364/424.05 |

FOREIGN PATENT DOCUMENTS 39 42 011 10/1991 Germany .
41 17 811 12/1992 Germany .

*Primary Examiner*—Kevin J. Teska
*Assistant Examiner*—Tyrone V. Walker
*Attorney, Agent, or Firm*—Sughrue, Mion, Zinn, Macpeak & Seas

[57] ABSTRACT

A starting device integrates an output signal of an acceleration sensor by a band-pass integrating means while restricting an upper limit of the output signal in a specified frequency range by an upper limit restricting means, and is provided with a comparing means for outputting a starting signal when the integrated value is larger than a predetermined threshold value. In this way, the starting device is certainly started by an acceleration waveform of collision that must start the device. Further, the device is not influenced by vibration components caused immediately after the beginning of collision with respect to a low-speed collision such as 8 mile/hour frontal collision that must not start the device.

14 Claims, 45 Drawing Sheets

STARTING DEVICE FOR A PASSENGER PROTECTING DEVICE

BACKGROUND OF THE INVENTION

1. Field of the Invention

This invention relates to a starting device for a passenger protecting device which detects collision of a vehicle and operates, for instance, an air bag, a seat belt pretensioner or the like, thereby protecting passengers.

2. Description of the Prior Art

FIG. 40 is a block diagram of a conventional starting device for a passenger protecting device which is disclosed in, for instance, Japanese Laid Open Patent Publication No. 252757/1992. In FIG. 40, numeral 51 designates an electric acceleration sensor, of which output signal is inputted to an amplifier 52. Numeral 60 designates a collision determining circuit comprising a counter vehicle speed calculating means as a determining logic of a vehicle speed V which is inputted with an output signal from the amplifier 52, a band-pass filter (hereinafter, BPF) 62, a power calculating means 63 as a determining logic of an acceleration $G^2$ which is inputted with an output from the BPF 62 and an OR circuit 64 which is inputted with an output signal of the counter vehicle speed calculating means 61 and an output signal of the power calculating means 63. Numeral 53 designates a transistor for switching which becomes conductive by being inputted with an output signal of the collision determining circuit 60, and numeral 54 designates a squib which is connected to the transistor 53 in series, and which is connected to a power source 56 through a mechanical acceleration sensor 55.

Next, an explanation will be given of the operation. The electric acceleration sensor 51 converts an acceleration which is caused by the collision of vehicle into a voltage signal and outputs it. The output signal of the electric acceleration sensor 51 is amplified by the amplifier 52 and is inputted to the counter vehicle speed calculating means 61. The counter vehicle speed calculating means 61 is consisted of an integrating circuit, which outputs a signal to the OR circuit 64 when the calculated counter vehicle speed V is larger than a predetermined reference value. Further, the output signal of the electric acceleration sensor 51 which has been amplified by the amplifier 52, is inputted to the power calculating means 63, after a frequency component of 100 Hz or less and a frequency component of 200 Hz or more have been filtered by passing through the band-pass filter 62, whereby the size of power of the acceleration in a frequency domain of 100 Hz through 200 Hz, is calculated. The power calculating means 63 outputs a signal to the OR circuit 64 when the calculated power is larger than a predetermined reference value. The OR circuit 64 outputs starting signal for an air bag device to the base of the transistor 53 when a signal is inputted from at least one of the counter vehicle speed calculating means 61 and the power calculating means 63.

On the other hand, the mechanical acceleration sensor 55 detects the acceleration by the collision of vehicle, and closes contacts when the acceleration exceeds a predetermined value. Accordingly, the squib 54 ignites an explosive for expanding the air bag by flowing current by the battery 56, when the contacts of the mechanical acceleration sensor 55 are closed and the collision determining circuit 60 outputs a starting signal to the base of the transistor 53.

In such a conventional starting device for a passenger protecting device, the air bag must be started by a collision waveform in underriding (hereinafter, U/R) of vehicle to the back portion of a truck at the speed of 20 mile/hour. The integral waveform of the collision waveform of U/R shown in FIG. 41, is illustrated in FIG. 42. On the other hand, in a low-speed collision as in a frontal collision to a barrier at a speed of 8 mile/hour (hereinafter, 8 mile/hour frontal collision), the air bag must not be started, and the integral waveform of the acceleration waveform in the 8 mile/hour frontal collision which is shown in FIG. 43, is as illustrated in FIG. 44. Accordingly, comparing the integral waveform of the acceleration in the 8 mile/hour frontal collision (B in FIG. 45) with the U/R integral waveform (A in FIG. 45) as is shown in FIG. 45, it is known that it takes time of approximately 120 msec from the collision to make a difference between both collisions, and that it takes too much time to make a difference between both when only the counter vehicle speed calculating means 61 is used.

Further, also in the power calculating means 63, the waveform of collision in the U/R which is shown in FIG. 41, after passing through the BPF, is illustrated in FIG. 46, and its power (square integral waveform) is as illustrated in FIG. 47. Comparing the power of the acceleration waveform of the frontal collision at 8 mile/hour which is shown in FIG. 43 (B in FIG. 48) with the power of the U/R (A in FIG. 48), it takes time of 120 msec from the collision as in the above case for differentiating the both collisions.

Further, when there are large vibration components in the neighborhood of 80 msec around the last moment of collision, as in the acceleration waveform of the 8 mile/hour frontal collision shown in FIG. 49, the large vibration components remain in the neighborhood of 80 msec even after passing through the BPF, as shown in FIG. 50, and the power becomes large in the neighborhood of 80 msec as shown in FIG. 51. Therefore, the predetermined reference value for the power must be set to a large value, and therefore, the collision determination is retarded in other collision mode in which the air bag must be started.

Further, with respect to the acceleration waveform for a hammer blow as shown in FIG. 52, the air bag must not be started. However, since the large vibration components remain even after passing through the BPF as shown in FIG. 53, as shown in FIG. 54, the power is larger than those in the 8 mile/hour frontal collisions in FIG. 48 and FIG. 51. Accordingly, the predetermined reference value for the power must be made larger, and therefore, the collision determination is further retarded in other collision mode wherein the air bag must be started.

SUMMARY OF THE INVENTION

Accordingly, it Is an object of the present invention to provide a starting device for a passenger protecting device which is not started for an acceleration waveform for a low-speed collision as in the 8 mile/hour frontal collision which should not start the device, and which starts for an acceleration waveform of a special collision such as the U/R which must start the device, without retarding the collision determination.

It is another object of the present invention to provide a starting device for a passenger protecting device capable of swiftly differentiating a collision from other collision which must start the device, which is not started for all the acceleration waveforms that must not start the device, and which is started for an acceleration waveform that must start the device.

It is a further object of the present invention to provide a starting device for a passenger protecting device which is not started with composure for an acceleration waveform of a low-speed collision as the 8 mile/hour frontal collision that must not start the device in its variation of the waveform, and which is started for an acceleration waveform that must start the device, without retarding the collision determination.

It is a further object of the present invention to provide a starting device for a passenger protecting device which is little influenced by vibration components caused before and after the end of collision of the acceleration waveform as in the low-speed collision such as the 8 mile/hour frontal collision that must not start the device, which is not started for an acceleration waveform that must not start the device, and which is started for an acceleration waveform of a special collision such as the U/R that must start the device.

It is a further object of the present invention to provide a starting device for a passenger protecting device wherein the calculation of a threshold value is facilitated, and which is capable of swiftly differentiating a collision that must not start the device from a collision that should start the device, by a simplified program.

It is a further object of the present invention to provide a starting device for a passenger protecting device which is certainly started for an acceleration waveform of a special collision such as the U/R that must start the device, by a simplified program.

It is a further object of the present invention to provide a starting device for a passenger protecting device which is certainly started for an acceleration waveform of a special collision such as the U/R that must start the device, and which is little influenced by vibration components caused immediately after the beginning of collision of an acceleration waveform in low-speed collision as in the 8 mile/hour collision that must not start the device, by a simplified program.

It is a further object of the present invention to provide a starting device for a passenger protecting device which is not started for an impact acceleration waveform as in the hammer blow that must not start the device, by a simplified program.

It is a further object of the present invention to provide a starting device for a passenger protecting device which is certainly started for an acceleration waveform of a special collision such as the U/R that must start the device, which is little influenced by vibration components caused immediately after the beginning of collision of an acceleration waveform of a low-speed collision such as the 8 mile/hour frontal collision that must not start the device, and which is not started for an impact acceleration waveform such as the hammer blow that must not start the device, by a simplified program.

To achieve the above object, according to the present invention, there is provided a starting device for a passenger protecting device comprising a band-pass filter for filtering components in a specified frequency domain of an output signal of an acceleration sensor, an absolute value calculating mechanism for calculating an absolute value of an output signal of the band-pass filter, an upper limit restricting mechanism for restricting an output signal of the absolute value calculating mechanism by a predetermined upper value, and a band-pass integrating mechanism for integrating an output signal of the upper limit restricting mechanism and a comparing mechanism for comparing an output of the band-pass integrating mechanism with a predetermined threshold value.

In its operation, the starting device integrates a value wherein the upper limit of an absolute value of output of the band-pass filter is restricted, and outputs a starting signal when the integrated value is larger than the predetermined threshold value. Accordingly, it is possible not to start it with respect to an acceleration waveform of collision that must not start the device and to start it with respect to an acceleration waveform of a special collision such as the U/R that must start the device.

According to a preferred embodiment, a starting device for a passenger protecting device comprises a band-pass filter for filtering a component of an output signal of an acceleration sensor in a specified frequency domain, an absolute value calculating mechanism for calculating an absolute value of an output signal of the band-pass filter, an upper limit restricting mechanism for restricting an output signal of the absolute value calculating mechanism by a predetermined upper limit value, a band-pass integrating mechanism for integrating an output signal of the upper limit restricting mechanism, an acceleration integrating mechanism for integrating the output signal of the acceleration sensor, a threshold value determining mechanism for determining a threshold value in accordance with an output signal of the acceleration integrating mechanism, and a comparing mechanism for comparing an output of the band-pass integrating mechanism with an output of the threshold value determining mechanism and for outputting a starting signal.

In the operation, the starting device determines the threshold value which varies in accordance with the output of the acceleration integration, and outputs the starting signal when the output of the band-pass integration is larger than the threshold value. Accordingly, it is possible to swiftly differentiate a collision which must start the device from a collision which must not start the device.

Further, in another preferred embodiment, a starting device for a passenger protecting device comprises a band-pass filter for filtering components of an output signal of an acceleration sensor in a specified frequency domain, an absolute value calculating mechanism for calculating an absolute value of an output signal of the band-pass filter, an upper limit restricting mechanism for restricting an output signal of the absolute value calculating mechanism by a predetermined upper value, a band-pass integrating mechanism for integrating an output of the upper limit restricting mechanism when the output of the acceleration sensor is an acceleration in a decelerating direction, and a comparing mechanism for comparing an output of the band-pass integrating mechanism with a predetermined threshold value and for outputting a starting signal.

In the operation, the starting device performs the band-pass integration when the output of the acceleration sensor is an acceleration in the deceleration direction, and outputs the starting signal when the integration value is larger than the predetermined threshold value. Accordingly, it is possible that the device is little influenced by vibration components caused before and after the end of collision of an acceleration waveform of collision such as 8 mile/hour frontal collision that must not start the device, the device is not started for an acceleration waveform which must not start the device, and the device is started for an acceleration waveform of a special collision such as the U/R which must start the device.

In a preferred embodiment, a starting device for a passenger protecting device comprises a band-pass filter for filtering a component of an output signal of an acceleration sensor in a specified frequency domain, an absolute value calculating mechanism for calculating an absolute value of an output signal of the band-pass filter, an upper limit restricting mechanism for restricting an output signal of the absolute calculating mechanism by a predetermined upper limit value, a band-pass integrating mechanism for integrating an output of the upper limit restricting mechanism when the output of the acceleration sensor is an acceleration in a decelerating direction, an acceleration integrating mechanism for integrating the output signal of the acceleration sensor when the output of the acceleration sensor is the acceleration in the decelerating direction, a threshold value determining mechanism for determining a threshold value in accordance with an output signal of the acceleration integrating mechanism, and a comparing mechanism for comparing an output of the band-pass integrating mechanism with an output of the threshold value determining mechanism and for outputting a starting signal.

In the operation, the starting device performs the band-pass integration and the acceleration integration when the output of the acceleration sensor is the acceleration in the decelerating direction, determines the threshold value which varies in accordance with the output of the acceleration integration and outputs the starting signal when the output of the band-pass integration is larger than the threshold value. Therefore, it is possible that the device is little influenced by vibration components caused before and after the end of collision of the acceleration waveform of a low-speed collision such as the 8 mile/hour frontal collision which must not start the device, and the device swiftly differentiate a collision which must not start the device from a collision which must start the device.

Preferably, the threshold value determining mechanism determines the threshold value which linearly increases in accordance with an increase in the output of the acceleration integrating mechanism. Thereafter, the starting device outputs the starting signal when the output of the band-pass integration is larger than the threshold value. Therefore, the calculation of the threshold value is facilitated, and it is possible to swiftly differentiate a collision which must not start the device from a collision which must start the device.

Further, in the starting device for a passenger protecting device, the threshold value determined by the threshold value determining mechanism may take a value when it is expressed by a coordinate system wherein the output $V_g$ of the acceleration integrating mechanism is expressed by an abscissa and output $V_{BPF}$ of the band-pass integrating mechanism is expressed by an ordinate, as follows. The threshold value is composed of a first straight line having a positive intercept and linearly increasing in accordance with an increase in the output $V_g$ in a positive inclination when the output $V_g$ is not larger than a predetermined value of $V_a$, a second straight line being parallel with the abscissa and having a value of the output $V_{BPF}$ of the first straight line when the output $V_g$ is $V_a$, in case wherein the output $V_g$ is not smaller than $V_a$ and is not larger than $V_b$ that is predetermined to a value larger than $V_a$, and a third straight line being parallel with the abscissa and having the value of 0 when the output $V_g$ is not smaller than $V_b$. In this way, the device can certainly be started with respect to an acceleration waveform of a special collision such as the U/R which must start the device, by a simplified program.

Further, in the starting device for a passenger protecting device, the threshold value determined by the threshold value determining mechanism may take a value when it is expressed by a coordinate system wherein the output $V_g$ of the acceleration integrating mechanism is expressed by the abscissa and an output $V_{BPF}$ of the band-pass integrating mechanism is expressed by the ordinate, as follows. The threshold value is composed of a first straight line being parallel with the abscissa and having a predetermined positive value $V_p$ when the output $V_g$ is not larger than a predetermined value of $V_a$, a second straight line passing through $(V_a, V_p)$, having a positive inclination and linearly increasing in accordance with an increase in the output $V_g$ when the output $V_g$ is not smaller than $V_a$ and not larger than $V_b$ that is predetermined to a value larger than $V_a$, a third straight line being parallel with the abscissa and having a value of the output $V_{BPF}$ of the second straight line when the output $V_g$ is $V_b$ in case wherein the output $V_g$ is not smaller than $V_b$ and not larger than $V_c$ that is predetermined to a value larger than $V_b$, and a fourth straight line being parallel with the abscissa and having the value of 0 when the output $V_g$ is not smaller than $V_c$. Therefore, the invention can provide the starting device for a passenger protecting device which is certainly started with respect to an acceleration waveform of a special collision such as the U/R that must start the device, and which is little influenced by vibration components caused immediately after the start of collision with respect to an acceleration waveform of a low-speed collision such as the 8 mile/hour frontal collision that must not start the device.

Preferably, in the starting device for a passenger protecting device, the threshold value determined by the threshold value determining mechanism takes a value when it is expressed by a coordinate system wherein the output $V_g$ of the acceleration integrating mechanism is expressed by the abscissa and the output $V_{BPF}$ of the band-pass integrating mechanism is expressed by the ordinate, as follows. The threshold value is a value which is sufficiently large and larger than all the output $V_{BPF}$ when the output $V_g$ is not larger than a predetermined value of $V_a$, and is expressed by a straight line having a positive inclination and linearly increasing in accordance with an increase in the output $V_g$ when the output $V_g$ is not smaller than Va. Accordingly, the device is not started with respect to an impact acceleration waveform such as the hammer blow that must not start the device, by a simplified program.

Further, in the starting device for a passenger protecting device, the threshold value determined by the threshold value determining mechanism may take a value when it is expressed by a coordinate system wherein the output $V_g$ of the acceleration integrating mechanism is expressed by the abscissa and the output $V_{BPF}$ of the band-pass integrating mechanism is expressed by the ordinate, as follows. The threshold value is composed of a value which is sufficiently large and larger than all the output $V_{BPF}$ when the output $V_g$ is not larger than a predetermined value of $V_a$, a first straight line being parallel with the abscissa and having a predetermined positive value $V_p$ when the output $V_g$ is not smaller than $V_a$ and is not larger than $V_b$ that is predetermined to a value larger than $V_a$, a second straight line passing through $(V_b, V_p)$, having a positive inclination and linearly increasing in accordance with an increase in the output $V_g$ when the output $V_g$ is not smaller than $V_b$ and not larger than $V_c$ that is predetermined to a value larger than $V_b$, a third straight line being parallel with the abscissa and having a value of the output $V_{BPF}$ of the second straight line when the output $V_g$ is $V_c$ in case wherein the output $V_g$ is not smaller than $V_c$ and not larger than $V_d$ that is predetermined to a value larger than $V_c$, and a fourth straight line being parallel with the abscissa and having the value of 0 when the output $V_g$ is larger than $V_d$. Accordingly, the device is certainly started with respect to an acceleration waveform of a special collision such as the U/R that must start the device, which is little influenced by vibration components caused immediately after the start of collision of an acceleration waveform of a low-speed collision such as the 8 mile/hour frontal collision that must not start the device, and which is not started with respect to an impact acceleration waveform such as the hammer blow that must not start the device, by a simplified program.

The further object and effect of this invention will be clarified by the following description of preferred embodiments of the invention illustrated by attached drawings.

DETAILED DESCRIPTION OF THE PREFERRED EMBODIMENTS

Figure 1:
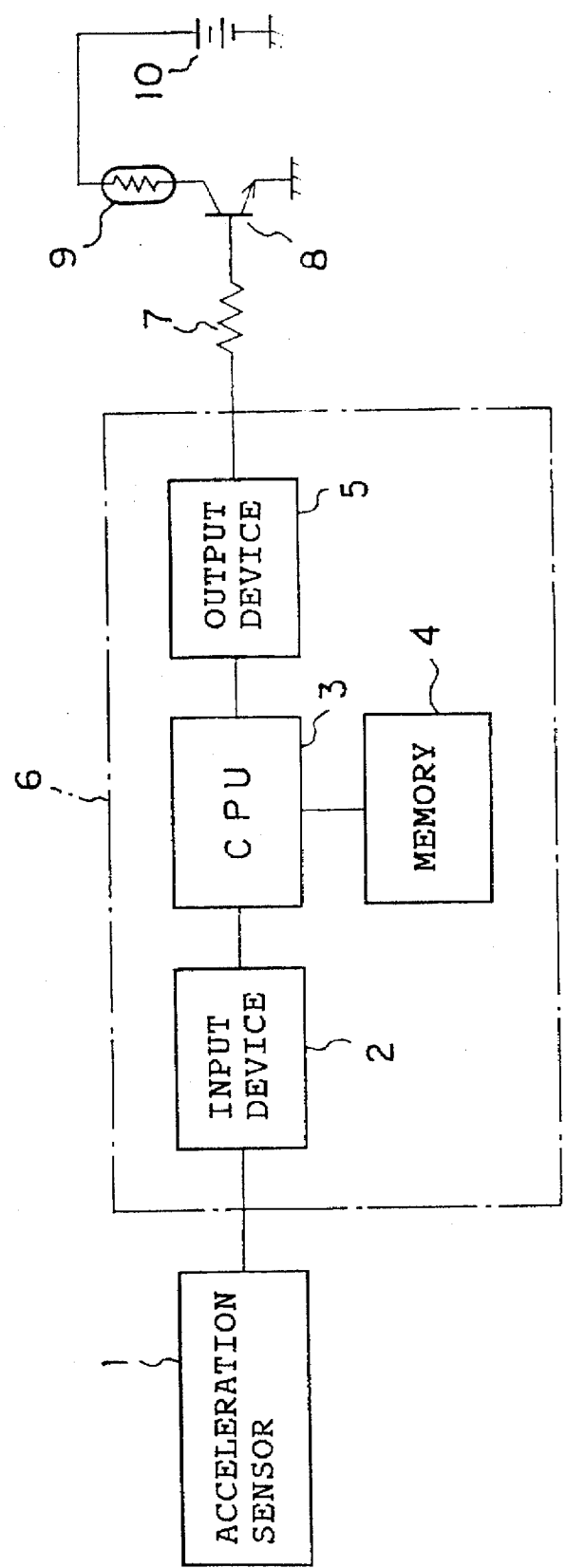
FIG. 1 is a block diagram of a basic construction showing a starting device for a passenger protecting device.

An explanation will be given of an embodiment of this invention in reference to the drawings. FIG. 1 is a block diagram showing the construction of a starting device for a passenger protecting device according to an embodiment of this invention. In FIG. 1, numeral 1 designates an acceleration sensor for converting an acceleration in the front and rear direction of a vehicle into an electric signal and outputting it, and numeral 6 designates a starting device for an air bag, comprising an input device 2 for inputting an output signal of the acceleration sensor 1 to a central processing unit (CPU) 3, a memory 4 connected to the CPU 3, and an output device 5 for receiving an output of the CPU 3 and for outputting a starting signal of the air bag. Numeral 7 designates a resistor connected between the output device 5 and a transistor 8 for switching, and numeral 9 designates a squib connected in series between the transistor 8 and a power source 10.

Next, an explanation will be given of the operation. The acceleration sensor 1 converts the acceleration in the front and rear direction of a vehicle caused by a collision into an electric analog signal and outputs it to the input device 2. The input device 2 performs a so-called A/D conversion wherein the inputted analog quantity is converted to a digital quantity, and outputs the digital signal of the acceleration to the CPU 3. In the CPU 3, a collision determination is performed by a processing, mentioned later, based on the inputted digital signal of the acceleration and outputs the starting signal of the air bag through the output device 5. The transistor 8 is in switch-on state when the starting signal is inputted to its base, and the squib 9 ignites an explosive for expanding the air bag by flowing current by the battery 10.

Figure 2:
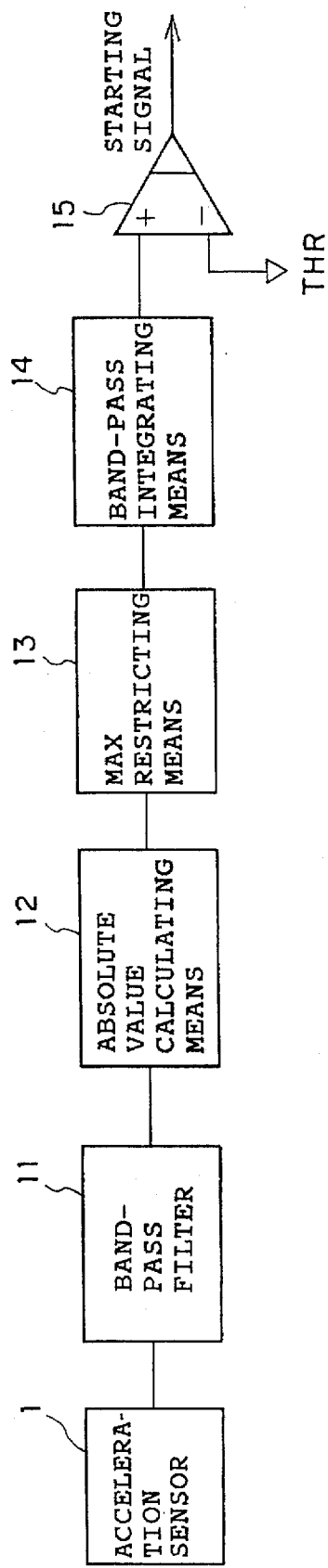
FIG. 2 is a block diagram for explaining an internal processing of a CPU according to an embodiment of this invention.

FIG. 2 is a block diagram for explaining an internal processing of the CPU 3 according to this embodiment. Numeral 11 designates a band-pass filter for filtering a component of an output signal of the acceleration sensor in a specified frequency domain, numeral 12 designates an absolute value calculating means for calculating an absolute value of an output signal of the band-pass filter 11, numeral 13 designates an upper limit restricting means for restricting an output signal of the absolute value calculating means 12 by a predetermined upper limit value (MAX), numeral 14 designates a band-pass integrating means for integrating an output of the upper limit restricting means 13, and numeral 15 designates a comparing means for comparing an output of the band-pass integrating means 14 with a predetermined threshold value THR (hereinafter, THR) and outputting the starting signal.

Figure 3:
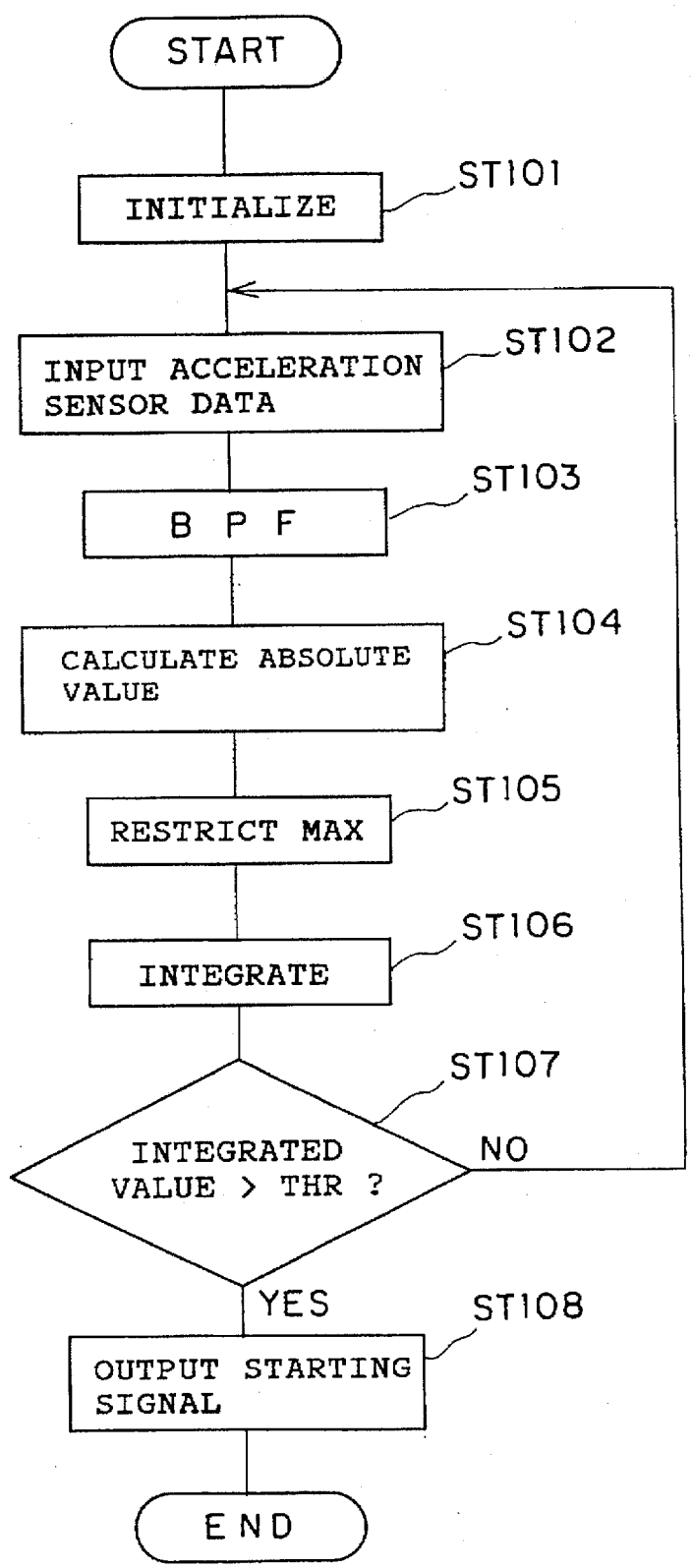
FIG. 3 is a flow chart for explaining the operation of the embodiment shown in FIG. 2.

Next, an explanation will be given of the operation in reference to a flow chart of FIG. 3. First, the operation initializes various statuses in the CPU 3 in step ST101. The operation inputs acceleration data of the acceleration sensor 1 transmitted from the input device 2 in step ST102. The operation performs the BPF processing for filtering a specific frequency component of, for instance, 100 Hz through 200 Hz by the band-pass filter 11 in step ST103. The operation calculates an absolute value of a waveform after the BPF processing in step ST104. The operation performs an upper limit restricting processing for restricting the upper limit to, for instance, 3 G (1 G=9.8 m/s$^2$) by the upper limit restricting means 13 in step ST105. In step ST106, the operation performs a processing by the band-pass integrating means 14 wherein the operation performs an integration calculation after subtracting a certain value from the acceleration waveform of which upper limit has been restricted, and resets the integrated value to 0 when the calculated integrated value becomes minus. In step ST107, the operation compares the above integrated value with a predetermined threshold value THR, and when the integrated value is not less than THR, the operation proceeds to step ST108 and outputs the starting signal for starting the air bag whereby the processing is finished. When the integrated value is not larger than THR as a result of comparison in step ST107, the operation returns to step ST102 and continues the processing.

Figure 4:
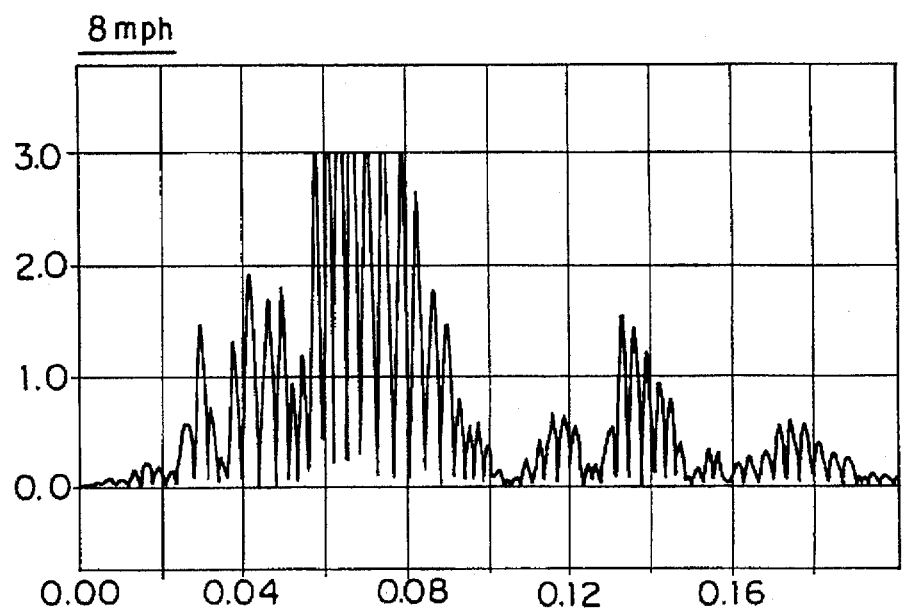
FIG. 4 is an acceleration waveform diagram of an upper limit restriction processing of an 8 mile/hour frontal collision.
Figure 5:
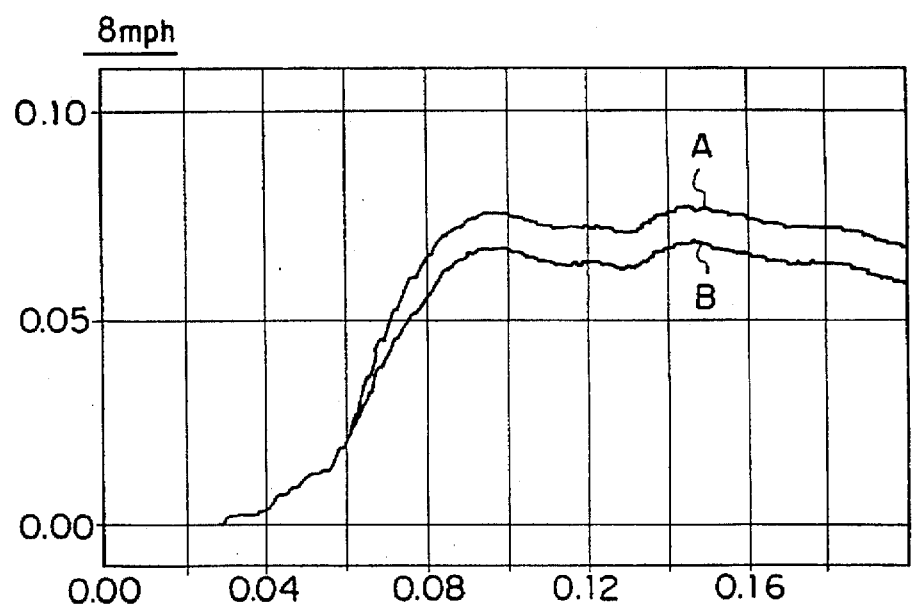
FIG. 5 is an integration waveform diagram of an acceleration after an upper limit restriction processing of an 8 mile/hour frontal collision.

Next, an explanation will be given of the upper limit restricting processing in the above step ST105. The upper limit restricting processing signifies a means for swiftly determining the differentiation of a collision waveform of the U/R from a collision waveform of the 8 mile/hour frontal collision in which the vibration components come to an end comparatively earlier, by paying attention to a continuation of vibration components for a long period of time which as the characteristic of the collision waveform of the U/R. For instance, in case of an acceleration waveform of the 8 mile/hour frontal collision shown in FIG. 4, the upper limit of the acceleration waveform after restricting processing of step ST105 has been restricted to 3 G at an interval between 60 msec through 80 msec. Accordingly, as shown by B in FIG. 5, in the integration in step ST106, compared with the integration in the case of no upper limit restriction shown by A in FIG. 5, the increase in the integrated value at and after 60 msec is restrained.

Figure 6:
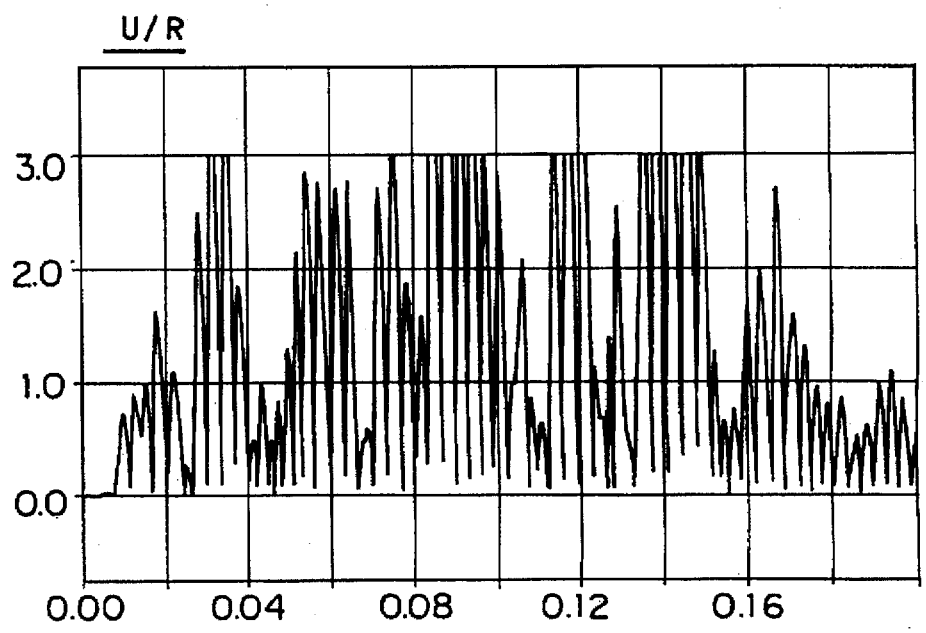
FIG. 6 is an acceleration waveform diagram after an upper limit restriction processing of a U/R.
Figure 7:
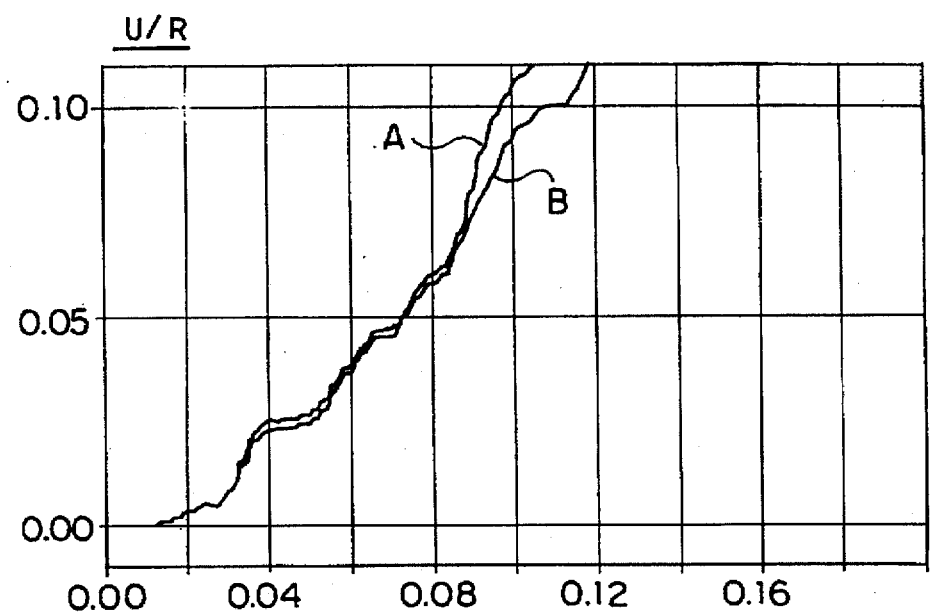
FIG. 7 is an integration waveform diagram of an acceleration after an upper limit restriction processing of a U/R.
Figure 41:
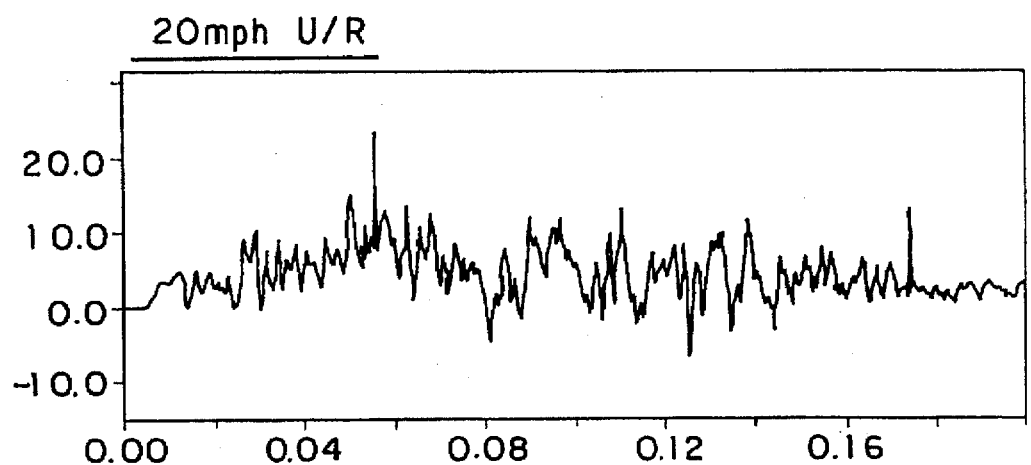
FIG. 41 is an acceleration waveform diagram of a U/R collision.
Figure 42:
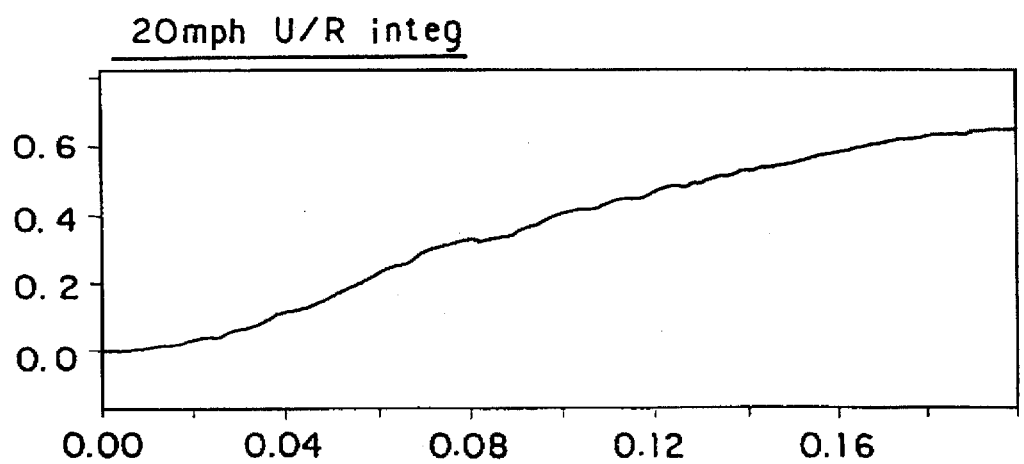
FIG. 42 is an integration waveform diagram of an acceleration of a U/R collision.
Figure 43:
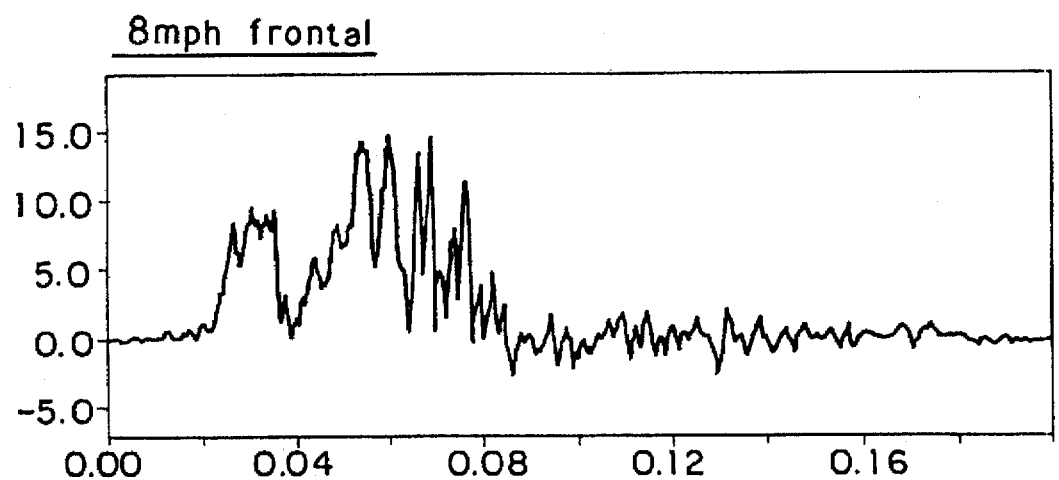
FIG. 43 is an acceleration waveform diagram of an 8 mile/hour frontal collision.
Figure 44:
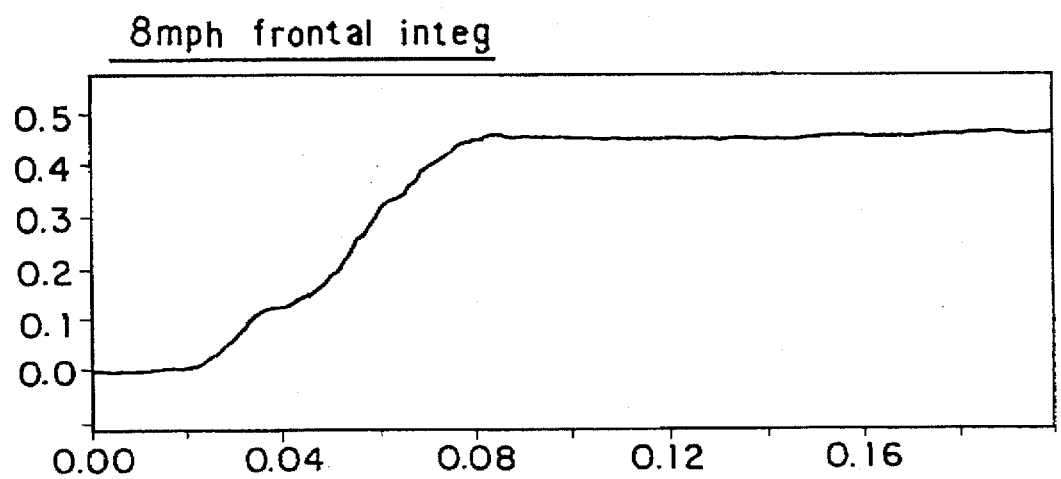
FIG. 44 is an integration waveform diagram of an acceleration of an 8 mile/hour frontal collision.
Figure 45:
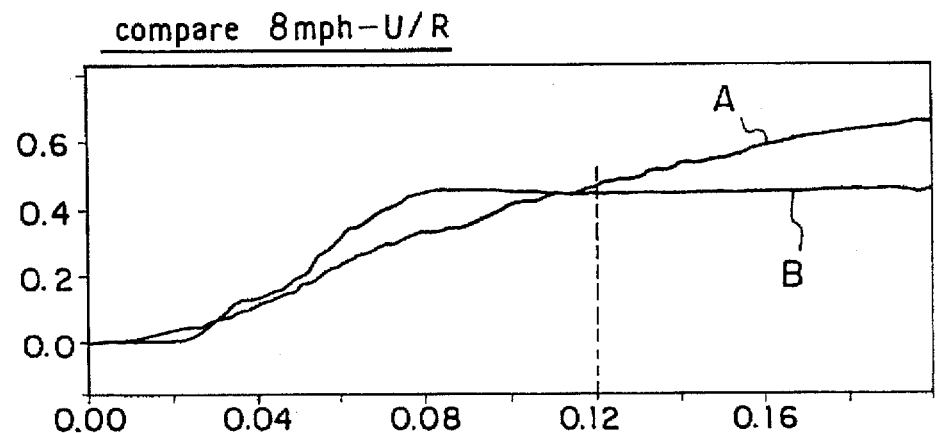
FIG. 45 is a diagram comparing an integration waveform of an 8 mile/hour frontal collision with that of a U/R collision.
Figure 46:
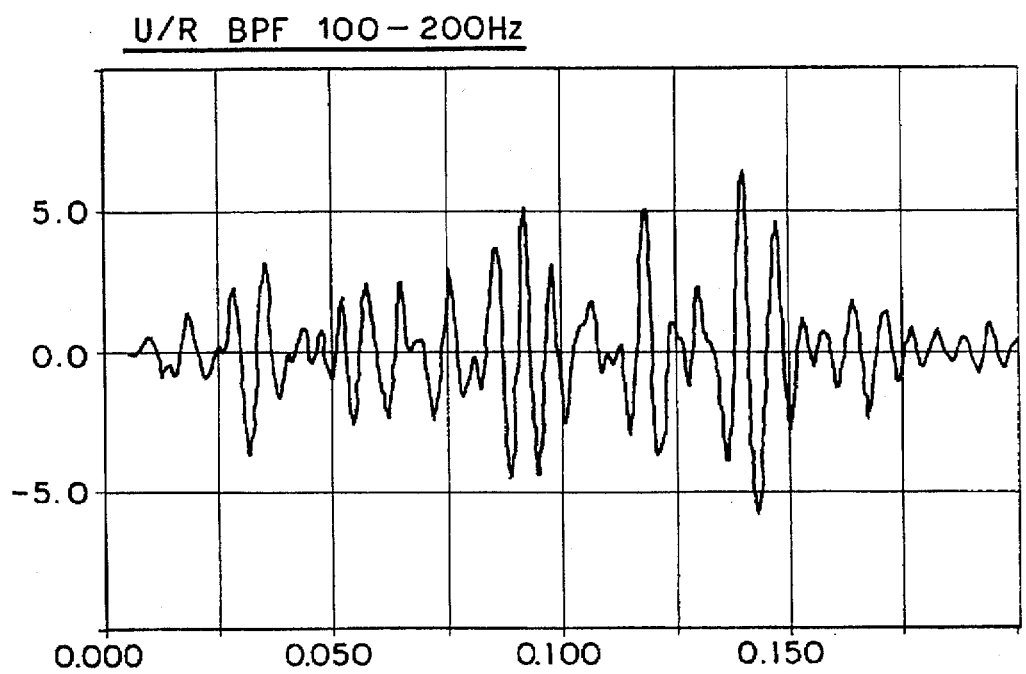
FIG. 46 is a waveform diagram of an acceleration of a U/R collision after passing a BPF.
Figure 47:
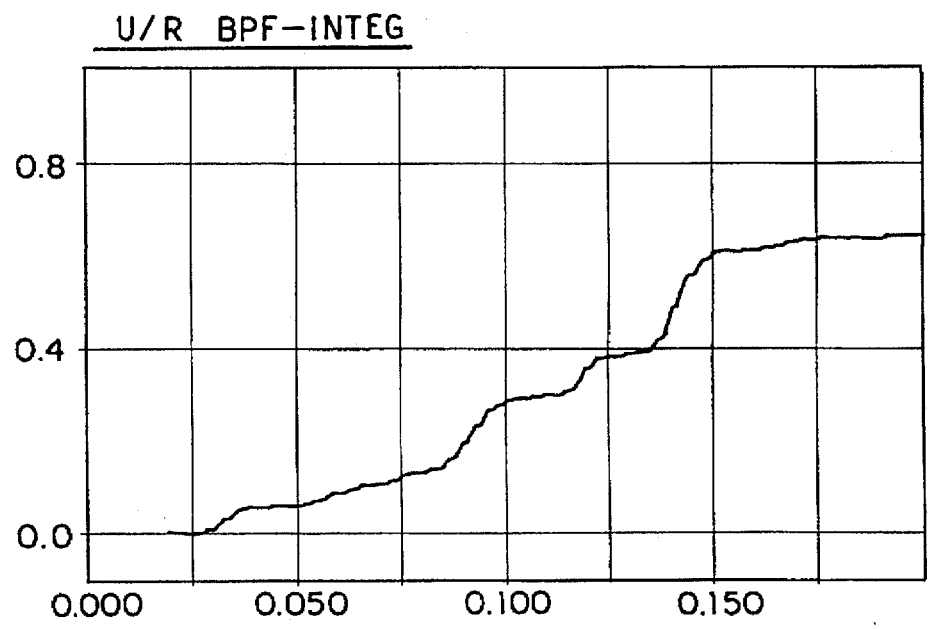
FIG. 47 is a square integration waveform diagram of the waveform shown in FIG. 46.
Figure 48:
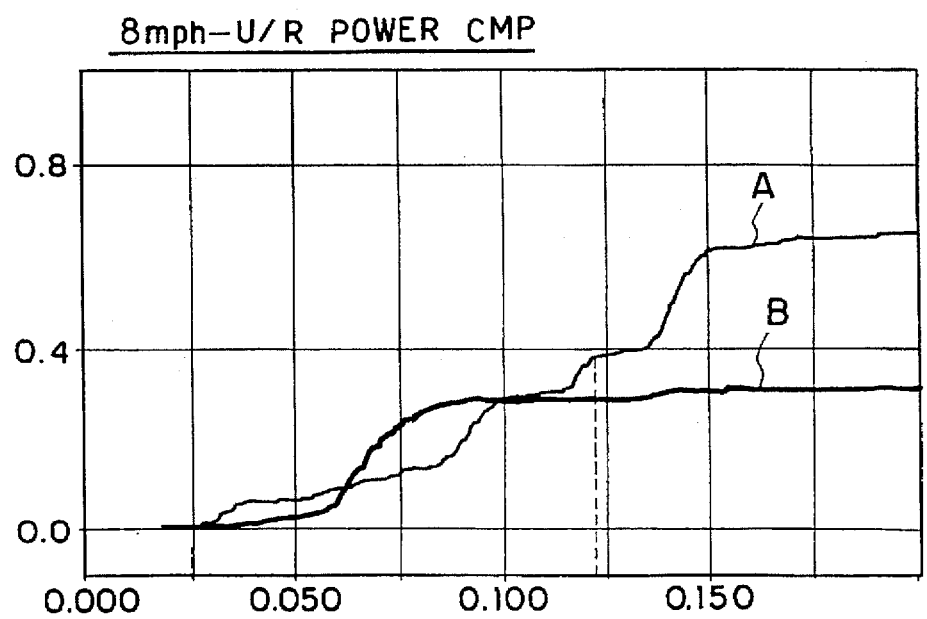
FIG. 48 is a diagram comparing a square integration waveform of an 8 mile/hour frontal collision with that of a U/R collision.
Figure 49:
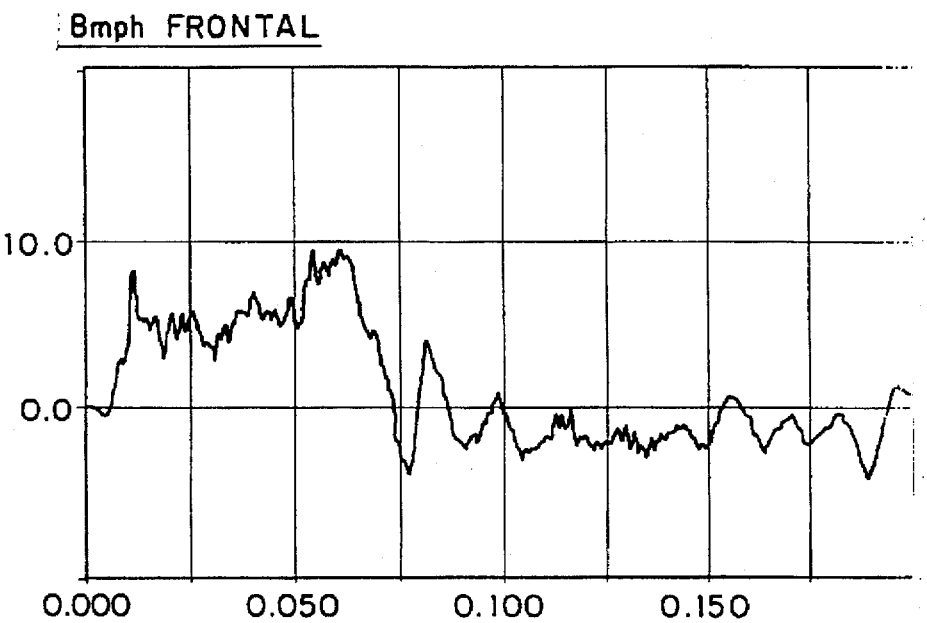
FIG. 49 is an acceleration waveform diagram of an 8 mile/hour frontal collision.
Figure 50:
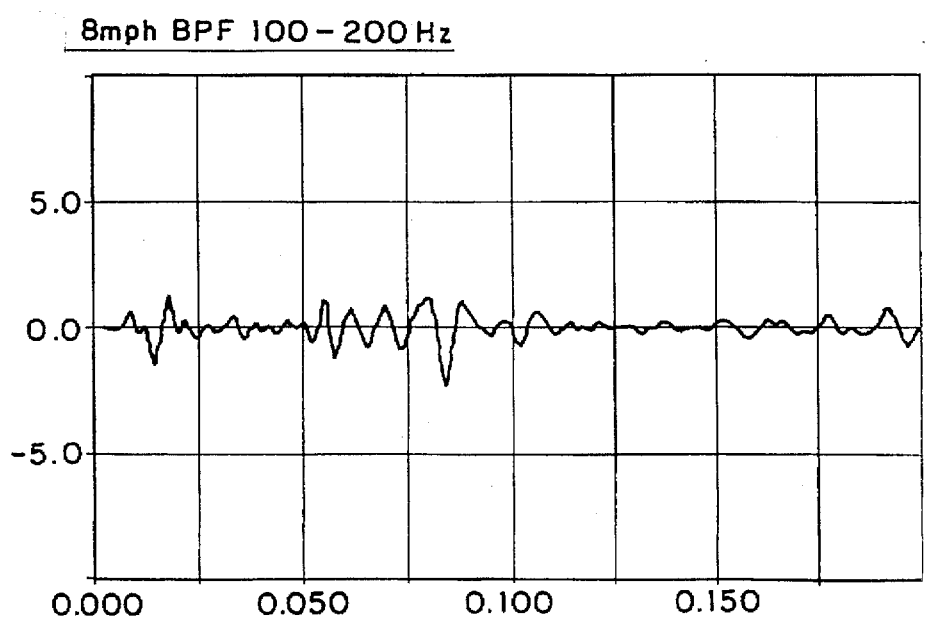
FIG. 50 is a waveform diagram of an acceleration of an 8 mile/hour frontal collision after passing through a BPF.
Figure 51:
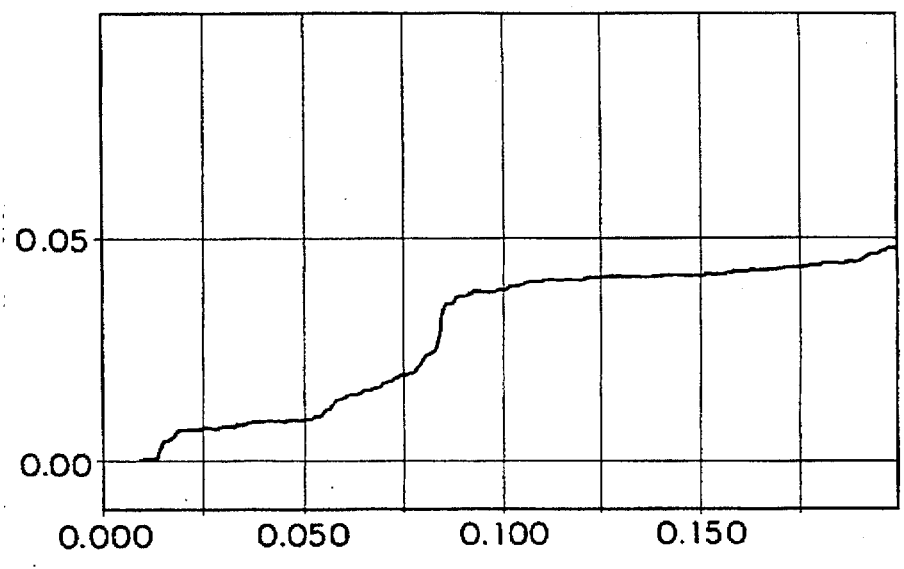
FIG. 51 is a square integration waveform diagram of the waveform shown in FIG. 50.
Figure 52:
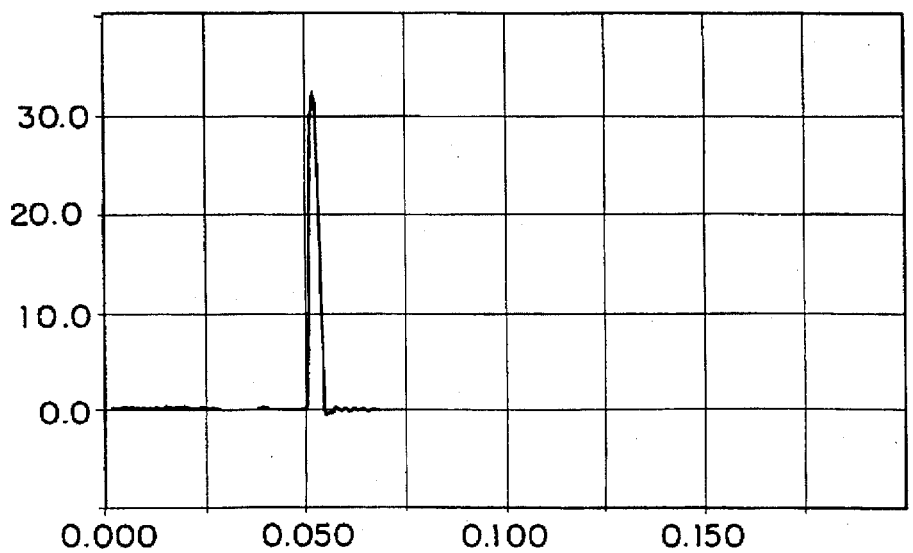
FIG. 52 is an acceleration waveform diagram of a hammer blow.
Figure 53:
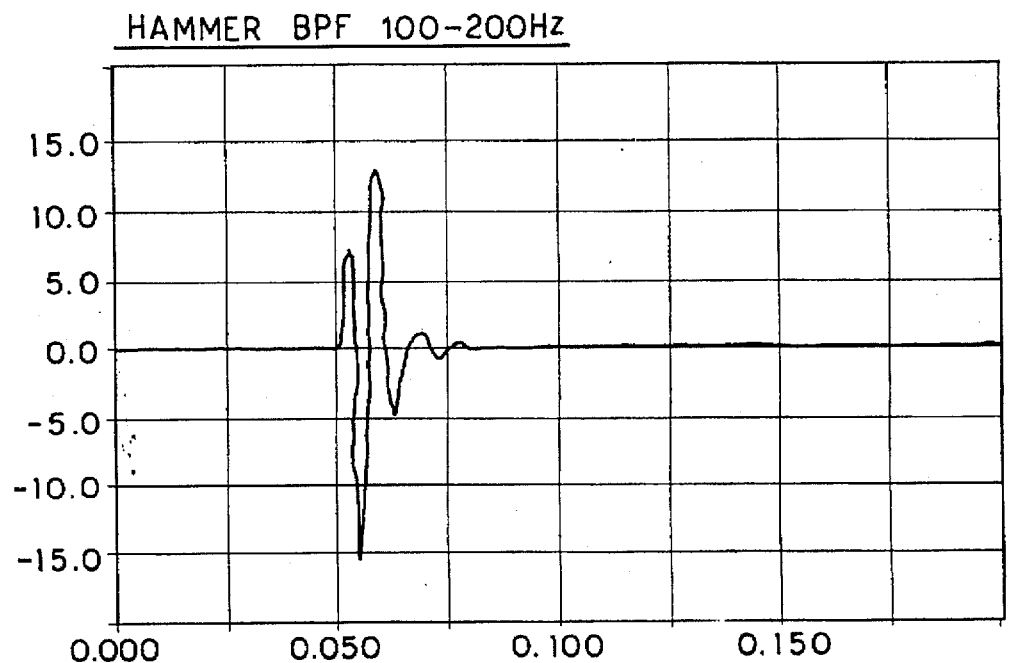
FIG. 53 is a waveform diagram of an acceleration of a hammer blow after passing through a BPF.
Figure 54:
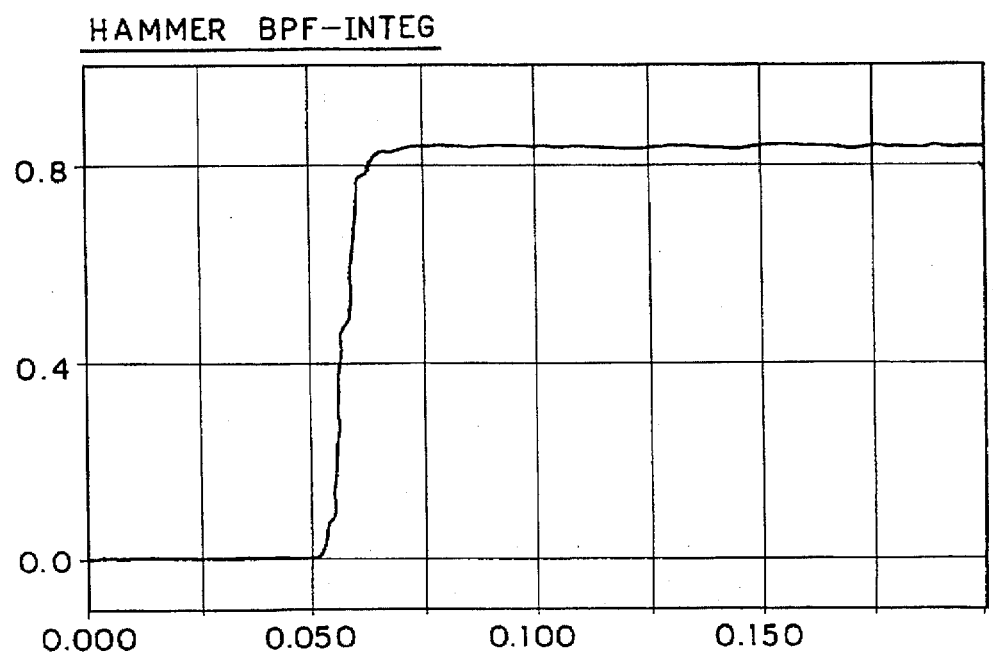
FIG. 54 is a square integration waveform diagram of the waveform shown in FIG. 53.

In the case of the acceleration waveform of the U/R shown in FIG. 41, the upper limit of the acceleration waveform after the upper limit restricting processing is restricted to 3 G mainly at and after 80 msec as shown in FIG. 6. Therefore, as shown by B in FIG. 7, in the integration in step ST106, in comparison with the integration in the case of no upper limit restriction as shown by A in FIG. 7, there is almost no difference between the two integration values up to 90 msec. Since the integration value of the 8 mile/hour frontal collision is restricted at a low value, it is possible to set the threshold value THR in step ST107 at a small value, whereby the collision determination of the U/R can be accelerated by that amount.

Figure 8:
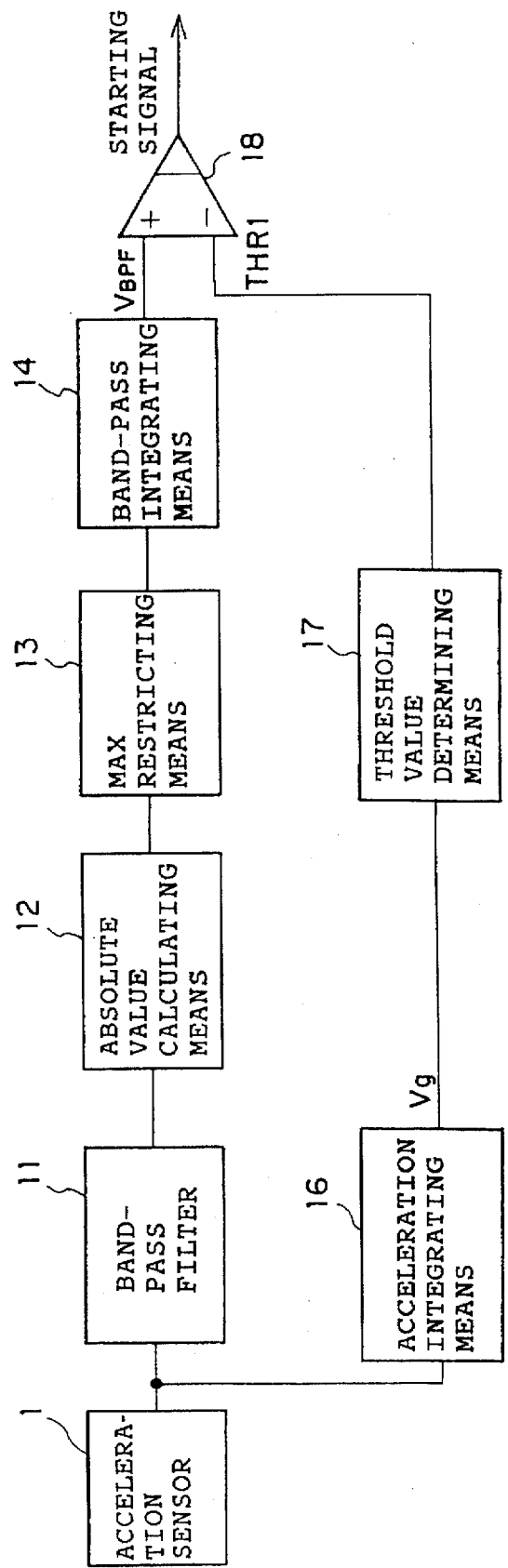
FIG. 8 is a block diagram for explaining an internal processing of a CPU according to an embodiment of the invention.

FIG. 8 is a block diagram for explaining an internal processing of the CPU3 according to other embodiment of this invention, wherein the same portion as in FIG. 2 is attached with the same notation and a duplicated explanation will be omitted. In FIG. 8, numeral 16 designates an acceleration integrating means for integrating an output signal of the acceleration sensor, numeral 17 designates a threshold value determining means for determining a first threshold value THR1 in accordance with an output signal of the acceleration integrating means, and numeral 18 designates a comparing means for comparing an output signal of the band-pass integrating means with an output signal of the threshold value determining means.

Figure 9:
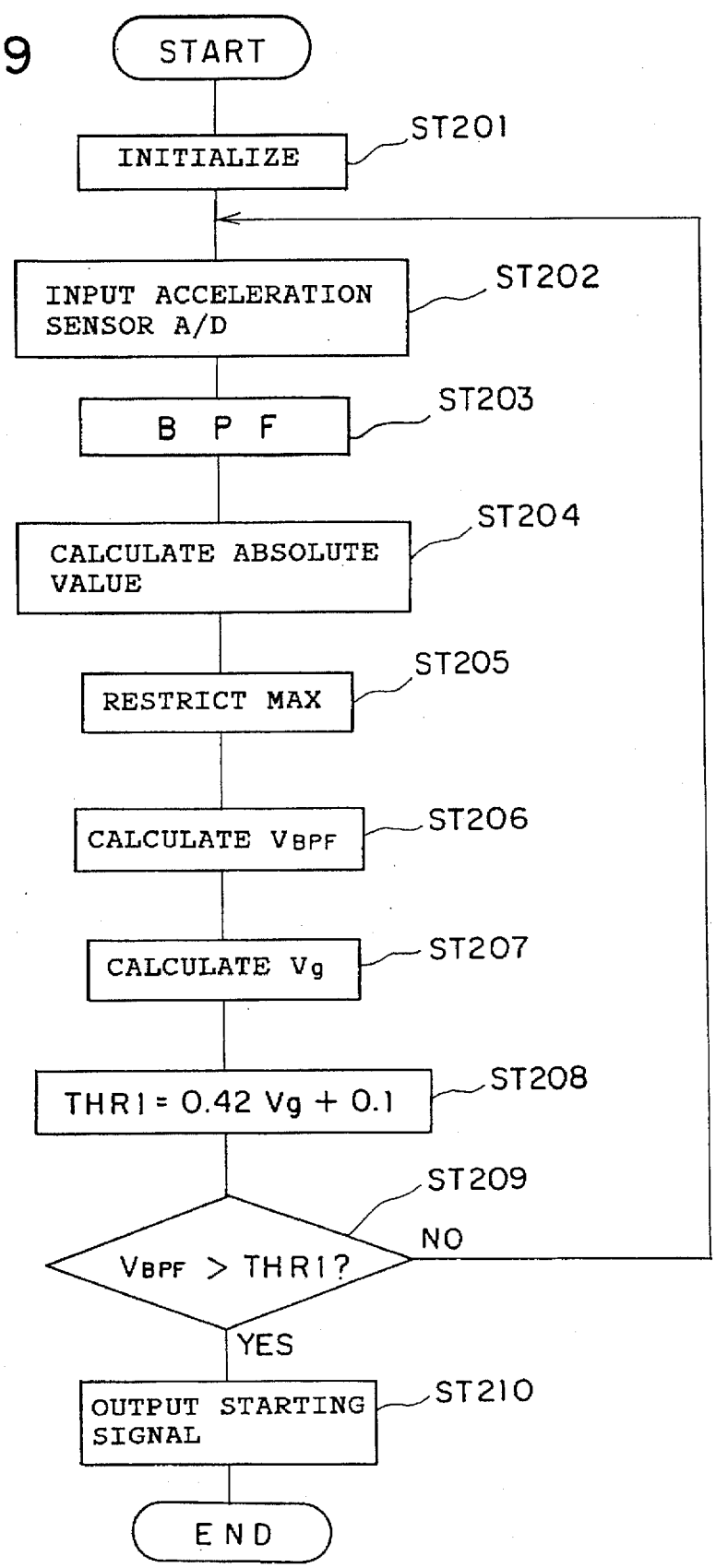
FIG. 9 is a flow chart for explaining the operation of the embodiment shown in FIG. 8.

Next, an explanation will be given of the operation in reference to a flow chart of FIG. 9. In FIG. 9, step ST201 through step ST205 are the same processing as in step ST101 through step ST105 in the flow chart of FIG. 3, and a duplicated explanation will be omitted. First, in step ST206, the operation calculates an integrated value $V_{BPF}$ (hereinafter, $V_{BPF}$) of an acceleration waveform of which upper limit has been restricted by the band-pass integrating means 14, in step ST206. In step ST207, the operation calculates an integrated value $V_g$ (hereinafter $V_g$) of an acceleration data of the acceleration sensor 1 transmitted from the input device by the acceleration integrating means 16. In step ST208, the operation calculates a first threshold value THR1 shown by the following equation, by the threshold value determining means 17.

$$THR1=0.42 \times V_g+0.17$$

In step ST209, the operation compares the integrated value $V_{BPF}$ which has been calculated in step ST206 with the first threshold value THR1 which has been calculated in step ST208. When the integrated value $V_{BPF}$ is the first threshold value THR1 or more, the operation proceeds to step ST210 wherein the operation outputs the starting signal for starting the air bag by which the processing is finished. When $V_{BPF}$ is smaller than THR1 as a result of the comparison in step ST209, the operation returns to step ST202 and continues the processing.

The calculation of $V_{BPF}$ and $V_g$ in steps ST206 and 207 is similar to the integration processing in step ST106 of the internal processing of the first embodiment, and the processing is performed wherein the integration is carried out by subtracting a certain value therefrom, and the integrated value is reset to 0 when the calculated integrated value becomes minus.

Figure 10:
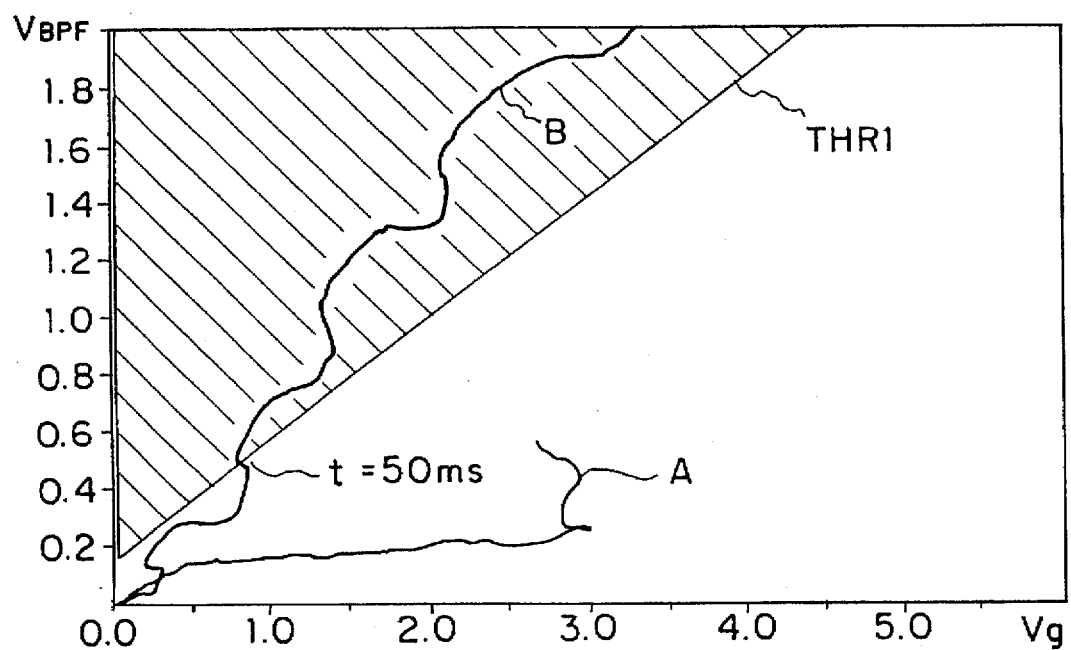
FIG. 10 is a conceptual diagram for explaining an internal processing of a CPU in the embodiment shown in FIG. 8.

FIG. 10 is a conceptual diagram for explaining the internal processing of the CPU according to the second embodiment, showing the 8 mile/hour frontal collision (A of FIG. 10) and the U/R (B of FIG. 10) wherein the abscissa is $V_g$ and the ordinate is $V_{BPF}$. The threshold value determining means 17 determines the threshold value THR1 linearly increasing in accordance with an increase in the output of the acceleration integrating means 16. Accordingly, the hatched portion in the diagram shows a region of outputting the starting signal whereby it is known that the U/R starts the device at approximately 50 msec whereas the 8 mile/hour frontal collision does not start it.

Figure 11:
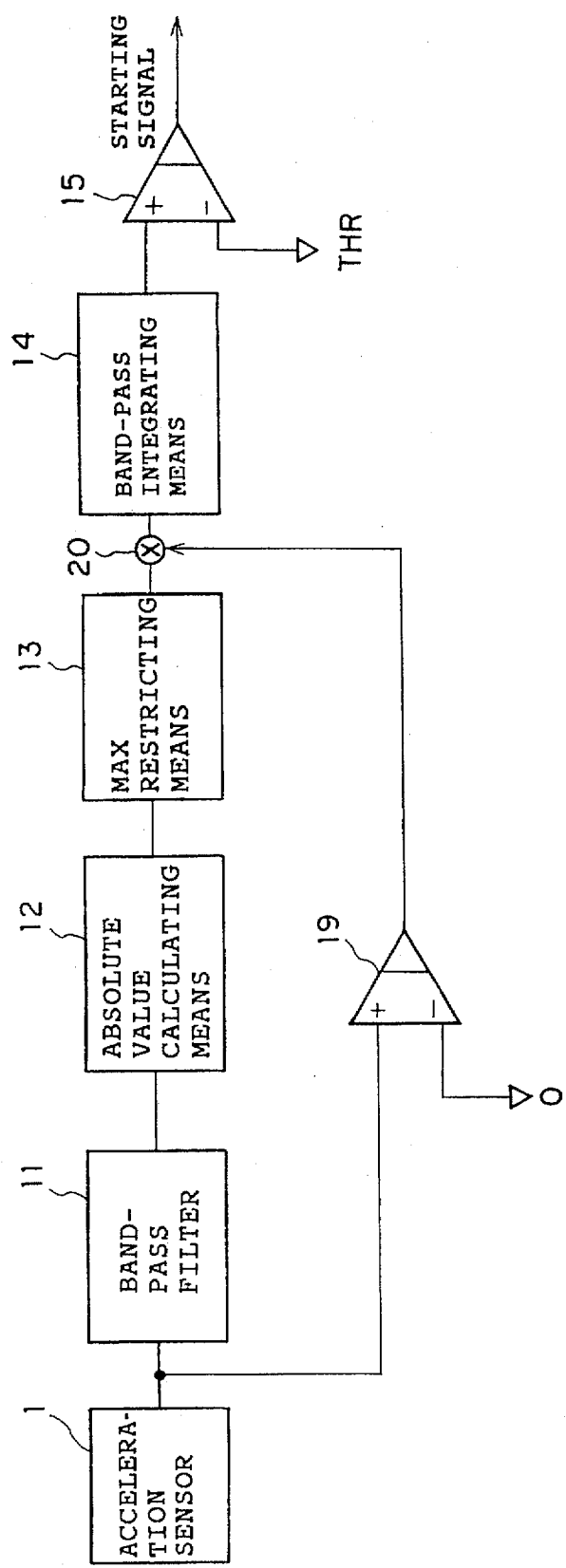
FIG. 11 is a block diagram for explaining an internal processing of a CPU according to other embodiment of this invention.

FIG. 11 is a block diagram for explaining the internal processing of the CPU according to other embodiment of this invention, wherein the same portion as in FIG. 2 is attached with the same notation and a duplicated explanation will be omitted. In FIG. 11, numeral 19 designates a comparing means for comparing an output signal of the acceleration sensor 1 with a predetermined threshold value, and numeral 20 designates a multiplying means for supplying an output signal of the upper limit restricting means 13 to the band-pass integrated means 14 when an output signal of the acceleration sensor 1 is an acceleration in the decelerating direction.

Figure 12:
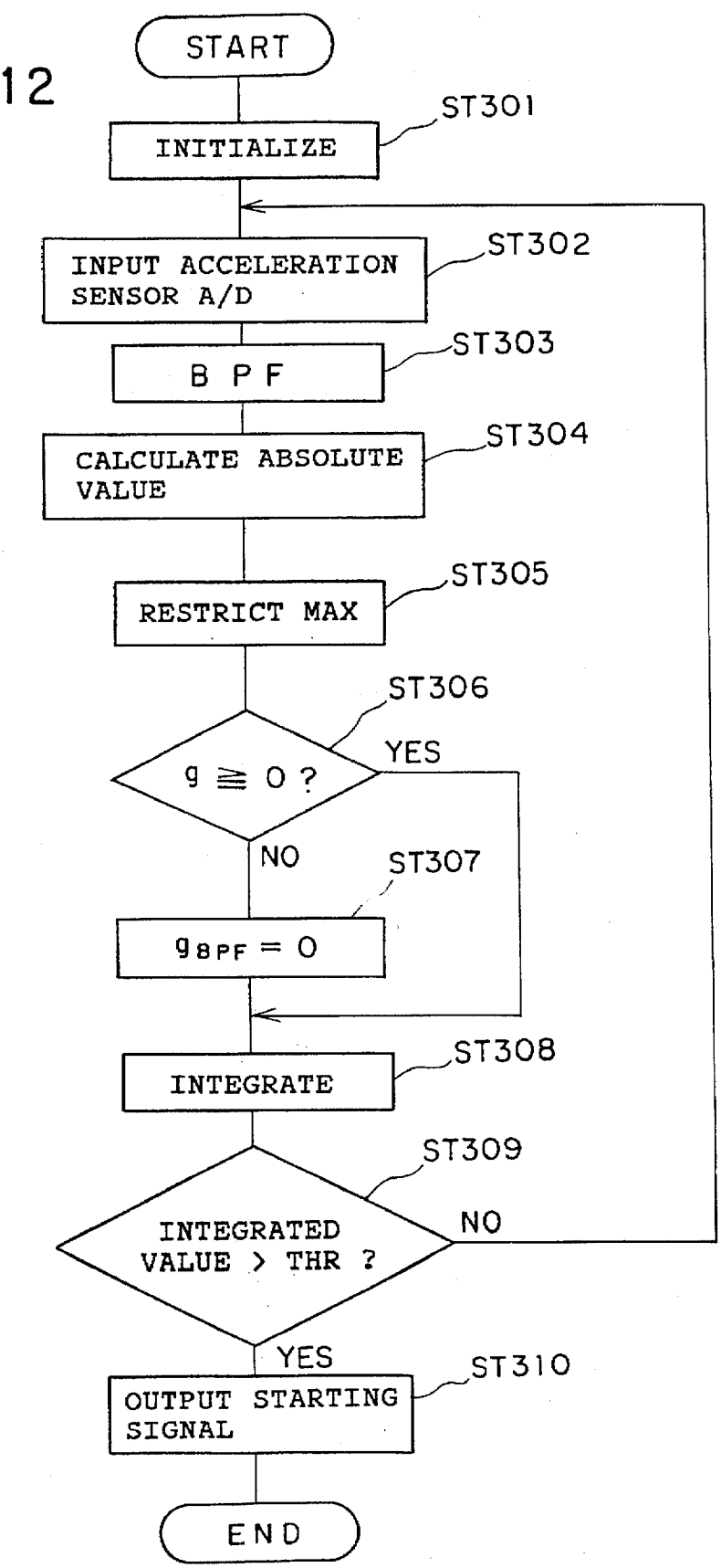
FIG. 12 is a flow chart for explaining the operation of the embodiment shown in FIG. 11.

Next, an explanation will be given of the operation in reference to a flow chart of FIG. 12. In FIG. 12, step ST301 to step ST305 are the same processing as in step ST101 through step ST105 in FIG. 3, and therefore, the explanation will be omitted. In step ST306, the operation determines whether an acceleration data g of the acceleration sensor 1 transmitted from the input device 2 is equal to or larger than 0 by the comparing means 19, and proceeds to step ST308 when it is equal to or larger than 0, whereas the operation proceeds to step ST307 when it is less than 0. In step ST307, the operation resets the acceleration data $g_{BPF}$ to 0, and in step ST308, the operation calculates an integrated value $V_{BPF+}$ (hereinafter, $V_{BPF+}$) of an acceleration data $g_{BPF}$ (hereinafter, $g_{BPF}$). In step ST309, the operation compares $V_{BPF+}$ with a predetermined threshold value THR, and proceeds to step ST310 when the operation determines that $V_{BPF+}$ is larger, and the processing is finished by outputting the starting signal for starting the air bag. In step ST309, when $V_{BPF+}$ is not larger than THR, the operation returns to step ST302 and continues the processing.

An explanation will be given to the integration processing in step ST308. In step ST308, the operation performs the integration calculation after the operation subtracts a certain value from the acceleration waveform of which upper limit has been restricted in step ST305, and performs a processing wherein the integrated value is reset to 0 when the calculated integrated value becomes minus.

Figure 13:
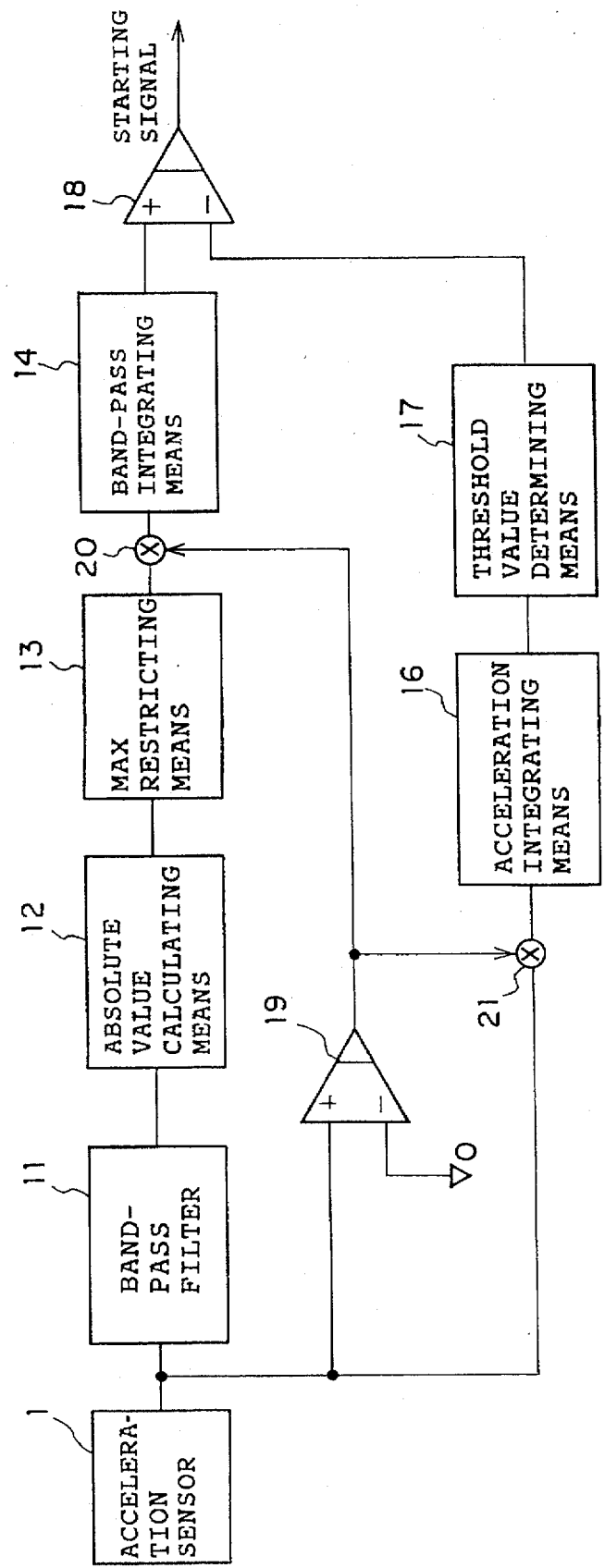
FIG. 13 is a block diagram for explaining an internal processing of a CPU by other embodiment of this invention.

FIG. 13 is a block diagram for explaining the internal processing of the CPU according to other embodiment of this invention, wherein the same portion as in FIGS. 8 and 11 are attached with same notation and a duplicated explanation will be omitted. In FIG. 13, numeral 21 designates a multiplying means for supplying an output signal of the acceleration sensor 1 to the acceleration integrating means 16 when it is an acceleration in the deceleration direction.

Figure 14:
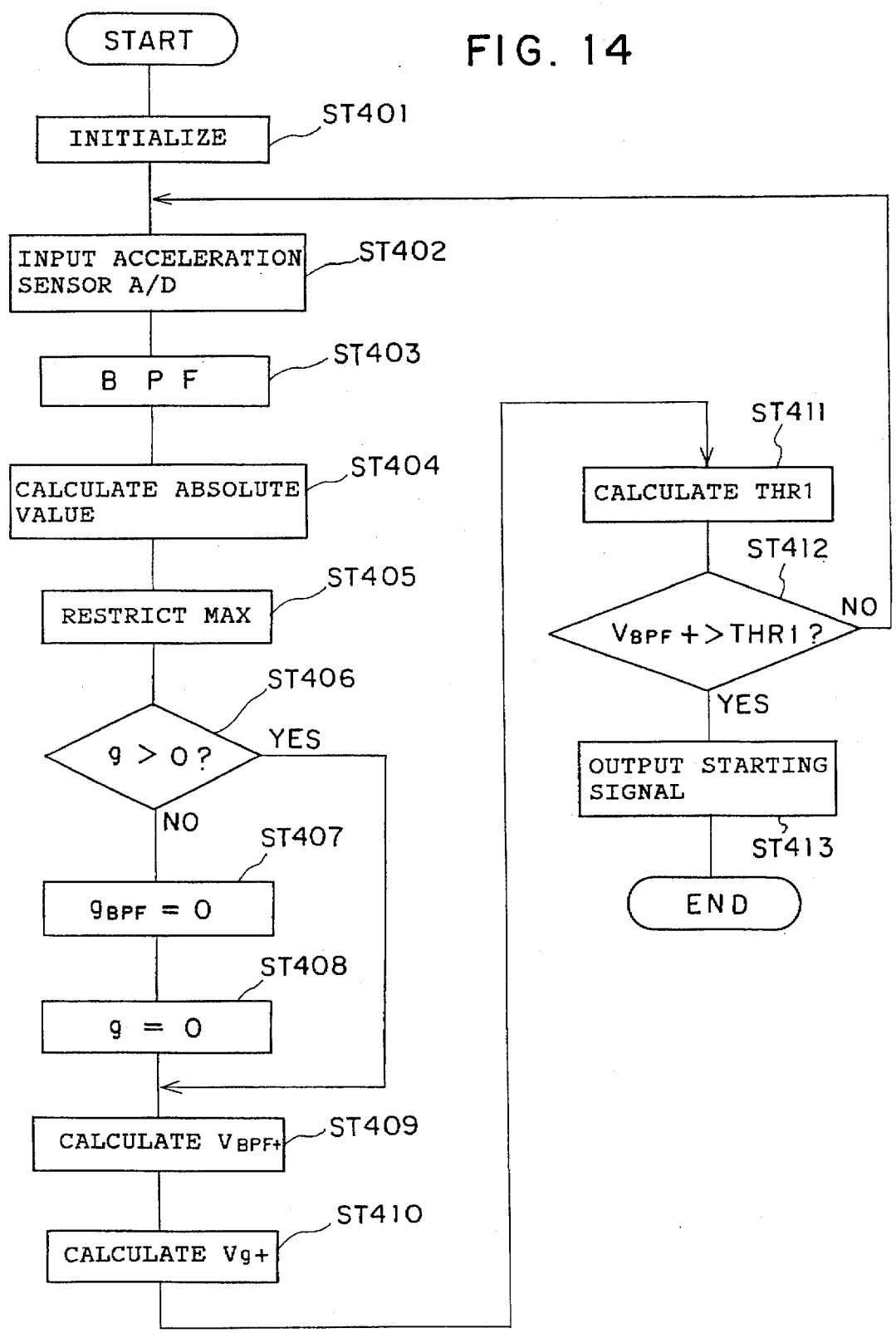
FIG. 14 is a flow chart for explaining the operation of the embodiment shown in FIG. 13.

Next, an explanation will be given of the operation in reference to a flow chart of FIG. 14. In FIG. 14, step ST401 through step ST405 are the same processing as in step ST101 through step ST105 in FIG. 3 and therefore, the explanation will be omitted. In step ST406, the operation determines whether the acceleration data g of the acceleration sensor 1 transmitted from the input device 2 is equal to or larger than 0, and proceeds to step ST409 when it is not less than 0, whereas when it is less than 0, the operation proceeds to step ST407. In step ST407, the operation resets the acceleration data $g_{BPF}$ of which upper limit has been restricted in step ST405, and renders the acceleration data g to 0 in step ST408. In step ST409, the operation calculates the integrated value $V_{BPF+}$ by the band-pass integrating means 14, and in step ST410, the operation calculates the integrated value $V_{g+}$ by the acceleration integrating means 16. In step ST411, the operation calculates a first threshold value THR1 shown by the following equation by way of the threshold value determining means 17.

$$THR1=0.42 \times V_{g+}+0.1$$

In step ST412, the operation compares the integrated value $V_{BPF+}$ which has been calculated in step ST409 with the first threshold value THR1 which has been calculated in step ST411, and proceeds to ST413 when $V_{BPF+}$ is equal to or larger than THR1 and outputs the starting signal for starting the air bag whereby the processing is finished. When $V_{BPF+}$ is less than THR1 as a result of comparison in step ST412, the operation returns to step ST402 and continues the processing.

The calculation of $V_{BPF+}$ and $V_{g+}$ in steps ST409 and 410 is similar to the integration processing in step ST106 of the internal processing of the first embodiment, and a processing is performed wherein the integration is carried out by subtracting a certain value therefrom and the operation resets the integrated value to 0 when the calculated integrated value becomes minus.

Figure 15:
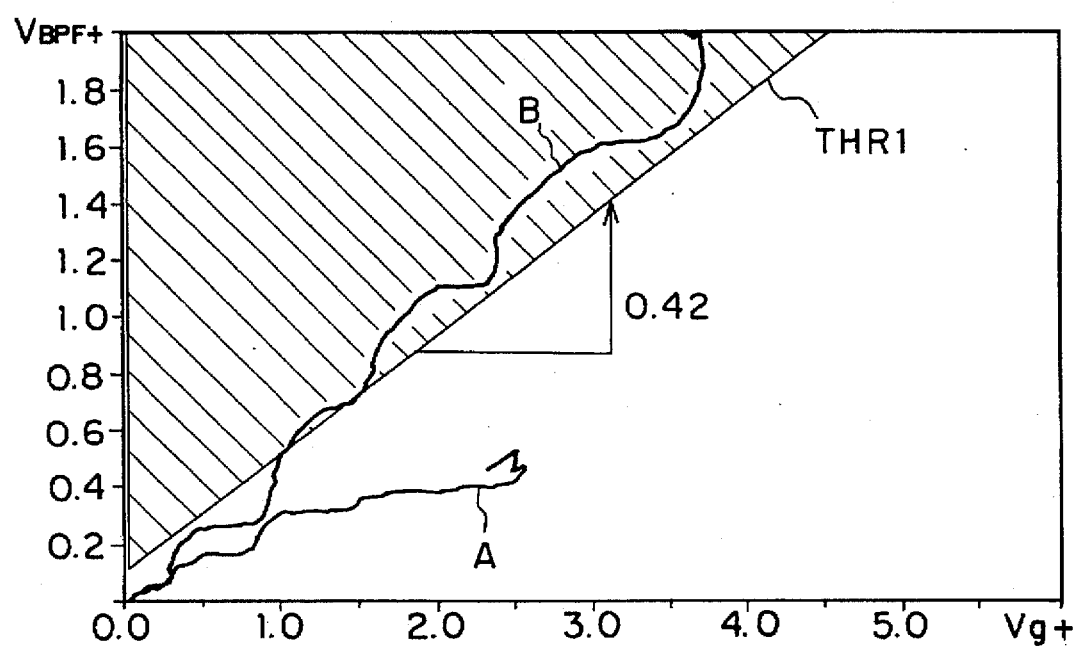
FIG. 15 is a conceptual diagram for explaining an internal processing of a CPU in the embodiment shown in FIG. 13.

FIG. 15 is a conceptual diagram for explaining the internal processing of the CPU according to this embodiment, showing the 8 mile/hour frontal collision (A of FIG. 15) and the U/R (B of FIG. 15) wherein the abscissa is $V_{g+}$ and the ordinate is $V_{BPF+}$. With respect to the 8 mile/hour frontal collision of A in FIG. 15, in comparison with the 8 mile/hour frontal collision of A in FIG. 10, a jumping-up at the later half of collision is clearly reduced whereby it is known that the possibility of starting by the 8 mile/hour frontal collision by this jumping-up is reduced.

Figure 16:
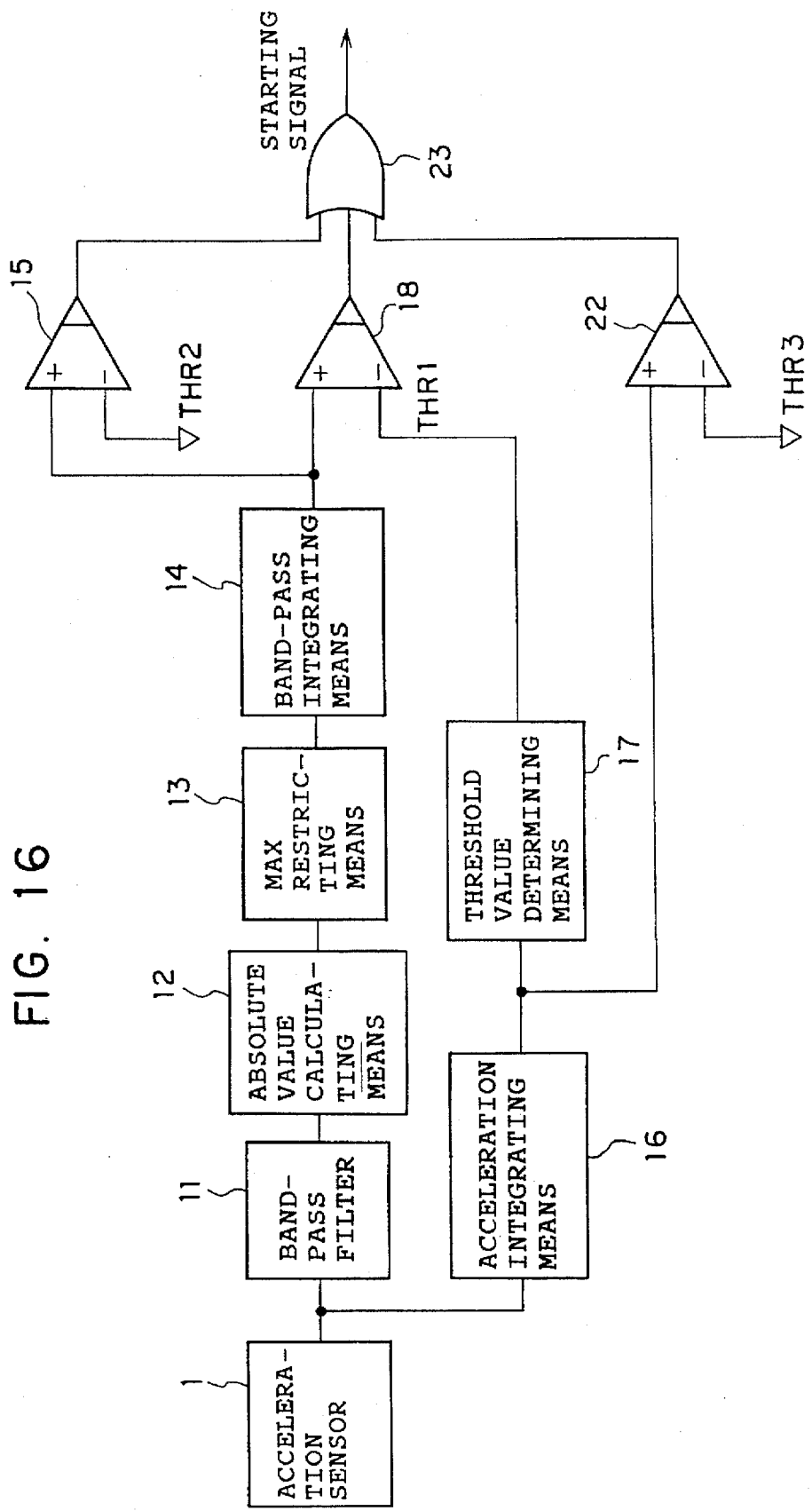
FIG. 16 is a block diagram for explaining an internal processing of a CPU by other embodiment of this inventions.

FIG. 16 is a block diagram for explaining the internal processing of the CPU according to other embodiment of this invention, wherein the same portion as in FIGS. 2 and 8 is attached with the same notation and a duplicated explanation will be omitted. In FIG. 16, numeral 22 designates a comparing means for comparing the output signal of the acceleration integrating means 16 with a predetermined threshold value THR3, and numeral 23 designates an OR logic means for inputting output signals of the comparing means 15, 18 and 22.

Figure 17:
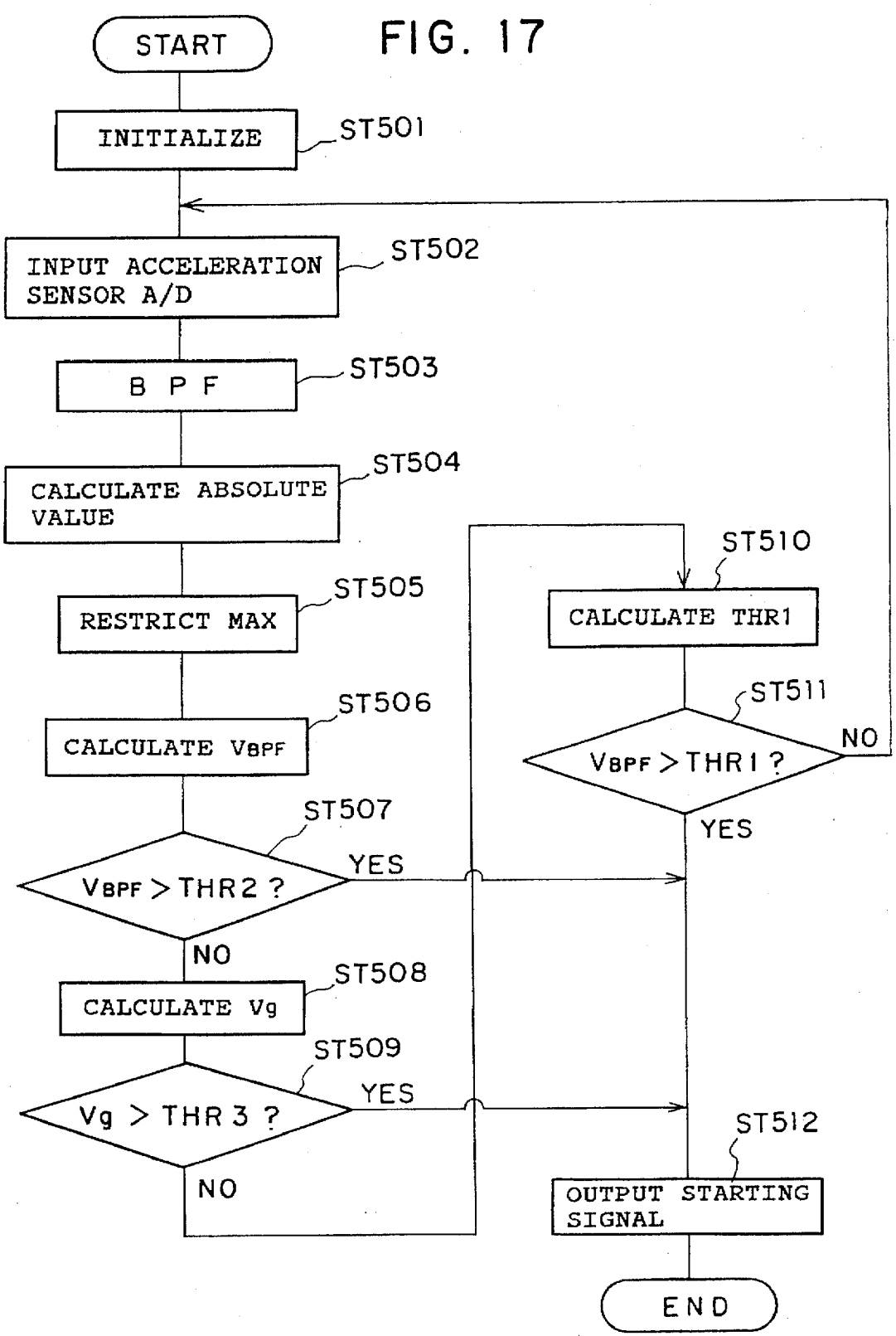
FIG. 17 is a flow chart for explaining the operation of the embodiment shown in FIG. 16.

Next, an explanation will be given of the operation in reference to a flow chart of FIG. 17. In FIG. 17, step ST501 through step ST505 are the same processing as in step ST101 through step ST105 in FIG. 3 and therefore, the explanation will be omitted. In step ST506, the operation calculates the integrated value $V_{BPF}$ of an acceleration waveform of which upper limit has been restricted in step ST505 by the band-pass integrating means 14. In step ST507, the operation compares $V_{BPF}$ with a predetermined second threshold value THR2, and proceeds to step ST512 when the operation determines that $V_{BPF}$ is larger, and proceeds to step ST508 in a case other than the above. In step ST508, the operation calculates the integrated value $V_g$ of an acceleration data of the acceleration sensor 1 transmitted from the input device 2 by the acceleration integrating means 16. In step ST509, the operation compares $V_g$ with a predetermined third threshold value THR3, proceeds to step ST512 when the operation determines that $V_g$ is larger, and proceeds to step ST510 in the case other than the above. In step ST510, the operation calculates a first threshold value THR1 shown by the following equation by the threshold value determining means 17.

$$THR1 = 0.42 \times V_{g+} + 0.17$$

In step ST511, the operation compares the integrated value $V_{BPF}$ which has been calculated in step ST506 with the first threshold value THR1 which has been calculated in step ST510, proceeds to step ST512 when $V_{BPF}$ is equal to or larger than THR1, and outputs the starting signal for starting the air bag whereby the processing is finished. When $V_{BPF}$ is less than THR1 as a result of comparison in step ST511, the operation returns to step ST502 and continues the processing.

Figure 18:
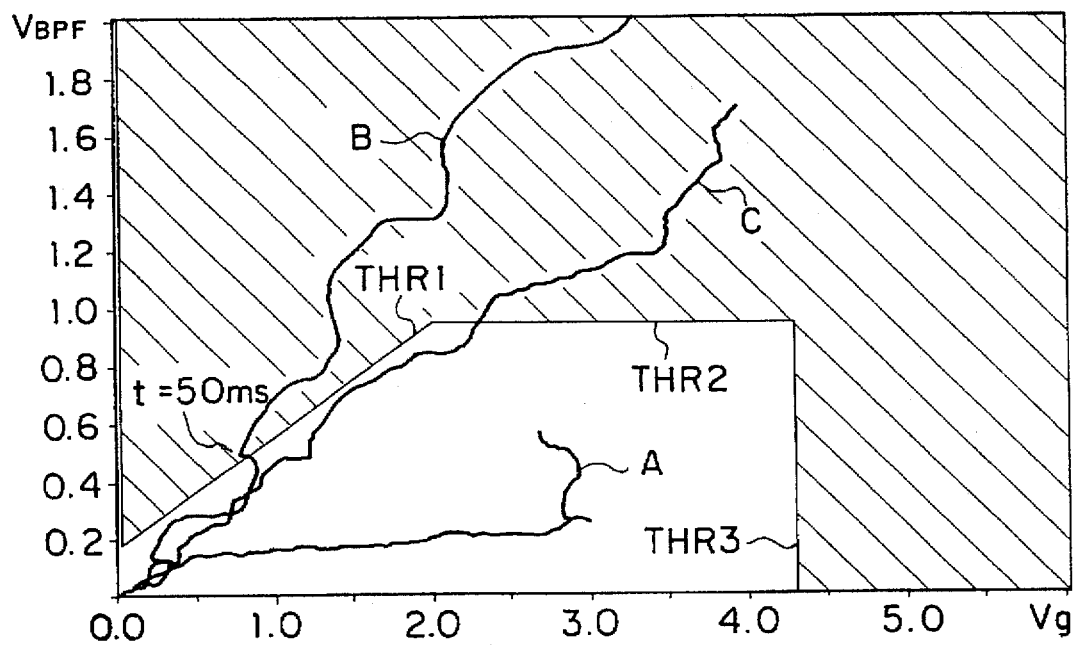
FIG. 18 is a conceptual diagram for explaining an internal processing of a CPU in the embodiment shown in FIG. 16.

FIG. 18 is a conceptual diagram for explaining the internal processing of the CPU according to the fifth embodiment, showing the 8 mile/hour frontal collision (A of FIG. 18) and the U/R (B and C of FIG. 18) wherein the abscissa is $V_g$ and the ordinate is $V_{BPF}$. In FIG. 18, the hatched portion shows the region of outputting the starting signal, whereby it is known that the U/R of B of FIG. 18 is started after approximately 50 msec, whereas the 8 mile/hour frontal collision of A of FIG. 18 is not started. Further, as in the U/R of C of FIG. 18, even when $V_{BPF}$ does not exceed THR1, the device is started when $V_{BPF}$ exceeds THR2, whereby the starting signal can certainly be outputted.

Figure 19:
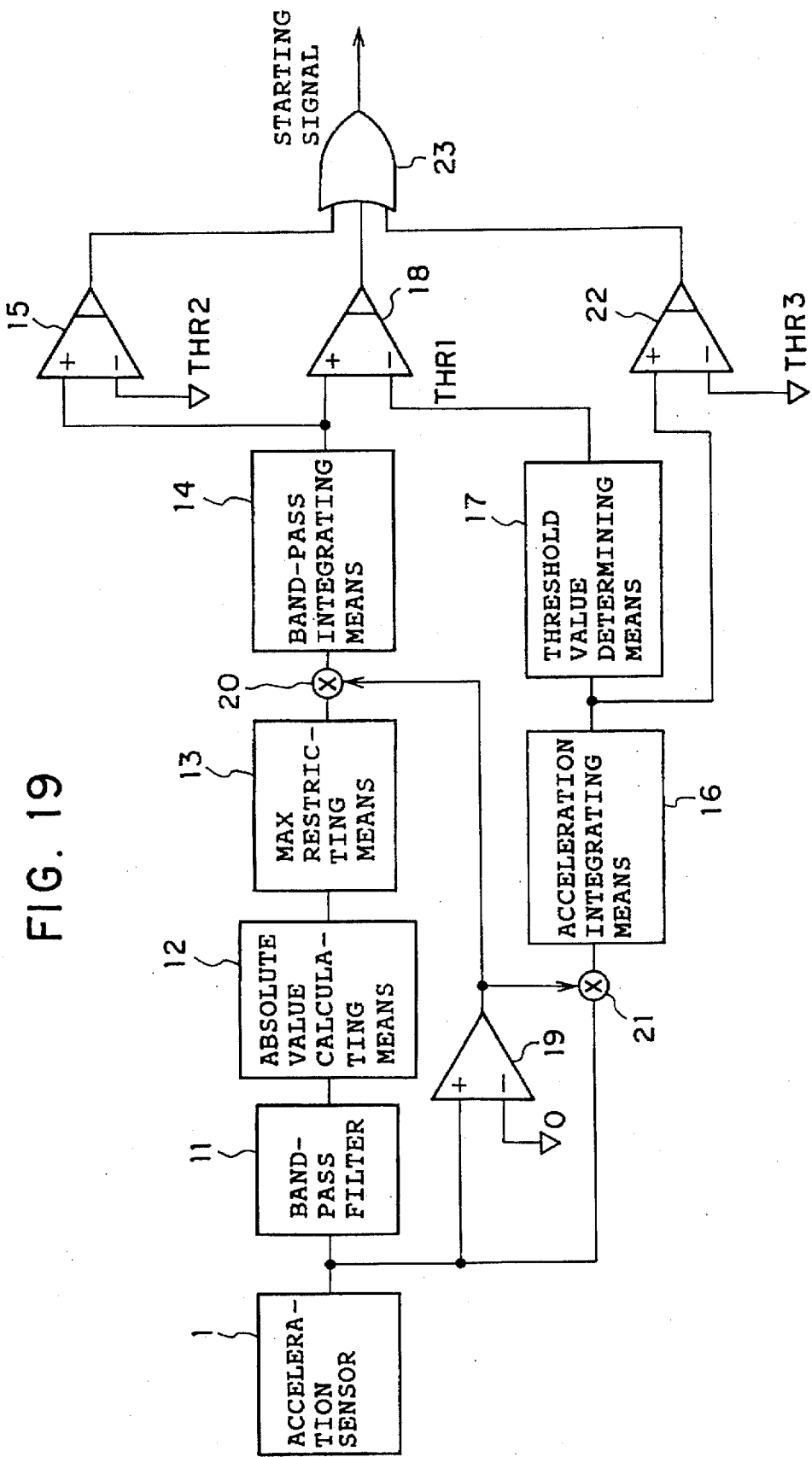
FIG. 19 is a block diagram for explaining an internal processing of a CPU showing other embodiment of this invention.
Figure 20:
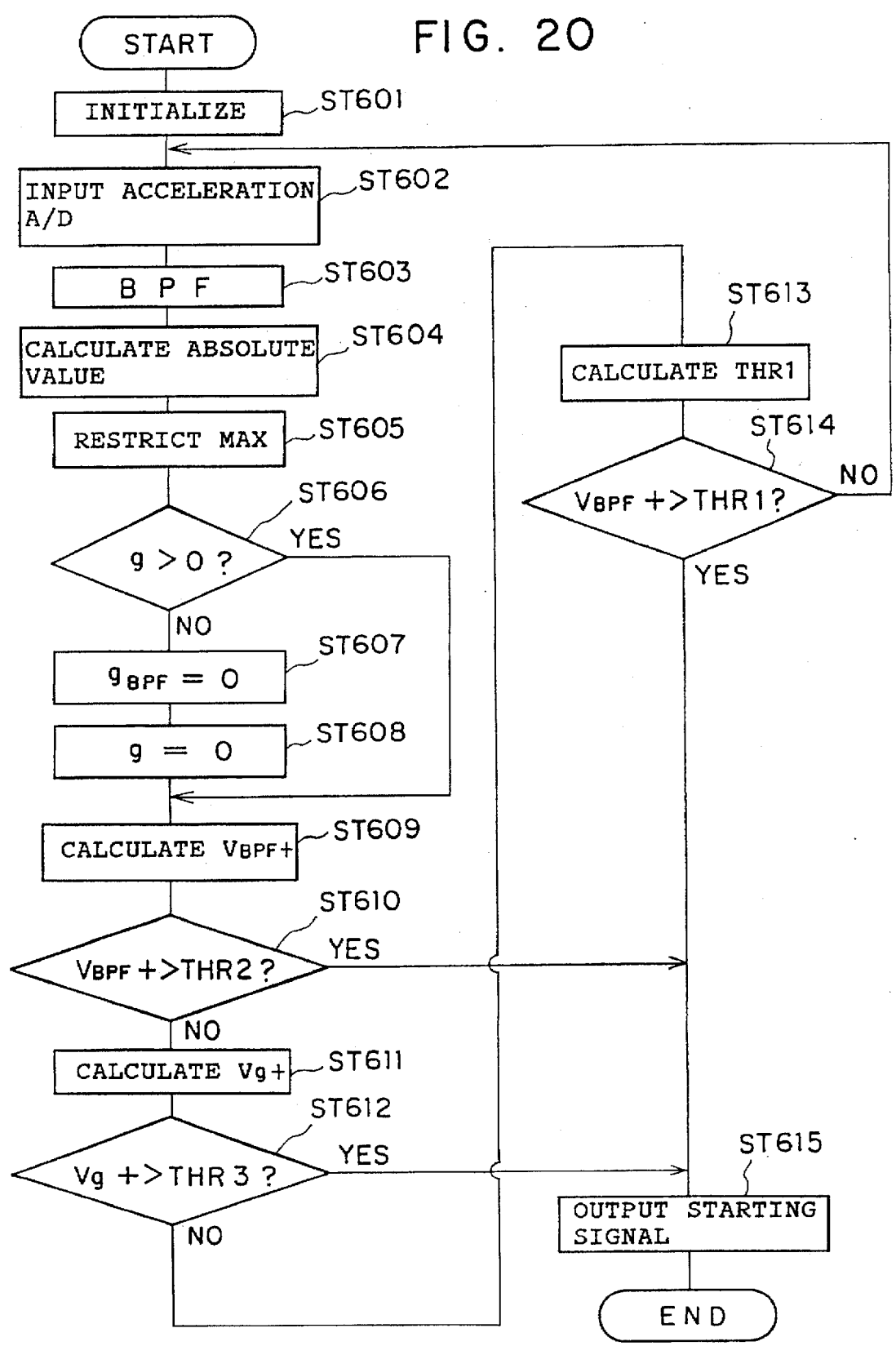
FIG. 20 is a flow chart for explaining the operation of the embodiment shown in FIG. 19.

FIG. 19 is a block diagram for explaining the internal processing of the CPU according to other embodiment of this invention, wherein the same portion as in FIG. 2, 13 and 16 is attached with same notation and a duplicated explanation will be omitted.

Figure 23:
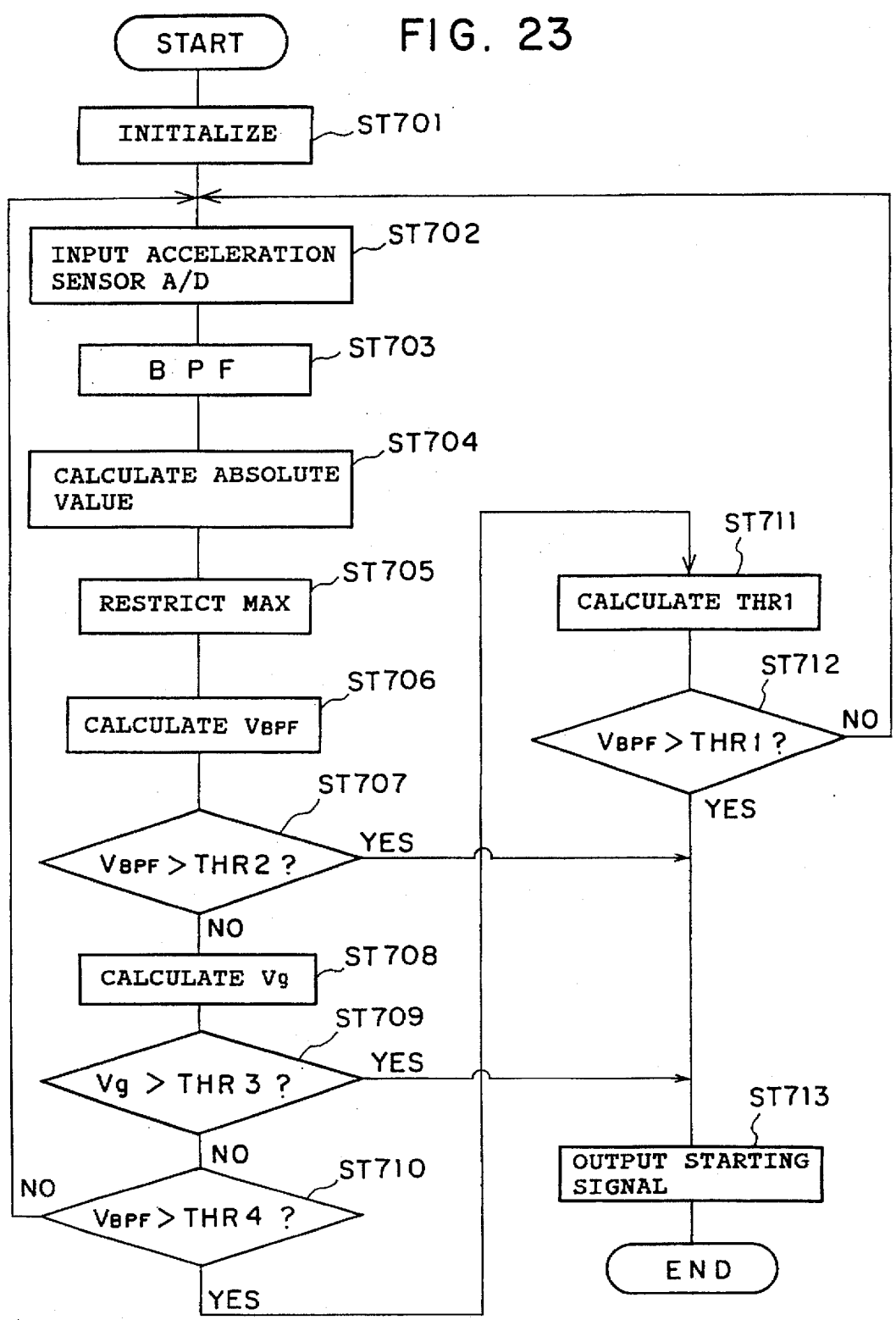
FIG. 23 is a flow chart for explaining the operation of the embodiment shown in FIG. 22.

Next, an explanation will be given of the operation in reference to a flow chart of FIG. 23. In FIG. 23, step ST601 through step ST605 are the same processing as in step ST101 through step ST105 in FIG. 3 and therefore, the explanation will be omitted. In step ST606, the operation determines whether the acceleration data g of the acceleration sensor 1 transmitted from the input device 2 is equal to or larger than 0, and proceeds to step ST609 when it is equal to or larger than 0. When it is less than 0, the operation proceeds to step ST609 after the operation renders the acceleration data $g_{BPF}$ and g to be 0 in steps ST607 and 608. In step ST609, the operation calculates the integrated value $V_{BPF+}$ of $g_{BPF}$ by the band-pass integrated means 14. In step ST610, the operation compares $V_{BPF+}$ with a predetermined second threshold value THR2, proceeds to step ST615 when the operation determines that $V_{BPF+}$ is larger and proceeds to step ST611 in a case other than the above. In step ST611, the operation calculates the integrated value $V_{g+}$ of g by the acceleration integrating means 16. In step ST612, the operation compares $V_{g+}$ with a predetermined third threshold value THR3, proceeds to step ST615 when the operation determines that $V_{g+}$ is larger, and proceeds to step ST613 in a case other than the above. In step ST613, the operation calculates a first threshold value THR1 shown by the following equation by the threshold determining means 17.

$$THR1 = 0.3 \times V_{g+} + 0.17$$

In step ST614, the operation compares the integrated value $V_{BPF+}$ which has been calculated in step ST606 with the first threshold value THR1 which has been calculated in step ST613, proceeds to step ST615 and outputs the starting signal for starting the air bag whereby the processing is finished. When $V_{BPF+}$ is less than THR1 as a result of comparison in step ST614, the operation returns to step ST602 and continues the processing.

The calculation of $V_{BPF+}$ and $V_{g+}$ in steps ST609 and 611 is similar to the integration processing in step ST106 of the internal processing of the first embodiment, and performs a processing wherein the integration calculation is carried out after a certain value has been subtracted therefrom and the integrated value is reset to 0 when the calculated integrated value becomes minus.

Figure 21:
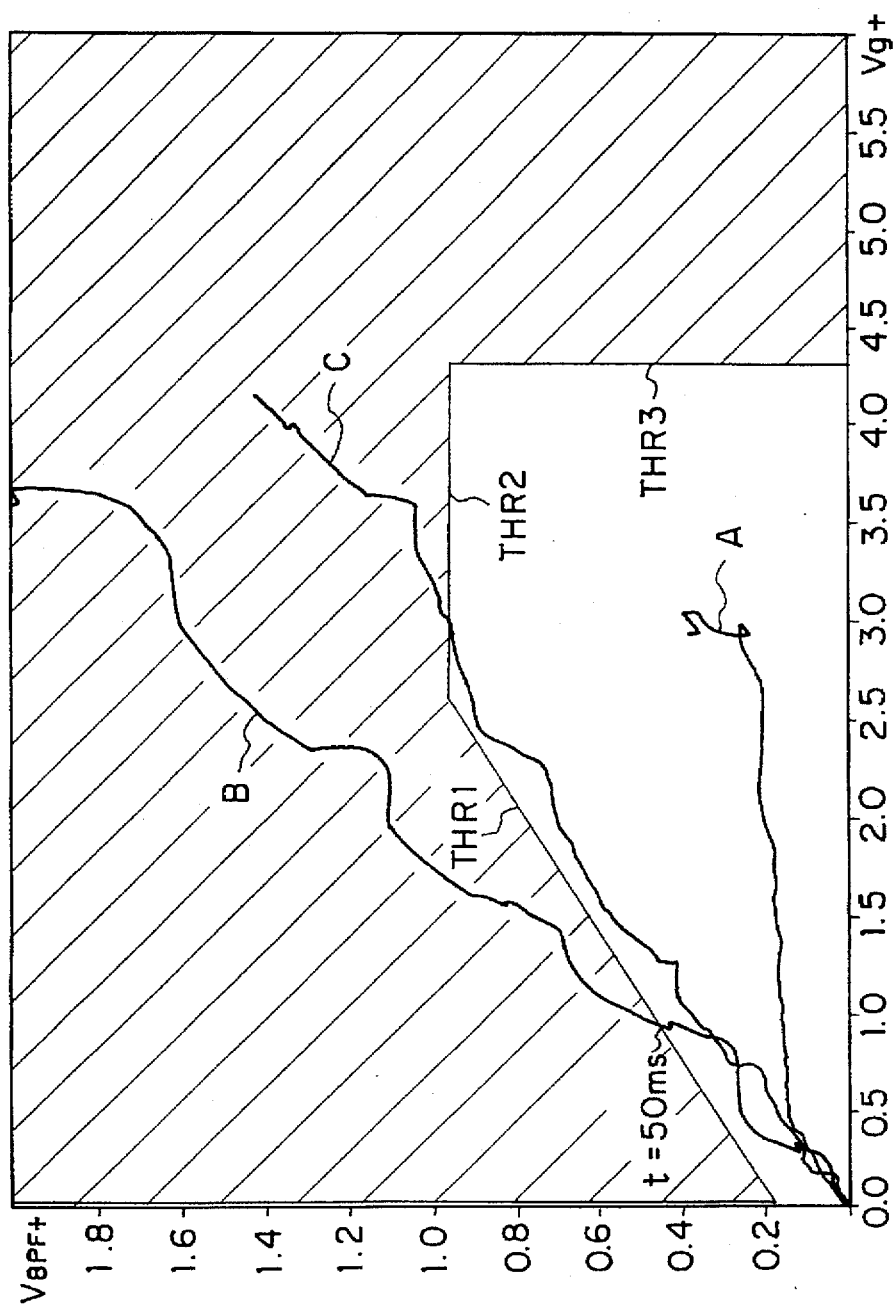
FIG. 21 is a conceptual diagram for explaining an internal processing of a CPU in the embodiment shown in FIG. 19.

FIG. 21 is a conceptual diagram for explaining the internal processing of the CPU according to the sixth embodiment, showing the 8 mile/hour frontal collision (A of FIG. 21) and the U/R (B and C of FIG. 21) wherein the abscissa is $V_{g+}$ and the ordinate is $V_{BPF+}$. In FIG. 21, the hatched portion shows a region of outputting the starting signal, wherein it is known that the U/R of B starts the device after approximately 50 msec whereas the 8 mile/hour frontal collision of A does not start the device. Further, even when $V_{BPF+}$ does not exceeds THR1 as in the U/R of C, it starts the device when $V_{BPG+}$ exceeds THR2, whereby the starting signal can certainly be outputted. Accordingly, this embodiment has an effect similar to that in the fifth embodiment. Further, the operation calculates the integrations $V_{g+}$ and the $V_{BPF+}$ of g only in the decelerating direction in the processing of step ST606, the jumping-up at the later half of collision of the 8 mile/hour frontal collision (A of FIG. 21) is alleviated and there is little possibility whereby the 8 mile/hour frontal collision starts the device by the jumping-up. Accordingly, this embodiment has an effect similar to that in the fourth embodiment.

Figure 22:
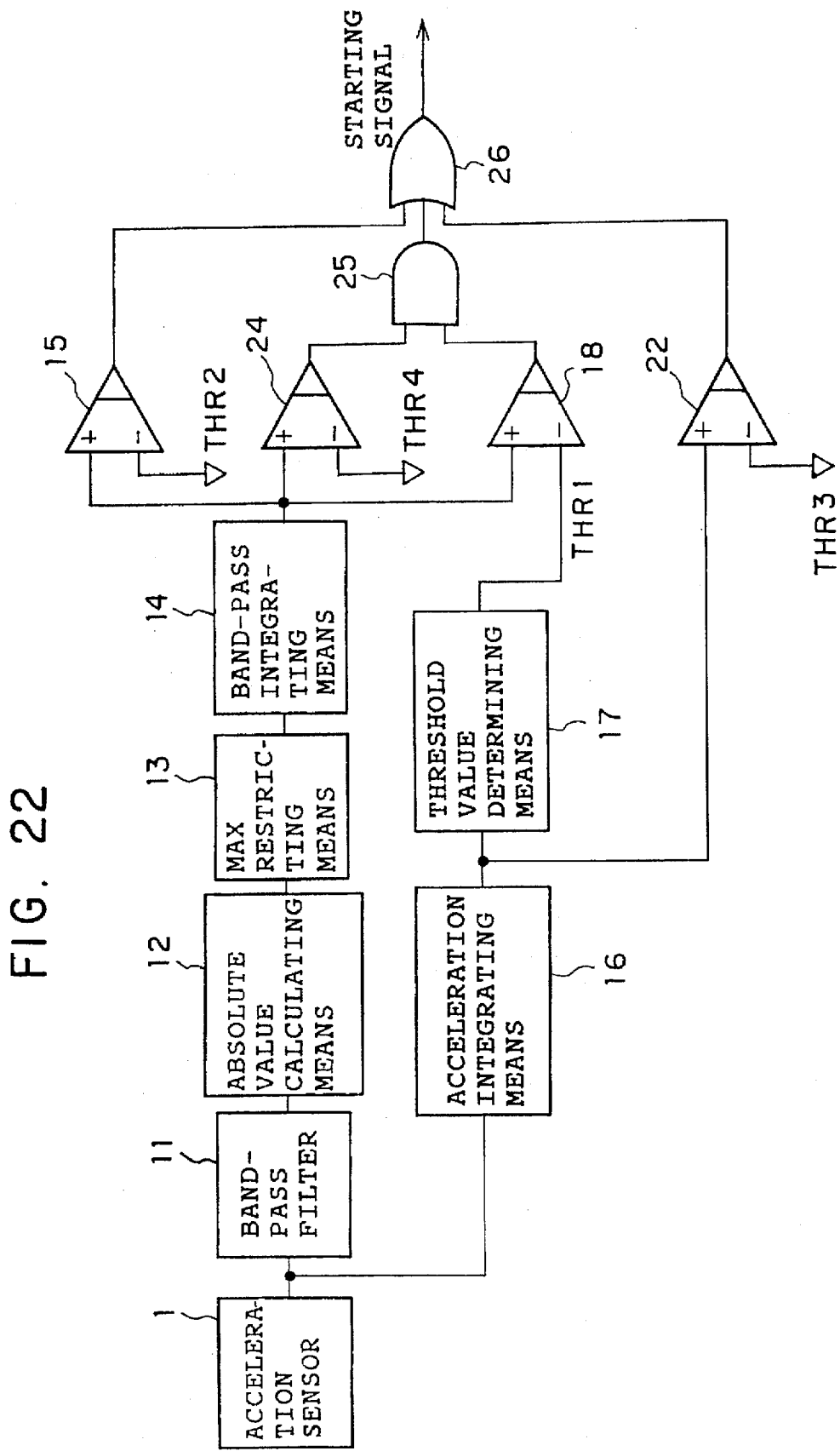
FIG. 22 is a block diagram for explaining an internal processing of a CPU in other embodiment of this invention.

FIG. 22 is a block diagram for explaining the internal processing of the CPU according to other embodiment of this invention, wherein the same portion as in FIGS. 2 and 16 is attached with the same notation and a duplicated explanation will be omitted. In FIG. 22, numeral 24 designates a comparing means for comparing an output signal of the band-pass integrating means 14 with a predetermined fourth threshold value THR4, numeral 25 designates an AND logic means for inputting output signals of the comparing means 18 and 24, and numeral 26 designates an OR logic means for inputting output signals of the comparing means 15 and 22 and the AND logic means 25.

Next, an explanation will be given of the operation in reference to a flow chart of FIG. 23. In FIG. 23, step ST701 through step ST705 are the same processing as in step ST101 through step ST105 in FIG. 3 and the explanation will be omitted. In step ST706, the operation calculates the integrated value $V_{BPF}$ of an acceleration waveform of which upper limit has been restricted in step ST705 by the band-pass integrating means 14. In step ST707, the operation compares $V_{BPF}$ with a predetermined second threshold value THR2, proceeds to step ST713 when the operation determines that $V_{BPF}$ is larger, and proceeds to step ST708 in a case other than the above. In step ST708, the operation calculates the integrated value $V_g$ of the acceleration data of the acceleration sensor 1 transmitted from the input device 2. In step ST709, the operation compares $V_g$ with a predetermined third threshold value THR3, proceeds to step ST713 when the operation determines that $V_g$ is larger, and proceeds to step ST710 in a case other than the above. In step ST710, the operation compares $V_{BPF}$ with a predetermined threshold value THR4, proceeds to step ST711 when the operation determines that $V_{BPF}$ is larger, and returns to step ST702 in a case other than the above, and continues the processing. Here, THR4 is smaller than THR2. In step ST711, the operation calculates a first threshold value THR1 shown by the following equation by the threshold value determining means 17.

$$THR1 = 0.42 \times V_g + 0.1$$

In step ST712, the operation compares the integrated value $V_{BPF}$ which has been calculated in step ST706 with the first threshold value THR1 which has been calculated by step ST711, proceeds to step ST713 when $V_{BPF}$ is equal to or larger than THR1, and outputs the starting signal for starting the air bag whereby the processing is finished. When $V_{BPF}$ is less than THR1 as a result of comparison in step ST712, the operation returns to a step ST702 and continues the processing.

The calculation of $V_{BPF}$ and $V_g$ in steps ST706 and 708 is similar to the integration processing in step ST106 of the internal processing in the first embodiment, which performs a processing wherein the integration calculation is carried out by subtracting a certain value therefrom and resets the integrated value to 0 when the calculated integrated value becomes minus.

Figure 24:
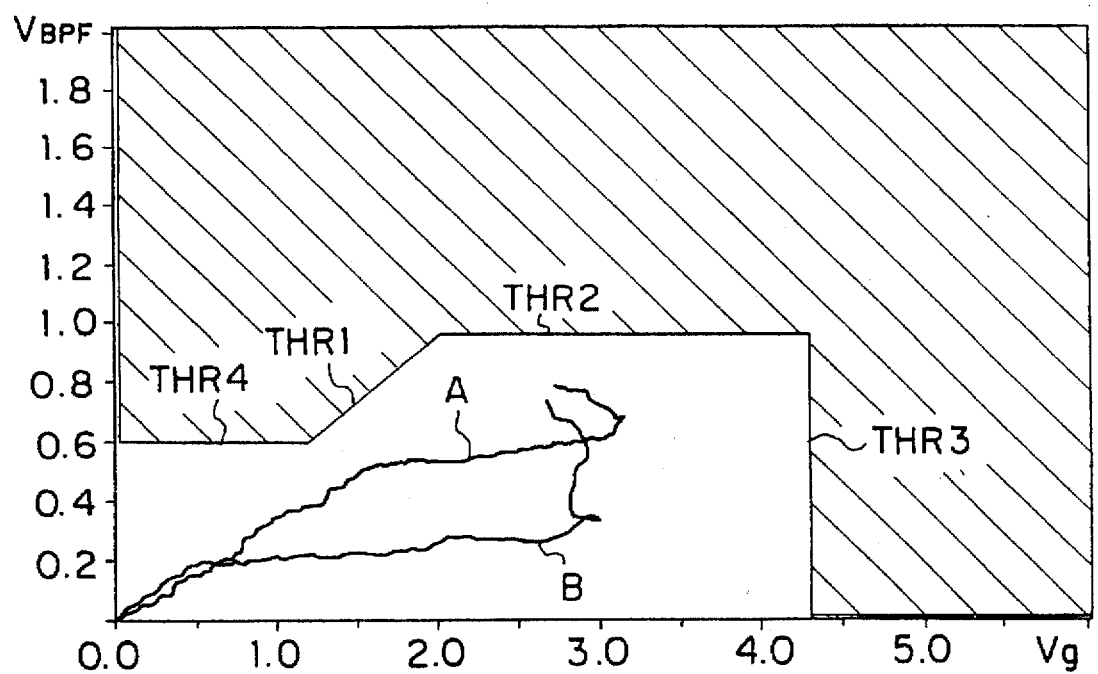
FIG. 24 is a conceptual diagram for explaining an internal processing of a CPU in the embodiment shown in FIG. 22.

FIG. 24 is a conceptual diagram for explaining the internal processing of the CPU according to the seventh embodiment, showing the 8 mile/hour frontal collision (A and B of FIG. 24) wherein the abscissa is $V_g$ and the ordinate is $V_{BPF}$. In FIG. 24, the hatched portion shows a region of outputting the starting signal, whereby it is known that both A and B of FIG. 24 do not start the device with composure when $V_g$ is small by introducing THR4.

Figure 25:
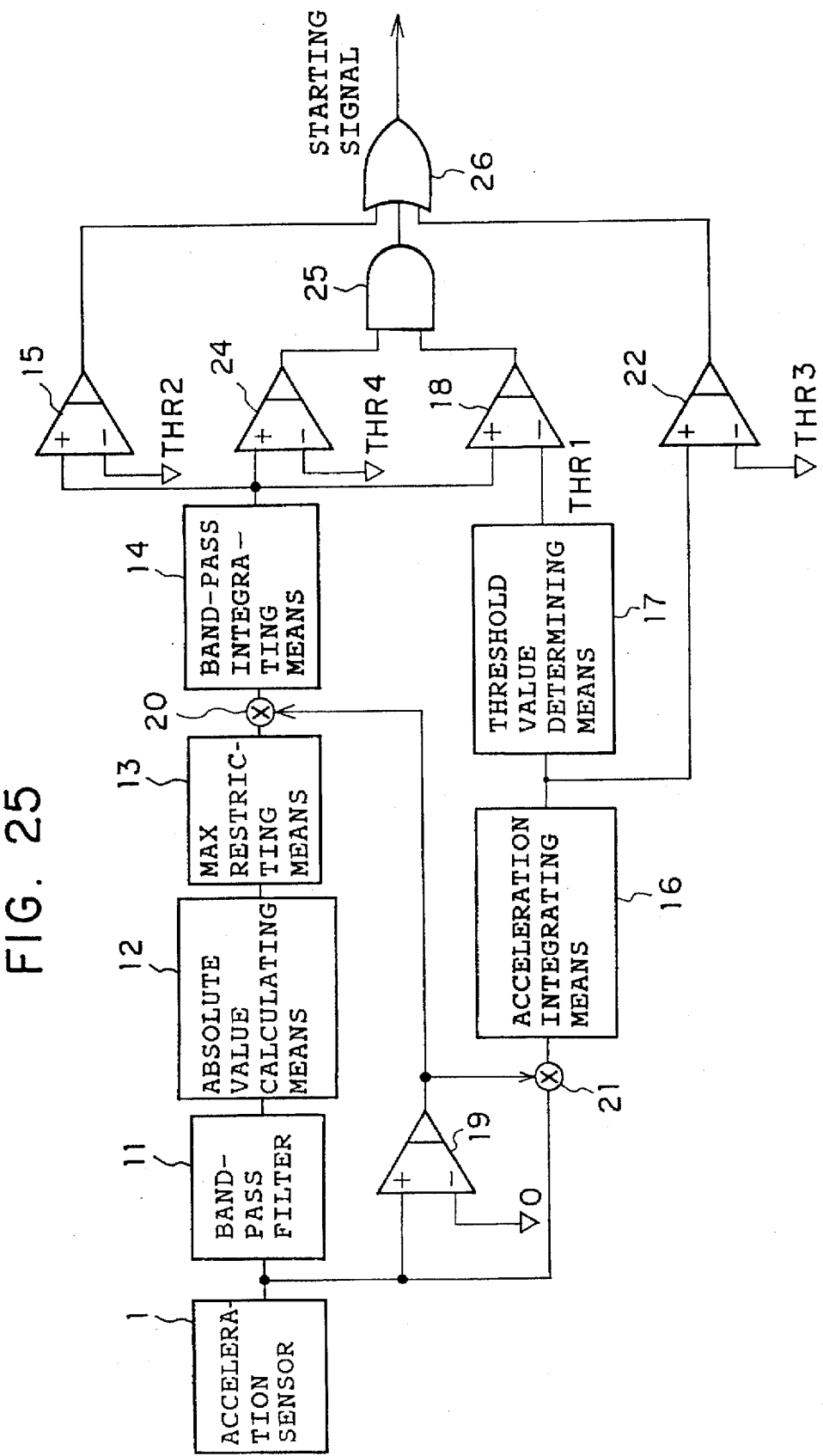
FIG. 25 is a block diagram for explaining an internal processing of a CPU showing other embodiment of this invention.

FIG. 25 is a block diagram for explaining the internal processing of the CPU according to other embodiment of this invention, wherein the same portion as in FIGS. 2, 16, 19 and 22 is attached with the same notation and a duplicated explanation will be omitted.

Figure 26:
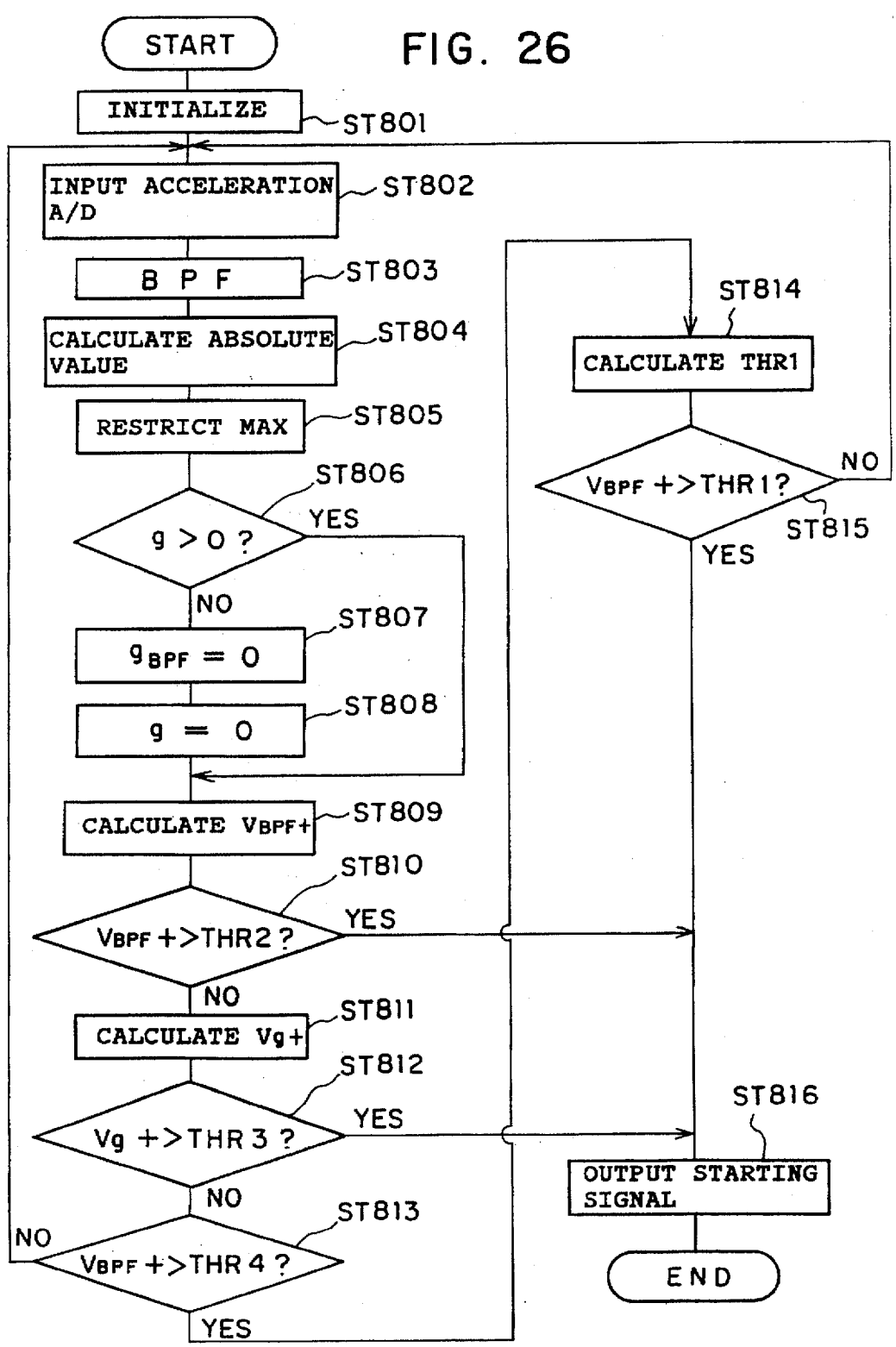
FIG. 26 is a flow chart for explaining the operation of the embodiment shown in FIG. 25.

Next, an explanation will be given the operation in reference, to a flow chart of FIG. 26. In FIG. 26, step ST801 through step ST805 are the same processing as step ST101 through step ST105 in FIG. 3 and therefore, the explanation will be omitted. In step ST806, the operation determines whether the acceleration data g of the acceleration sensor 1 transmitted from the input device 2 is equal to or larger than 0, and proceeds to step ST809 when g is equal to or larger than 0. When it is less than 0, the operation proceeds to step ST809 after rendering the acceleration data $g_{BPF}$ and g to 0 in steps ST807 and 808. In step ST809, the operation calculates the integrated value $V_{BPF+}$ of $g_{BPF}$ by the band-pass integrating means 14. In step ST810, the operation compares $V_{BPF+}$ with a predetermined second threshold value THR2, proceeds to step ST816 when the operation determines that $V_{BPF+}$ is larger, and proceeds to step ST811 in a case other than the above. In step ST811, the operation calculates the integrated value $V_{g+}$ of g by the acceleration integrating means 16. In step ST812, the operation compares $V_{g+}$ with a predetermined third threshold value THR3 by the comparing means 22, proceeds to step ST816 when the operation determines that $V_{g+}$ is larger, and proceeds to step ST813 in a case other than the above. In step ST813, the operation compares $V_{BPF+}$ with a predetermined threshold value THR4 by the comparing means 24, proceeds to step ST814 when the operation determines that $V_{BPF+}$ is larger, and returns to step ST802 in a case other than the above. Here, THR4 is smaller than THR2. In step ST814, the operation calculates a first threshold value by the threshold value determining means 17.

$$THR1 = 0.3 \times V_{g+} + 0.17$$

In step ST815, the operation compares the integrated value $V_{BPF+}$ which has been calculated in step ST809 with the first threshold value THR1 which has been calculated in step ST814 by the comparing means 18, proceeds to step ST816 when $V_{BPF+}$ is larger than THR1 and starts the starting signal for starting the air bag whereby the processing is finished. When $V_{BPF+}$ is smaller than THR1 as a result of comparison in step ST815, the operation returns to step ST802 and continues the processing.

The calculation of $V_{BFP+}$ and $V_{g+}$ in steps ST809 and 811 is similar to the integration processing in step ST106 of the internal processing of the first embodiment, which performs a processing wherein the integration calculation is carried out by subtracting a certain value therefrom and the integrated value is reset to 0 when the calculated integrated value becomes minus.

Figure 27:
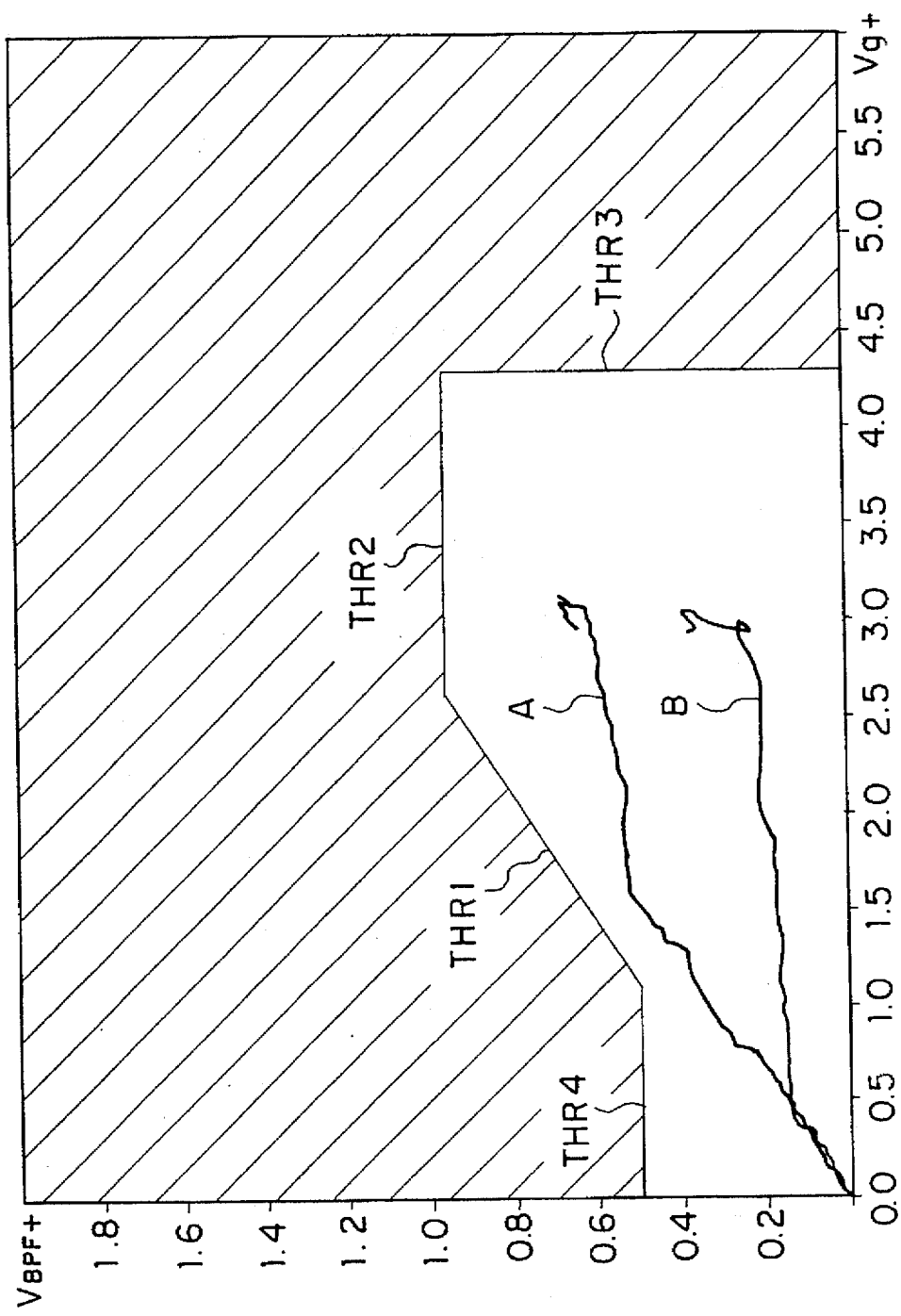
FIG. 27 is a conceptual diagram for explaining an internal processing of a CPU in the embodiment shown in FIG. 25.

FIG. 27 is a conceptual diagram for explaining the internal processing of the CPU according to the eighth embodiment, showing the 8 mile/hour frontal collision (A and B of FIG. 27) wherein the abscissa is $V_{g+}$ and the ordinate is $V_{BPF+}$. In FIG. 27, the hatched portion shows a region of outputting the starting signal, wherein it is known that both A and B do not start the device with composure when $V_{g+}$ is small, by introducing the fourth threshold value THR4. Accordingly, this embodiment has an effect similar to that of the sixth embodiment. Further, this embodiment has an effect similar to the fourth embodiment, the integrated value of g or $V_{g+}$ and the integrated value of $g_{BPF}$ or $V_{BPF+}$ are calculated only in the decelerating direction by the processing of the comparing means 19.

Figure 28:
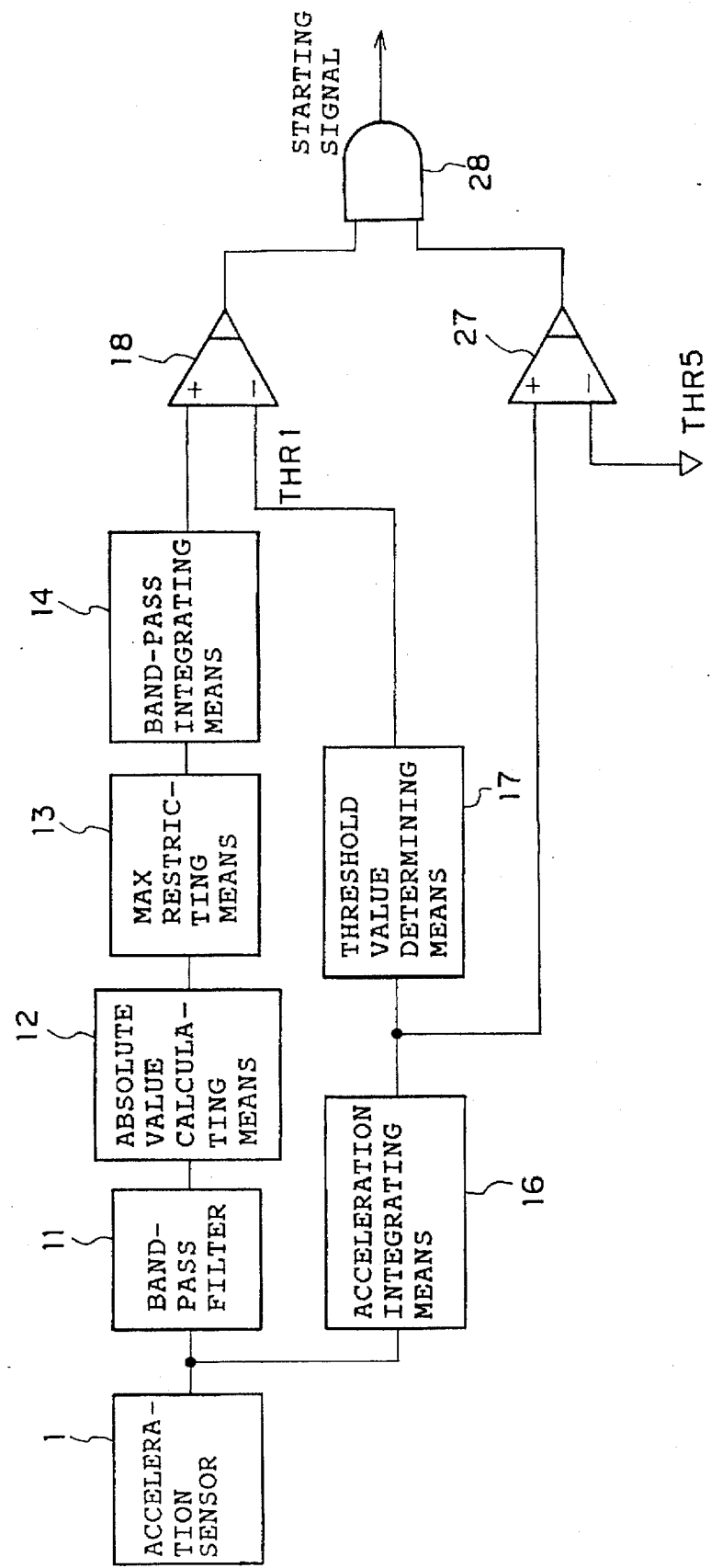
FIG. 28 is a block diagram for explaining an internal processing of a CPU by other embodiment of this invention.

FIG. 28 is a block diagram for explaining the internal processing of the CPU according to other embodiment of this invention, wherein the same portion as in FIGS. 2 and 8 is attached with the same notation and a duplicated explanation will be omitted. In FIG. 28, numeral 27 designates a comparing means for comparing an output signal of the acceleration integrating means 16 with a predetermined fifth threshold value THR5, and numeral 28 designates an AND logic means for inputting output signals of the comparing means 18 and 27.

Figure 29:
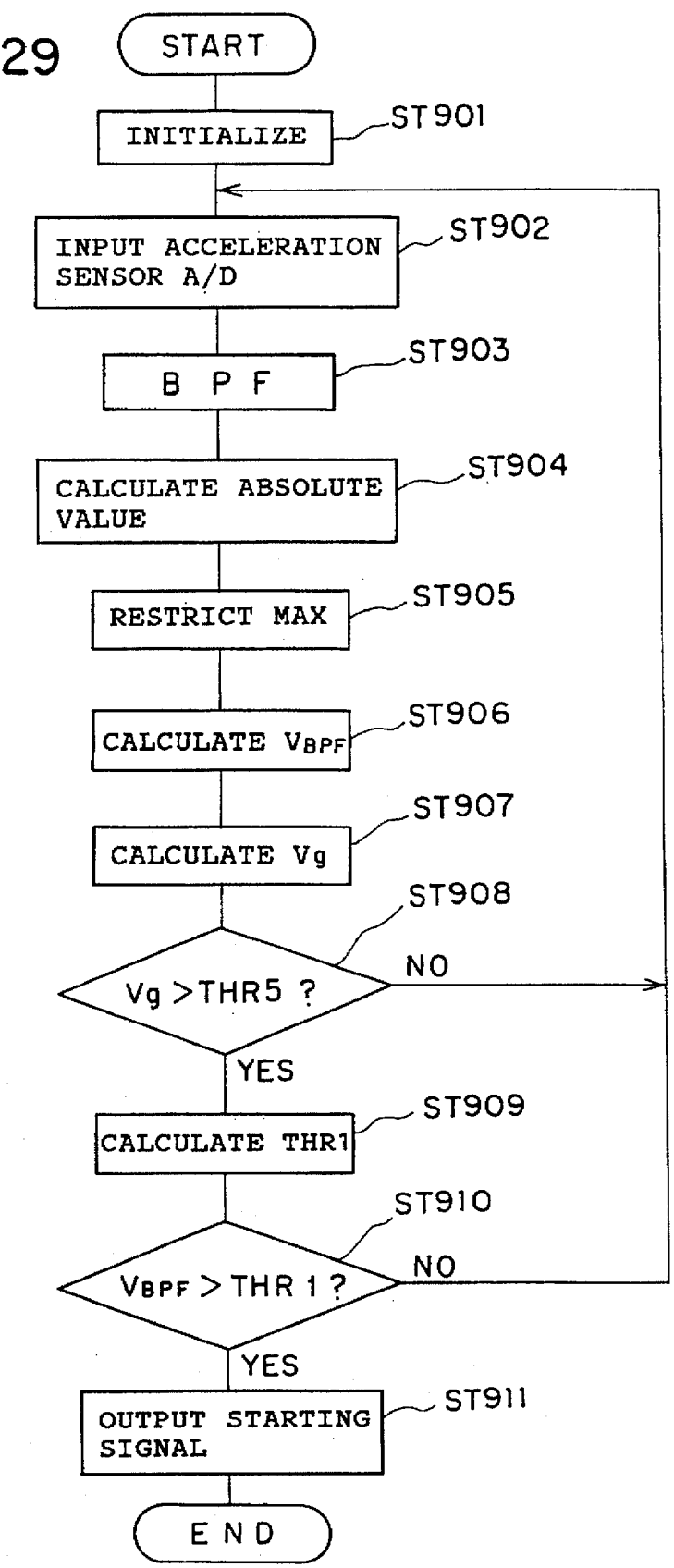
FIG. 29 is a flow chart for explaining the operation of he embodiment shown in FIG. 28.

Next, an explanation will be given of the operation in reference to a flow chart of FIG. 29. In FIG. 29, step ST901 through step ST905 are the same operation as step ST101 through step ST105 in FIG. 3 and therefore, the explanation will be omitted. In step ST906, the operation calculates the integrated value $V_{BPF}$ of an acceleration waveform of which upper limit has been restricted in step ST905 by the bandpass integrating means 14. In step ST907, the operation calculates the integrated value $V_g$ of the acceleration data of the acceleration sensor 1 transmitted from the input device 2 by the acceleration integrating means 16. In step ST908, the operation compares $V_g$ with the predetermined fifth threshold value THR5 by the comparing means 27, proceeds to step ST909 when the operation determines that $V_g$ is larger, and returns to step ST902 in a case other than the above and continues the processing. In step ST909, the operation calculates the first threshold value THR1 shown by the following equation by the threshold determining means 17.

$$THR1 = 0.42 \times V_g + 0.1$$

In step ST910, the operation compares the integrated value $V_{BPF}$ which has been calculated in step ST906 with the first threshold value THR1 which has been calculated in step ST909 by the comparing means 18, proceeds to step ST911 when $V_{BPF}$ is equal to or larger than THR1 and outputs the starting signal for starting the air bag whereby the processing is finished. When $V_{BPF}$ is less than THR1 as a result of comparison in step ST910, the operation returns to step ST902 and continues the processing.

The calculation of $V_{BPF}$ and $V_g$ in steps ST906 and 907 is similar to the integration processing in step ST106 of the internal processing of the first embodiment, which performs the processing wherein the integration calculation is carried out by subtracting a certain value therefrom and resets the integrated value to 0 when the calculated integrated value becomes minus.

Figure 30:
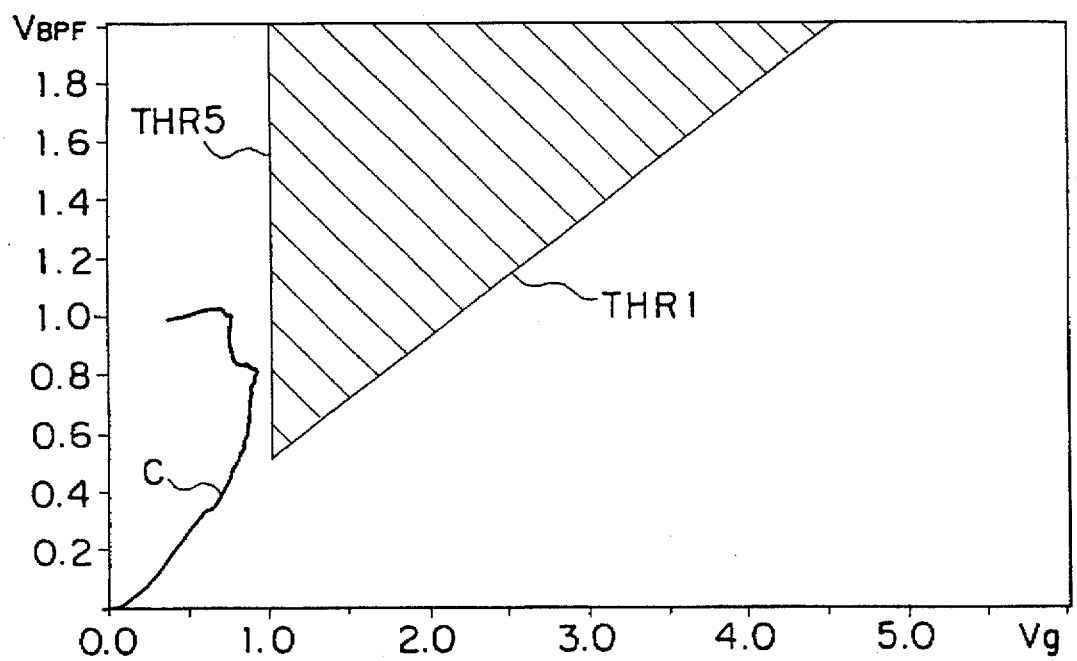
FIG. 30 is a conceptual diagram for explaining an internal processing of a CPU in the embodiment shown in FIG. 28.

FIG. 30 is a conceptual diagram for explaining the internal processing of the CPU according to the ninth embodiment, showing an impact acceleration waveform of the hammer blow wherein the abscissa is $V_g$ and the ordinate is $V_{BPF}$. In FIG. 30, the hatched portion shows a region of outputting the starting signal, wherein it is known that the impact acceleration waveform C of the hammer blow does not start the device.

Figure 31:
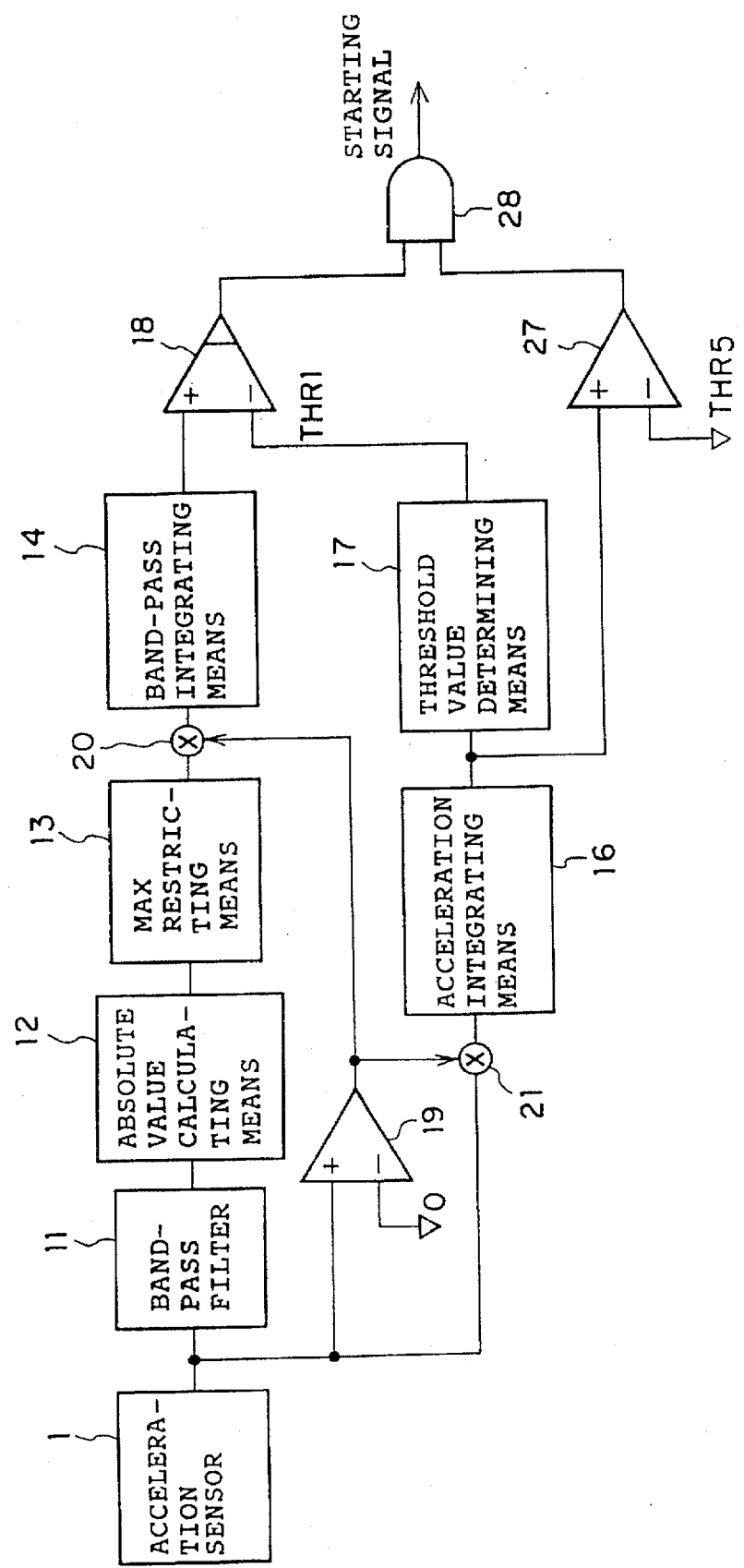
FIG. 31 is a block diagram for explaining an internal processing of a CPU showing other embodiment of this invention.

FIG. 31 is a block diagram for explaining the internal processing of the CPU according to other embodiment of this invention, wherein the same portion as in FIGS. 2, 13 and 28 is attached with same notation and a duplicated explanation will be omitted.

Figure 32:
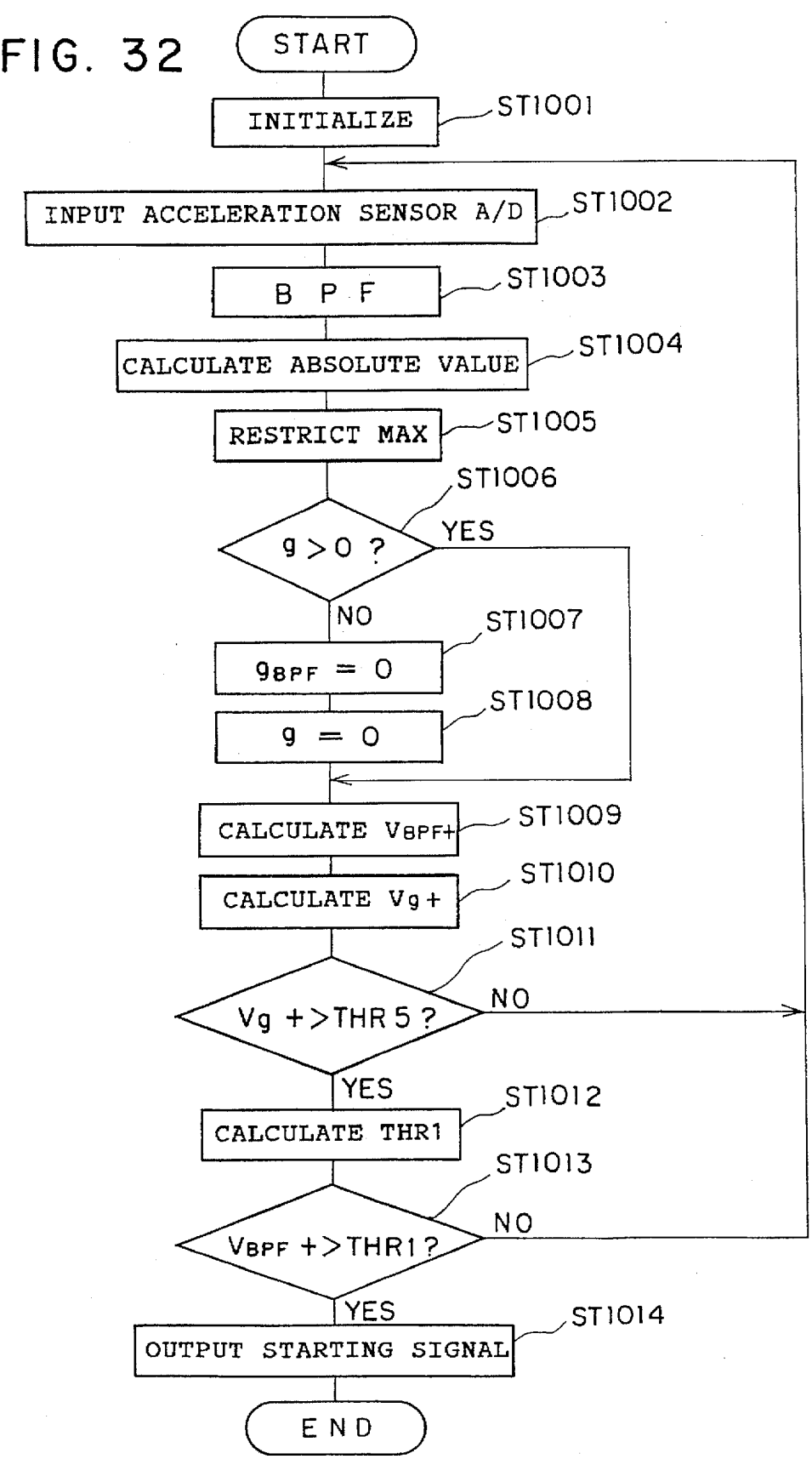
FIG. 32 is a flow chart for explaining the operation of the embodiment shown in FIG. 31.

Next, an explanation will be given of the operation in reference to a flow chart of FIG. 32. In FIG. 32, step ST1001 through step ST1005 are the same processing as step ST101 through step ST105 in FIG. 3 and therefore, the explanation will be omitted. In step ST1006, the operation determines whether acceleration data g of the acceleration sensor 1 transmitted from the input device 2 is equal to or larger than 0, and proceeds to ST1009 when g is equal to or larger than 0. When it is less than 0, the operation proceeds to step ST1009 after rendering the acceleration data $g_{BPF}$ and g to 0 in steps ST1007 and 1008. In step ST1009, the operation calculates the integrated value $V_{BPF+}$ of $g_{BPF}$ by the bandpass integrating means 14. In step ST1010, the operation calculates the integrated value $V_{g+}$ of g by the acceleration integrating means 16. In step ST1011, the operation compares $V_{g+}$ with a predetermined threshold value THR5 by the comparing means 27, proceeds to step ST1012 when the operation determines that $V_{g+}$ is larger, and returns to step ST1002 in a case other than the above. In step ST1012, the operation calculates the first threshold value THR1 as shown by the following equation by the threshold value determining means 17.

$$THR1 = 0.3 \times V_g + 0.17$$

In step ST1013, the operation compares the integrated value $V_{BPF+}$ which has been calculated in step ST1009 with the first threshold value THR1 which has been calculated in step ST1012 by the comparing means 18, proceeds to step ST1014 when $V_{BPF+}$ is equal to or larger than THR1 and outputs the starting signal for starting the air bag whereby the processing is finished. When $V_{BPF+}$ is less than THR1 as a result of comparison in ST1013, the operation returns to step ST1002 and continues the processing.

The calculation of $V_{BPF+}$ and $V_{g+}$ in steps ST1009 and 1010 is similar to the integration processing in step ST106 of the internal processing of the first embodiment, which performs a processing wherein the integration calculation is carried out after subtracting a certain value therefrom and the integrated value is reset to 0 when the calculated integrated value becomes minus.

Figure 33:
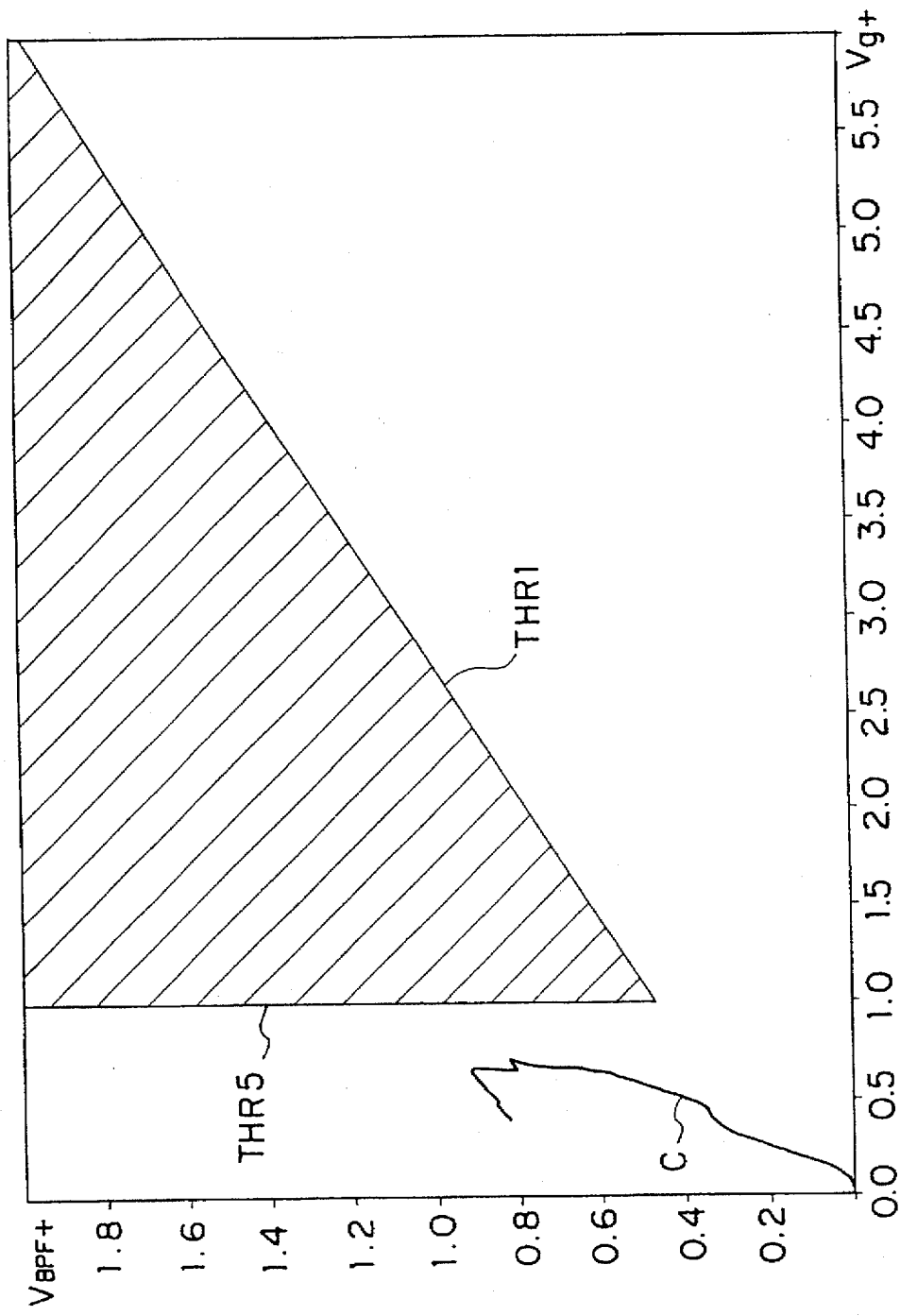
FIG. 33 is a conceptual diagram for explaining an internal processing of a CPU in the embodiment shown in FIG. 31.

FIG. 33 is a conceptual diagram for explaining the internal processing of the CPU according to the tenth embodiment, showing the impact acceleration waveform of the hammer blow wherein the abscissa is $V_{g+}$ and the ordinate is $V_{BPF+}$. The hatched portion in FIG. 33 shows a region of outputting the starting signal, wherein it is known that the impact acceleration waveform C of the hammer blow does not start the device. Accordingly, this embodiment has an effect similar to that of the seventh embodiment. Further, this embodiment has an effect similar to that of the fourth embodiment, since the integrated value $V_{g+}$ of g and the integrated value $V_{BPF+}$ of $g_{BPF}$ are calculated only in the decelerating direction by the processing of step ST1006.

Figure 34:
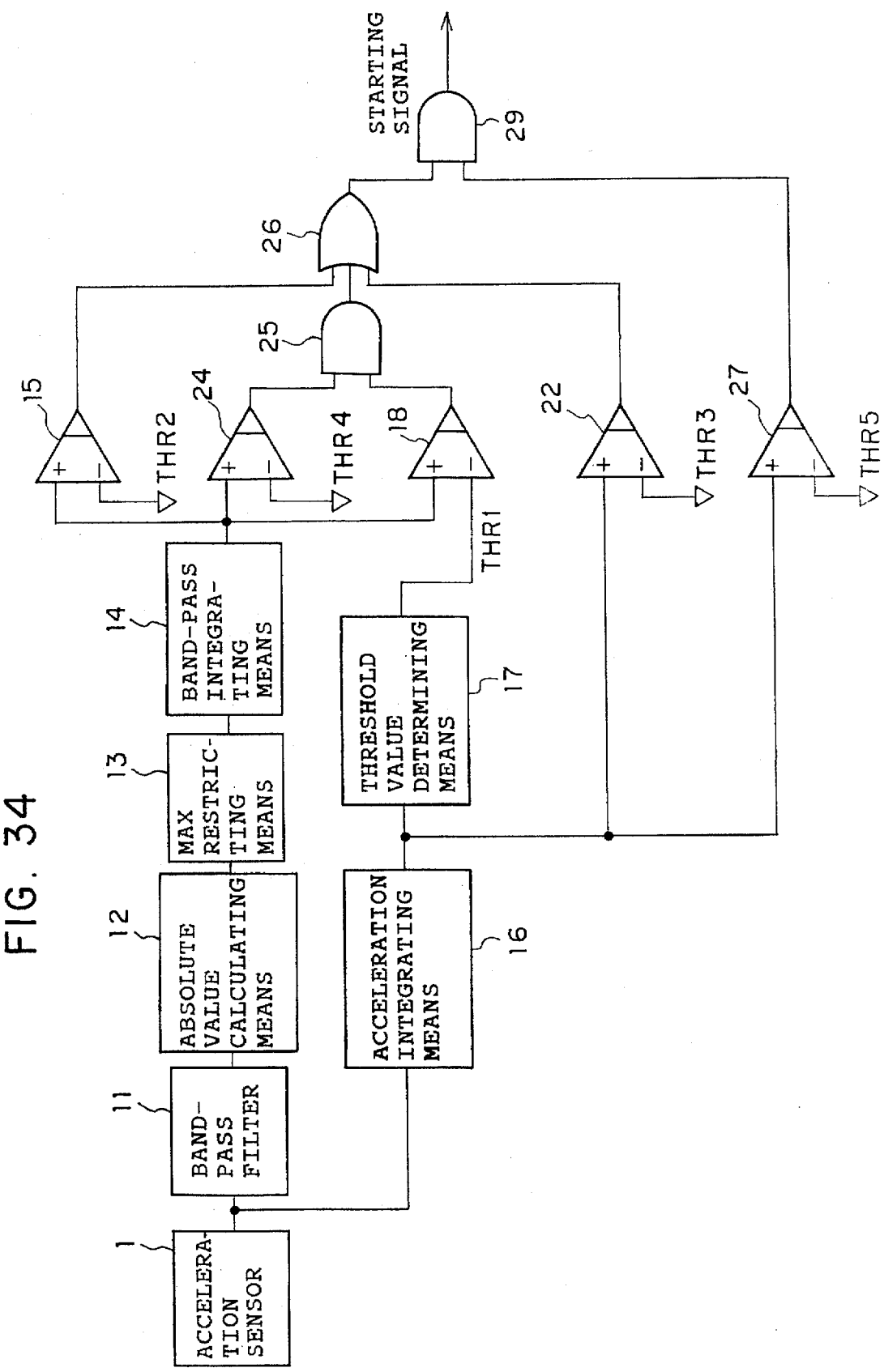
FIG. 34 is a block diagram for explaining an internal processing of a CPU by other embodiment of this invention.

FIG. 34 is a block diagram for explaining the internal processing of the CPU according to other embodiment of this invention, wherein the same portion as in FIGS. 2, 8, 16 and 22 is attached with the same notation and a duplicated explanation will be omitted. In FIG. 34, numeral 27 designates a comparing means for comparing an output signal of the acceleration integrating means 16 with a predetermined threshold value THR5, and numeral 29 designates an AND logic means for inputting an output signal of the comparing means 27 and an output signal of the OR logic means 26.

Figure 35:
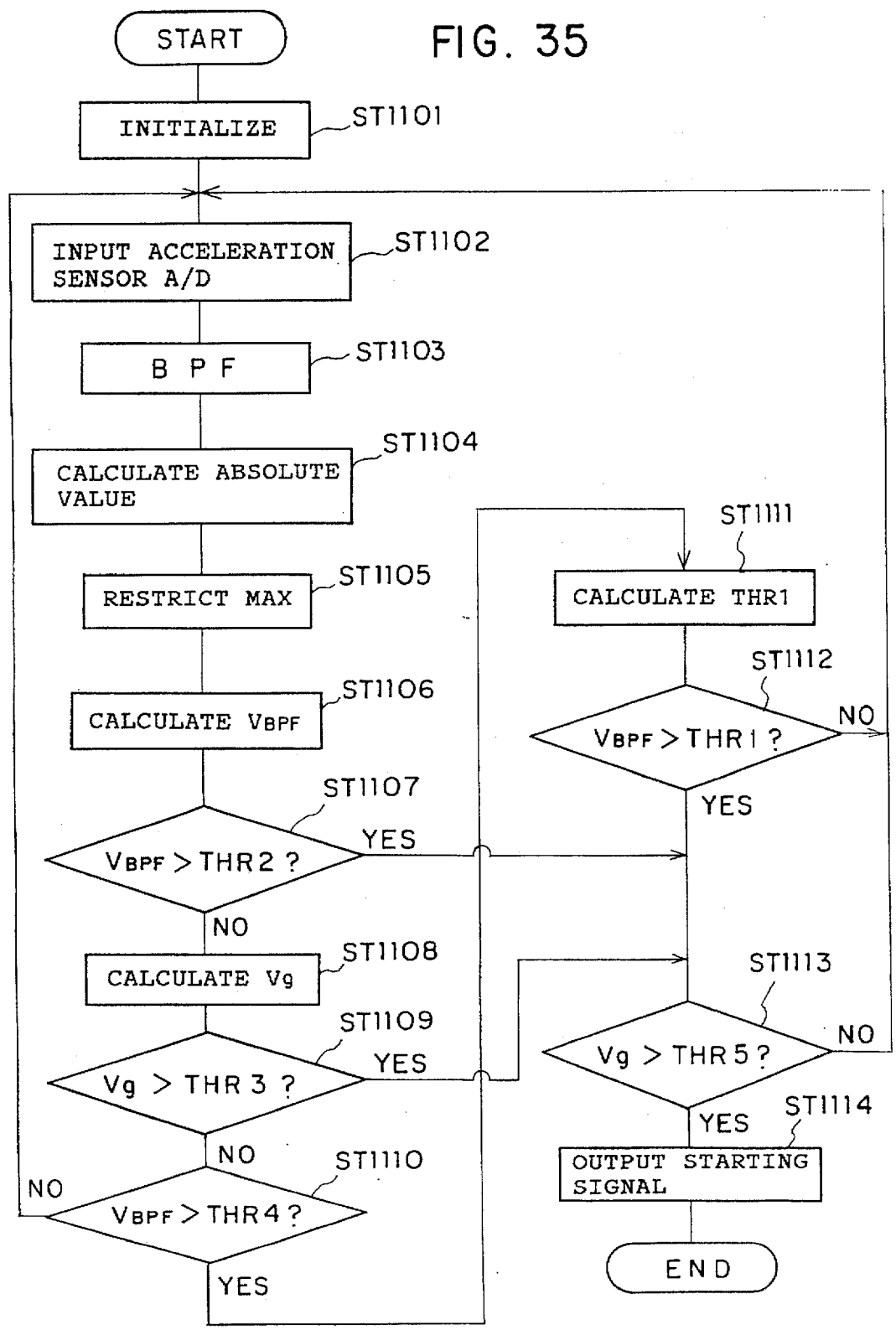
FIG. 35 is a flow chart for explaining the operation of the embodiment shown in FIG. 34.

Next, an explanation will be given of the operation in reference to a flow chart of FIG. 35. In FIG. 35, step ST1101 through step ST1105 are the same processing as step ST101 through step ST105 in FIG. 3 and therefore, the explanation will be omitted. In step ST1106, the operation calculates the integrated value $V_{BPF}$ of an acceleration waveform of which upper limit has been restricted in step ST1105. In step ST1107, the operation compares $V_{BPF}$ with a predetermined second threshold value THR2, proceeds to step ST1113 when the operation determines that $V_{BPF}$ is larger, and proceeds to step ST1108 in a case other than the above. In step ST1108, the operation calculates the integrated value $V_g$ of the acceleration data of the acceleration sensor transmitted from the input device 2 by the acceleration integrating means 16. In step ST1109, the operation compares $V_g$ with a predetermined third threshold value THR3 by the comparing means 22, proceeds to step ST1113 when the operation determines that $V_g$ is larger and proceeds to step ST1110 in a case other than the above. In step ST1110, the operation compares $V_{BPF}$ with a predetermined fourth threshold value THR4 by the comparing means 24, proceeds to step ST1111 when the operation determines that $V_{BPF}$ is larger, and returns to step ST1102 in a case other than the above and continues the processing. Here, THR4 is smaller than THR2. In step ST1111, the operation calculates a first threshold value THR1 as shown by the following equation by the threshold value determining means 17.

$$THR1 = 0.42 \times V_g + 0.1$$

In step ST1112, the operation compares the integrated value $V_{BPF}$ which has been calculated in step ST1106 with the first threshold value THR1 which has been calculated in step ST1111 by the comparing means 18, proceeds to step ST1113 when $V_{BPF}$ is larger than THR1 and returns to step ST1102 in a case other than the above and continues the processing. In step ST1113, the operation compares $V_g$ with a predetermined threshold value THR5, proceeds to step ST1114 when the operation determines that $V_g$ is larger and outputs the starting signal for starting the air bag whereby the processing is finished. When $V_g$ is less than THR5 as a result comparison in step ST1113, the operation returns to step ST1102 and continues the processing. Here, THR5 is smaller than THR3.

The calculation of $V_{BPF}$ and $V_g$ in steps ST1106 and 1108 is similar to the integration processing in step ST106 of the internal processing of the first embodiment, which performs a processing wherein the integration calculation is carried out after the subtracting a certain value therefrom and the integrated value is reset to 0 when the calculated integrated value becomes minus.

Figure 36:
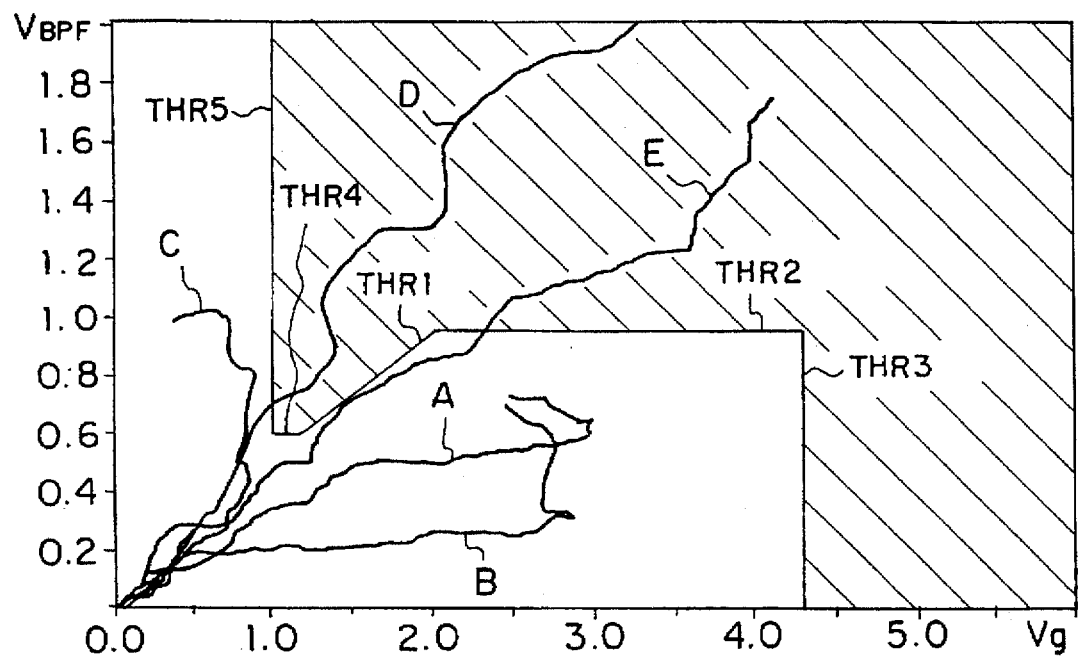
FIG. 36 is a conceptual diagram for explaining an internal processing of a CPU in the embodiment shown in FIG. 34.

FIG. 36 is a conceptual diagram of the internal processing of the CPU according to the eleventh embodiment, showing the 8 mile/hour frontal collision (A and B of FIG. 36), the impact acceleration waveform of the hammer blow (C of FIG. 36) and the U/R (D and E of FIG. 36) wherein the abscissa is $V_g$ and the ordinate is $V_{BPF}$. In FIG. 36, the hatched portion shows a region of outputting the starting signal, the 8 mile/hour frontal collision of A and B does not start the device with composure, and the device is not started by the impact acceleration waveform of the hammer blow of C. Further, it is known that the device is certainly started by the U/R of D and E.

Figure 37:
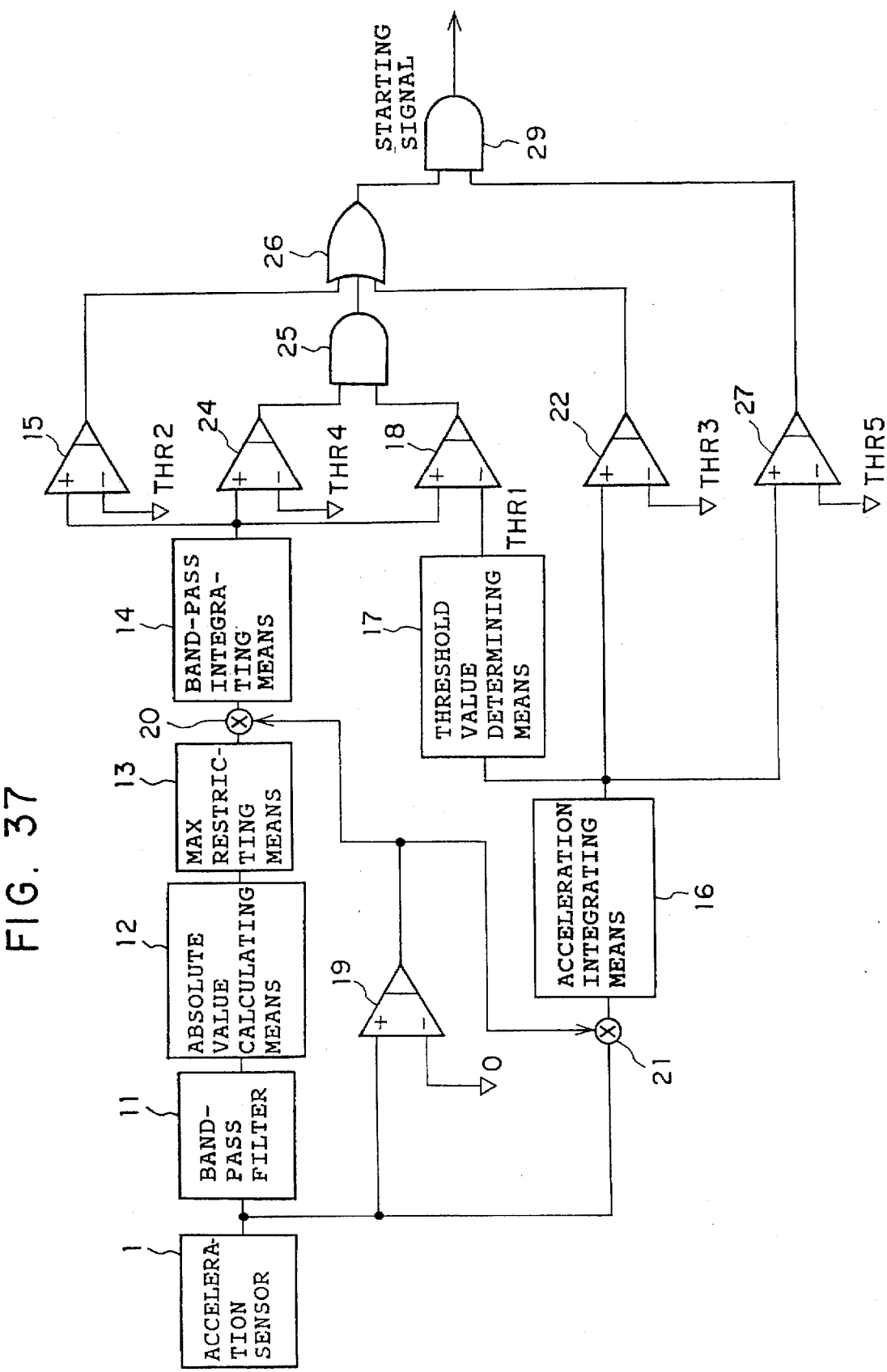
FIG. 37 is a block diagram for explaining an internal processing of a CPU showing other embodiment of this invention.

FIG. 37 is a block diagram for explaining the internal processing of the CPU according to other embodiment of this invention, wherein the same portion as in FIGS. 2, 13 and 34 is attached with the same notation and a duplicated explanation will be omitted.

Figure 38:
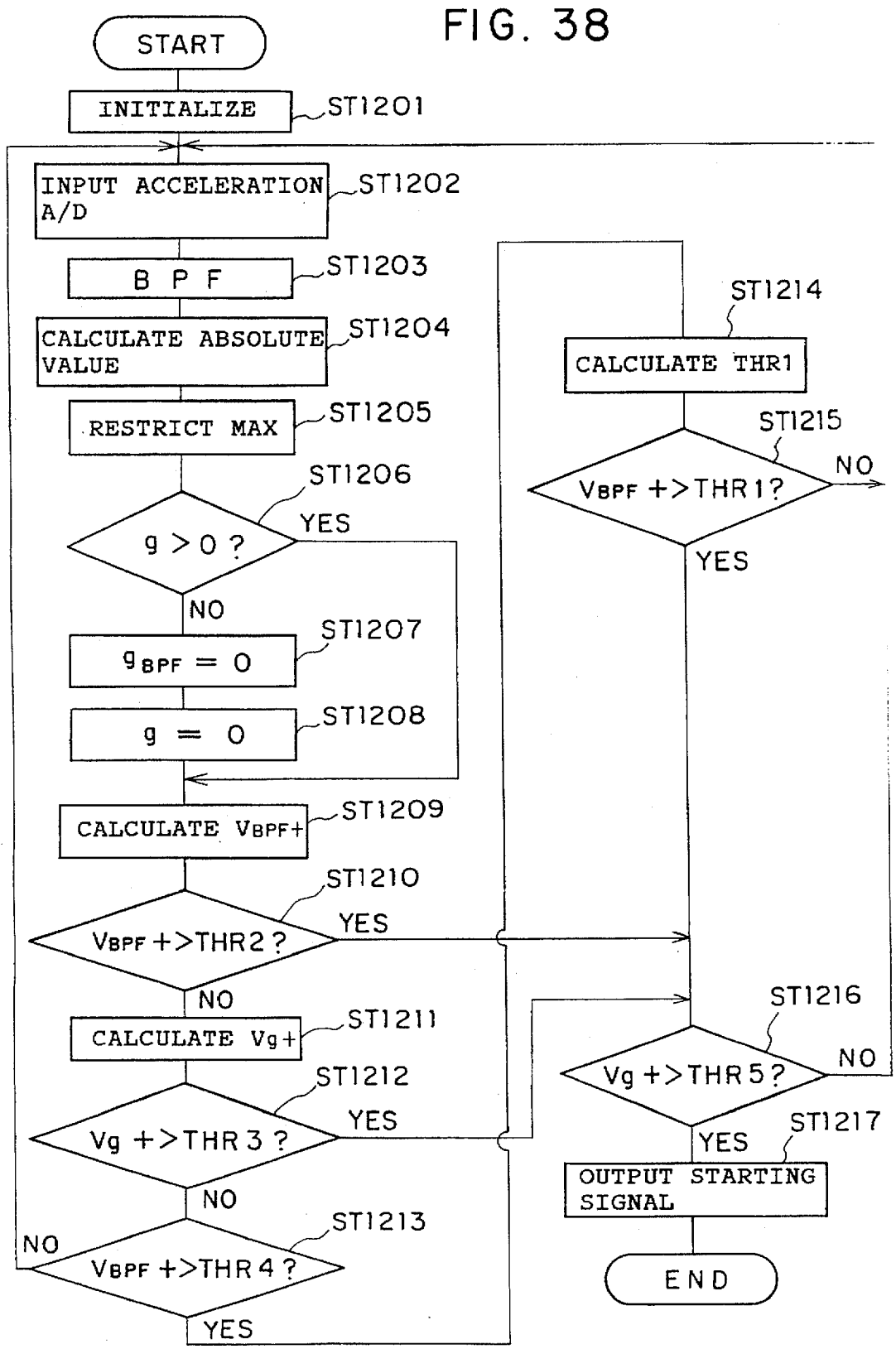
FIG. 38 is a flow chart for explaining the operation of the embodiment shown in FIG. 37.

Next, explanation will be given of the operation in reference to a flow chart of FIG. 38. In FIG. 38, step ST1201 through 1205 are the same processing as step ST101 through step ST105 and therefore, the explanation will be omitted. In step ST1206, the operation determines whether the acceleration data g of the acceleration sensor 1 transmitted from the input device 2 is equal to or larger than 0, and when it is equal to or larger than 0, the operation proceeds to step ST1209 after rendering the acceleration data $g_{BPF}$ and the g in steps ST1206 and 1208. In step ST1209, the operation calculates the integrated value $V_{BPF+}$ of $g_{BPF}$ by the band-pass integrating means 14. In step ST1210, the operation compares $V_{BPF+}$ with a second threshold value THR2 by the comparing means 15, proceeds to step ST1216 when the operation determines that $V_{BPF+}$ is larger, and proceeds to step ST1211 in a case other than the above.

In step ST1211, the operation calculates the integrated value $V_{g+}$ of g by the acceleration integrating means 16. In step ST1212, the operation compares $V_{g+}$ with a third threshold value THR3 by the comparing means 22, proceeds to ST1216 when the operation determines that $V_{g+}$ is larger, and proceeds to step ST1213 in a case other than the above. In step ST1213, the operation compares the integrated value $V_{BPF+}$ which has been calculated in step ST1209 with a predetermined threshold value THR4 by the comparing means 24, proceeds to step ST1214 when the operation determines that $V_{BPF+}$ is larger, and returns to step ST1202 and continues the processing. In step ST1214, the operation calculates a first threshold value THR1 shown by the following equation by the threshold value determining means 17.

$$THR1 = 0.3 \times V_{g+} + 0.17$$

In step ST1215, the operation compares the integrated value $V_{BPF+}$ which has been calculated in step ST1209 with the first threshold value THR1 which has been calculated in step ST1214 by the comparing means 18, proceeds to step ST1216 when $V_{BPF+}$ is equal to or larger than THR1 and when $V_{BPF+}$ is less than THR1, the operation returns to step ST1202 and continues the processing. In step ST1216, the operation compares the integrated value $V_{g+}$ which has been calculated in step ST1211 with a predetermined fifth threshold value THR5 by the comparing means 27, and proceeds to step ST1217 when the operation determines that $V_{g+}$ is larger and outputs the starting signal for starting the air bag whereby the processing is finished. When $V_{g+}$ is less than the fifth threshold value THR5 as a result of comparison in step ST1216, the operation returns to step ST1202 and continues the processing.

The calculation of $V_{BPF+}$ and $V_{g+}$ in steps ST1209 and 1211 is similar to the integration processing in step ST106 of the internal processing of the first embodiment, which performs a processing wherein the integration calculation is carried out after subtracting a predetermined value therefrom and the integrated value is resets to 0 when the calculated integrated value becomes minus.

Figure 39:
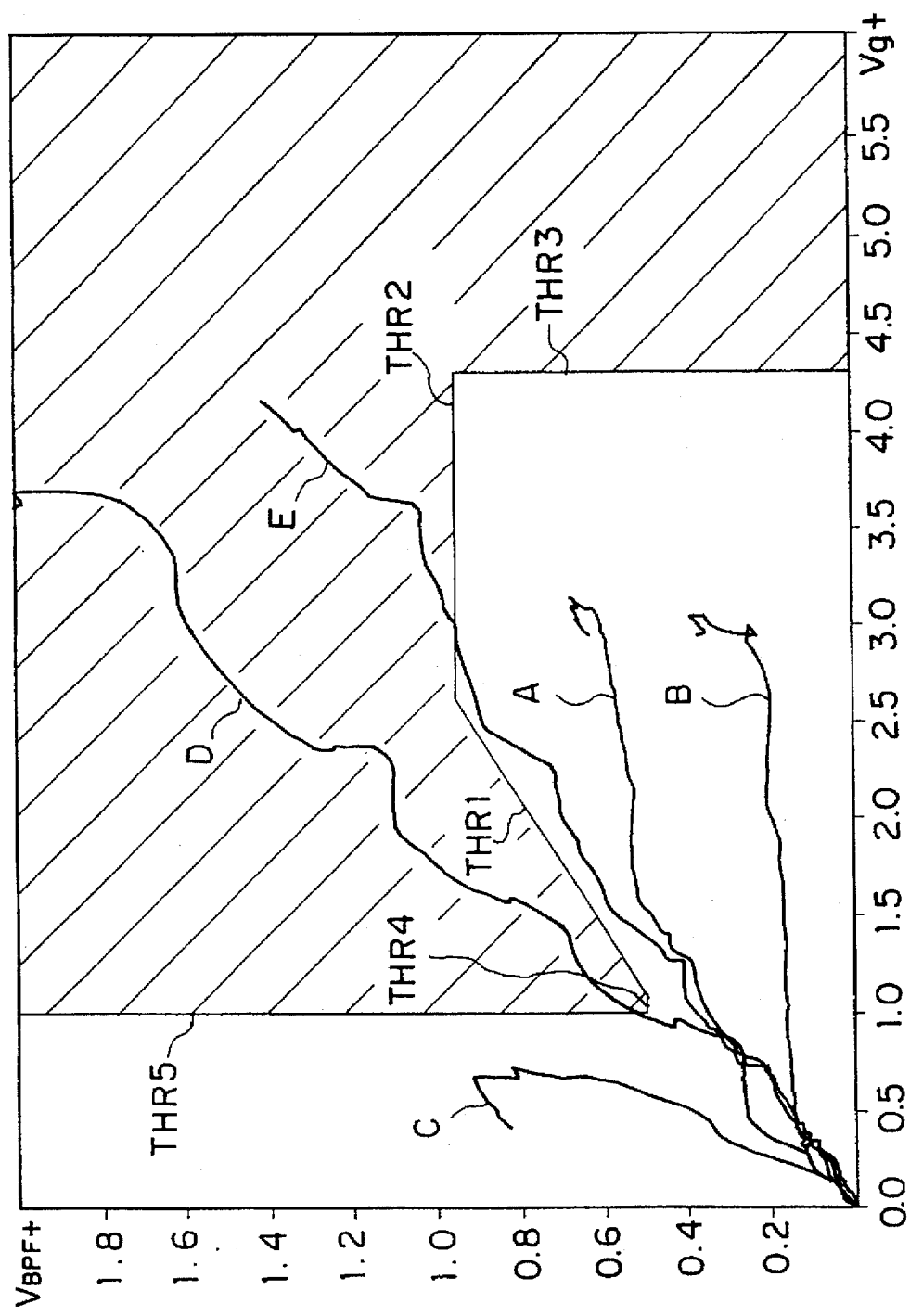
FIG. 39 is a conceptual diagram for explaining an internal processing of a CPU in the embodiment shown in FIG. 37.
Figure 40:
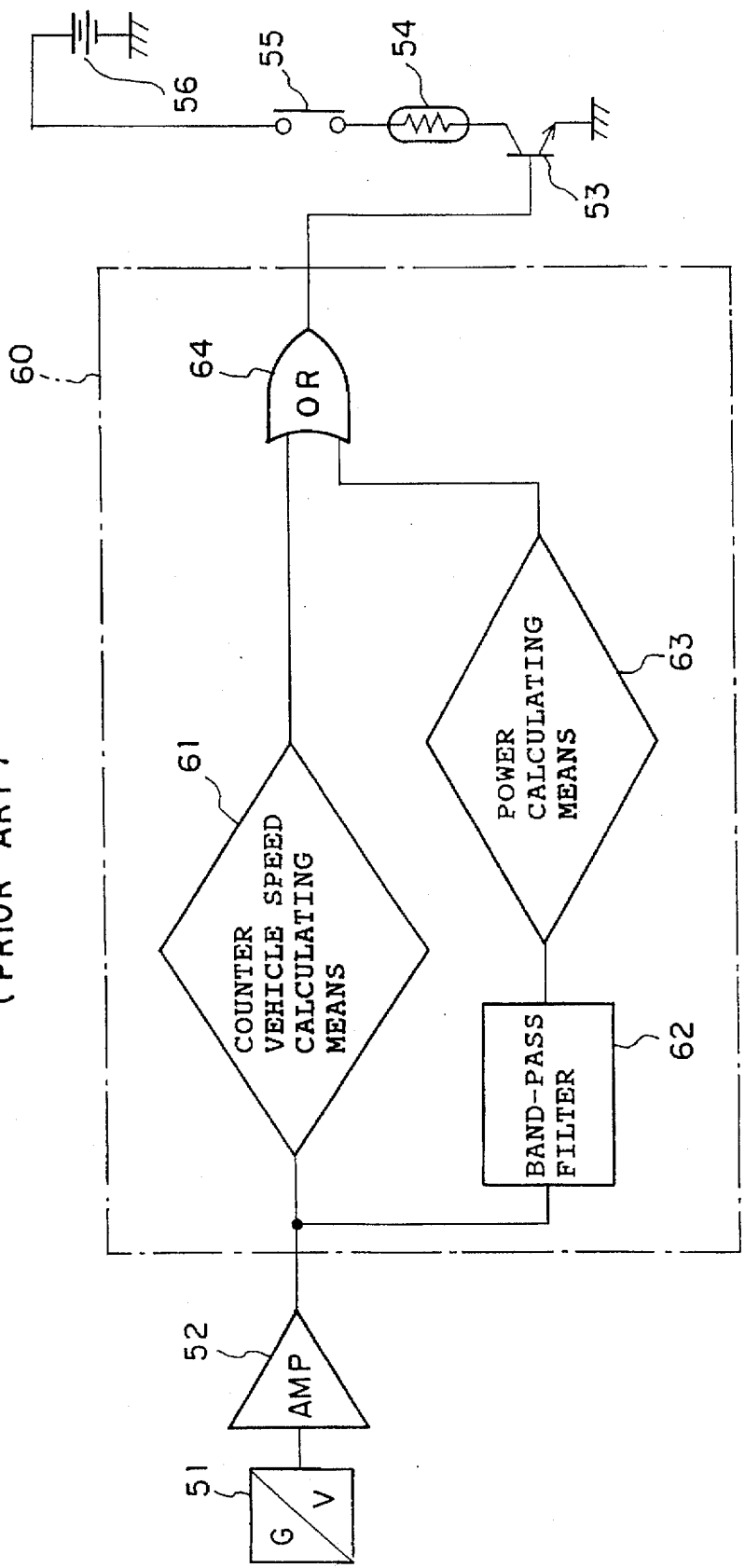
FIG. 40 is a block diagram showing a conventional starting device for a passenger protecting device.

FIG. 39 is a conceptual diagram for explaining the internal processing of the CPU according to the twelfth embodiment, showing the 8 mile/hour frontal collision (A and B of FIG. 39), the impact acceleration waveform of the hammer blow (C of FIG. 39) and the U/R (D and E of FIG. 39) wherein the abscissa is $V_{g+}$ and the ordinate is $V_{BPF+}$. In FIG. 39, the hatched portion shows a region of outputting the starting signal, wherein the 8 mile/hour frontal collision of A and B does not start the device with composure, and the device is not started by the impact acceleration waveform of the hammer blow of C. Further, it is known that the device is certainly started by the U/R of D and E. Accordingly, this embodiment has an effect similar to that of the eighth embodiment. Further, this embodiment has an effect similar to that of the fourth embodiment since the integrated value $V_{g+}$ of g and the integrated value $V_{BPF+}$ of $g_{BPF}$ are calculated only in the decelerating direction by the processing of step ST1206.

As stated above, in the sixth, eighth, tenth and twelfth embodiments wherein the integration is carried out when the output of the acceleration sensor 1 is the acceleration in the decelerating direction, compared with the fifth, seventh, ninth and the eleventh embodiments wherein the output signal of the acceleration sensor 1 is integrated without the above restriction, the jumping-up at the later half of collision of the 8 mile/hour frontal collision is alleviated. As a result, the starting of the device in the 8 mile/hour frontal collision can certainly be prevented, and further the threshold value can be restricted to a low value. Therefore, the determination of collision which must start the device is accelerated and the accuracy is more enhanced.

As stated above, this invention achieves many effects.

When the invention is constructed such that the absolute value of the output from the band-pass filter of which upper limit has been restricted, is integrated and the starting signal is outputted when this integrated value is larger than a predetermined threshold value, the device is not started by an acceleration waveform of collision that must not start the device, and is started by an acceleration waveform of a special collision such as the U/R that must start the device.

In the preferred embodiment, the threshold value which varies in accordance with the output of the acceleration integration is determined and the starting signal is outputted when the output of the band-pass integration is larger than the threshold value. Therefore, it is possible to swiftly differentiate a collision that must not start the device from a collision that must start the device.

When the invention is constructed such that the band-pass integration is carried out when the output of the acceleration sensor is an acceleration in the decelerating direction, and the starting signal is outputted when this integrated value is larger than the predetermined threshold value, the device is little influenced by vibration components caused before and after the end of collision of an acceleration waveform of collision such as the 8 mile/hour frontal collision that must not start the device, the device is not started by an acceleration waveform that must not start the device, and the device is started by an acceleration waveform of a special collision such as the U/R that must start the device.

When the invention is constructed such that the band-pass integration and the acceleration integration are carried out when the output of the acceleration sensor is an acceleration in the decelerating direction, a threshold value is determined which varies in accordance with the output of the acceleration integration, and the starting signal is outputted when the output of the band-pass integration is larger than the threshold value, it is possible to swiftly differentiate a collision that must not start the device from a collision that must start the device, which is little influenced by vibration components caused before and after the end of collision of an acceleration waveform of a low-speed collision such as the 8 mile/hour frontal collision that must not start the device.

According to the preferred embodiment, since it is constructed to determine a threshold value which linearly increases in accordance with an increase in the output of the acceleration integration, and the starting signal is outputted when the output of the band-pass integration is larger than the threshold value, the calculation of the threshold value is facilitated and it is possible to swiftly differentiate a collision that must not start the device from a collision that must start the device, by a simplified program.

When the invention is constructed such that the starting signal is outputted when the output of the band-pass integration is larger than the second threshold value, or when the output of the band-pass integration is larger than the first threshold value which linearly increases in accordance with an increase in the output of the acceleration integration, or when the output of the acceleration integrating means is larger than the third threshold value, the device is certainly started by an acceleration waveform of a special collision such as the U/R that must start the device, by a simplified program.

According to the preferred embodiment, it is constructed to output the starting signal when the output of the band-pass integration is larger than the second threshold value, or when the output of the band-pass integration is larger than the first threshold value which linearly increases in accordance with an increase in the output the acceleration integration and the output of the acceleration integration is larger than the fourth threshold value, or when the output of the acceleration integration is larger than the third threshold value. Therefore, the device is certainly started by an acceleration waveform of a special collision such as the U/R that must start the device, and device is little influenced by vibration components caused immediately after the start of collision, with respect to an acceleration waveform of the low-speed collision such as the 8 mile/hour frontal collision that must not start the device.

When the invention is constructed such that the output of the band-pass integration is larger than the first threshold value which linearly increases in accordance with an increase in the output of the acceleration integration and the output of the acceleration integration is larger than the fifth threshold value, the device is not started by the impact acceleration waveform of the hammer blow or the like that must not start the device, by using a simplified program.

When the invention is constructed such that the starting signal is outputted when the output of the band-pass integration is larger than the second threshold value, or the output of the band-pass integration is larger than the first threshold value which linearly increases in accordance with an increase in the output of the acceleration integration and the output of the acceleration integration is larger than the fourth threshold value, or when the output of the acceleration integration is larger than the third threshold value, and at the same time when the output of the acceleration integration is larger than the fifth threshold value, the device is certainly started by an acceleration waveform of a special collision such as the U/R that must start the device, the device is little influenced by vibration components caused immediately after the beginning of collision, with respect to an acceleration waveform of a special collision such as the 8 mile/hour frontal collision that must not start the device, and the device is not started by the impact acceleration waveform of the hammer blow or the like that must not start the device, by using a simplified program.

A wide variety of embodiments of this invention can be constructed without deviating from the spirit and scope of this invention. This invention is not restricted to these special embodiments except specified in the attached claims.

What is claimed is:

1. A starting device for a passenger protecting device outputting a starting signal based on an output signal of an acceleration sensor for detecting an acceleration in collision comprising:

a band-pass filter for filtering a component of the output signal of the acceleration sensor in a specified frequency domain;

an absolute value calculating means for calculating an absolute value of an output signal of the band-pass filter;

an upper limit restricting means for restricting an output signal of the absolute value calculating means by a predetermined upper limit value;

a band-pass integrating means for integrating an output signal of the upper limit restricting means; and a comparing means for comparing an output of the band-pass integrating means with a predetermined threshold value and outputting the starting signal.

2. The starting device for a passenger protecting device according to claim 1, further comprising:

an acceleration integrating means for integrating the output signal of the acceleration sensor; and a threshold value determining means for determining a threshold value in accordance with an output signal of the acceleration integrating means.

3. The starting device for a passenger protecting device according to claim 2, wherein the threshold determining means determines a threshold value which linearly increases in accordance with an increase in the output of the acceleration integrating means.

4. The starting device for a passenger protecting device according to claim 2, wherein, when the threshold value determined by the threshold value determining means is expressed by a coordinate system wherein the output $V_g$ of the acceleration integrating means is denoted by an abscissa and the output $V_{BPF}$ of the band-pass integrating means is denoted by an ordinate, the threshold value is expressed by a first straight line having a positive intercept and linearly increasing in accordance with an increase in the output $V_g$ by a positive inclination when the output $V_g$ is smaller than a predetermined value $V_a$, a second straight line being parallel with the abscissa and having a value of the output $V_g$ of the first straight line when the output $V_g$ is $V_a$ in case wherein the output $V_g$ is not smaller than $V_a$ and smaller than $V_b$ predetermined to a value larger than $V_a$, and a third straight line being parallel with the abscissa and having a value of 0 when the output $V_g$ is not smaller than $V_b$.

5. The starting device for a passenger protecting device according to claim 2, wherein, when the threshold value determined by the threshold value determining means is expressed by a coordinate system wherein the output $V_g$ of the acceleration integrating means is denoted by an abscissa and an output $V_{BPF}$ of the band-pass integrating means is denoted by an ordinate, the threshold value is expressed by a first straight line being parallel with the abscissa and having a predetermined positive value $V_p$ when the output $V_g$ is not larger than a predetermined value $V_a$, a second straight line passing through $(V_a, V_p)$ and linearly increasing in accordance with an increase in the output $V_g$ by a positive inclination when the output $V_g$ is not less than $V_a$ and is smaller than $V_b$ predetermined to a value larger than $V_a$, a third straight line being parallel with the abscissa and having a value of the output $V_{BPF}$ of the second straight line when the output $V_g$ is $V_b$ in case wherein the output $V_g$ is not smaller than $V_b$ and smaller than $V_c$ predetermined to a value larger than $V_b$, and a fourth straight line being parallel with the abscissa and having a value of 0 when the output $V_g$ is larger than $V_c$.

6. The starting device for a passenger protecting device according to claim 2, wherein, when the threshold value determined by the threshold value determining means is expressed by a coordinate system wherein the output $V_g$ of the acceleration integrating means is denoted by an abscissa and the output $V_{BPF}$ of the band-pass integrating means is expressed by an ordinate, the threshold value is provided with a value sufficiently large and larger than any one of the output $V_{BPF}$ when the output $V_g$ is smaller than a predetermined value $V_a$, and is expressed by a straight line linearly increasing in accordance with an increase in the output $V_g$ by a positive inclination when the output $V_g$ is larger than $V_a$.

7. The starting device for a passenger protecting device according to claim 2, wherein, when the threshold value determined by the threshold value determining means is expressed by a coordinate system wherein the output $V_g$ of the acceleration integrating means is denoted by an abscissa and the output $V_{BPF}$ of the band-pass integrating means is expressed by an ordinate, the threshold value is provided with a value sufficiently large and larger than any one the output $V_{BPF}$ when the output $V_g$ is smaller than a predetermined value $V_a$, end is expressed by a straight line being parallel with the abscissa and having a predetermined positive value $V_p$ when the output $V_g$ is not smaller than $V_a$ and smaller than $V_b$ predetermined to a value larger than $V_a$, a second straight line passing through $(V_b, V_p)$ and linearly increasing in accordance with an increase in the output $V_g$ by a positive inclination when the output $V_g$ is not smaller than $V_b$ and smaller than $V_c$ predetermined to a value larger than $V_b$, a third straight line being parallel with the abscissa and having a value of the output $V_{BPF}$ of the second straight line when the output $V_g$ is $V_c$ in case wherein the output $V_g$ is not smaller than $V_c$ and smaller than $V_d$ predetermined to a value larger than $V_c$, a fourth straight line being parallel with the abscissa and having a value of 0 when the output $V_g$ is not smaller than $V_d$.

8. The starting device for a passenger protecting device according to claim 1, wherein the band-pass integrating means integrates the output of the upper limit restricting means when the output of the acceleration sensor is an acceleration in a decelerating direction.

9. The starting device for a passenger protecting device according to claim 2, wherein the band-pass integrating means integrates the output of the upper limit restricting means when the output of the acceleration sensor is an acceleration in a decelerating direction and the acceleration integrating means integrates the output signal of the acceleration sensor when the output of the acceleration sensor is the acceleration in the decelerating direction.

10. The starting device for a passenger protecting device according to claim 9, wherein the threshold value determining means determines a threshold value which linearly increases in accordance with an increase in the output of the acceleration integrating means.

11. A starting device for a passenger protecting device according to claim 9, wherein, when the threshold value determined by the threshold value determining means is expressed by a coordinate system wherein the output $V_g$ of the acceleration integrating means is denoted by an abscissa and the output $V_{BPF}$ of the band-pass integrating means is denoted by an ordinate, the threshold value is expressed by a first straight line having a positive intercept and linearly increasing in accordance with an increase in the output $V_g$ by a positive inclination when the output $V_g$ is smaller than a predetermined value $V_a$, a second straight line being parallel with the abscissa and having a value of the output $V_{BPF}$ of the first straight line when the output $V_g$ is $V_a$ in case wherein the output $V_g$ is not smaller than $V_a$ and smaller than $V_b$ predetermined to a value larger than $V_a$, and a third straight line being parallel with the abscissa and having a value of 0 when the output $V_g$ is not smaller than $V_b$.

12. The starting device for a passenger protecting device according to claim 9, wherein, when the threshold value determined by the threshold value determining means is expressed by a coordinate system wherein the output $V_g$ of the acceleration integrating means is denoted by an abscissa and an output $V_{BPF}$ of the band-pass integrating means is denoted by an ordinate, the threshold value is expressed by a first straight line being parallel with the abscissa and having a predetermined positive value $V_p$ when the output $V_g$ is not larger than a predetermined value $V_a$, a second straight line passing through $(V_a, V_p)$ and linearly increasing in accordance with an increase in the output $V_g$ by a positive inclination when the output $V_g$ is not less than $V_a$ and is smaller than $V_b$ predetermined to a value larger than $V_a$, a third straight line being parallel with the abscissa and having a value of the output $V_{BPF}$ of the second straight line when the output $V_g$ is $V_b$ in case wherein the output $V_g$ is not smaller than $V_b$ and smaller than $V_c$ predetermined to a value larger than $V_b$, and a fourth straight line being parallel with the abscissa and having a value of 0 when the output $V_g$ is larger than $V_c$.

13. The starting device for a passenger protecting device according to claim 9, wherein, when the threshold value determined by the threshold value determining means is expressed by a coordinate system wherein the output $V_g$ of the acceleration integrating means is denoted by an abscissa and the output $V_{BPF}$ of the band-pass integrating means is expressed by an ordinate, the threshold value is provided with a value sufficiently large and larger than any one of the output $V_{BPF}$ when the output $V_g$ is smaller than a predetermined value $V_a$, and is expressed by a straight line linearly increasing in accordance with an increase in the output $V_g$ by a positive inclination when the output $V_g$ is larger than $V_a$.

14. The starting device for a passenger protecting device according to claim 9, wherein, when the threshold value determined by the threshold value determining means is expressed by a coordinate system wherein the output $V_g$ of the acceleration integrating means is denoted by an abscissa and the output $V_{BPF}$ of the band-pass integrating means is expressed by an ordinate, the threshold value is provided with a value sufficiently large and larger than any one of the output $V_{BPF}$ when the output $V_g$ is smaller than a predetermined value $V_a$, and is expressed by a straight line being parallel with the abscissa and having a predetermined positive value $V_p$ when the output $V_g$ is not smaller than $V_a$ and smaller than $V_b$ predetermined to a value larger than $V_a$, a second straight line passing through $(V_b, V_p)$ and linearly increasing in accordance with an increase in the output $V_g$ by a positive inclination when the output $V_g$ is not smaller than $V_b$ and smaller than $V_c$ predetermined to a value larger than $V_b$, a third straight line being parallel with the abscissa and having a value of he output $V_{BPF}$ of the second straight line when the output $V_g$ is $V_c$ in case wherein the output $V_g$ is not smaller than $V_c$ and smaller than $V_d$ predetermined to a value larger than $V_c$, a fourth straight line being parallel with the abscissa having a value of 0 when the output $V_g$ is not smaller $V_d$.

* * * * *